United States Patent
Kim et al.

(10) Patent No.: US 9,774,925 B2
(45) Date of Patent: *Sep. 26, 2017

(54) BROADCAST SIGNAL TRANSMITTING APPARATUS, BROADCAST SIGNAL RECEIVING METHOD, BROADCAST SIGNAL TRANSMITTING METHOD, AND BROADCAST SIGNAL RECEIVING APPARATUS

(71) Applicant: LG ELECTRONICS INC., Seoul (KR)

(72) Inventors: Woochan Kim, Seoul (KR); Sungryong Hong, Seoul (KR); Woosuk Ko, Seoul (KR); Jaeho Hwang, Seoul (KR); Byounggill Kim, Seoul (KR); Jaehyung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,489

(22) Filed: Jan. 30, 2017

(65) Prior Publication Data
US 2017/0142497 A1    May 18, 2017

Related U.S. Application Data

(63) Continuation of application No. 14/911,414, filed as application No. PCT/KR2014/007462 on Aug. 13, 2014, now Pat. No. 9,602,888.

(Continued)

(51) Int. Cl.
*H04N 21/81*    (2011.01)
*H04N 21/2383*    (2011.01)
(Continued)

(52) U.S. Cl.
CPC .......... *H04N 21/814* (2013.01); *H04L 69/22* (2013.01); *H04N 5/38* (2013.01); *H04N 7/08* (2013.01);
(Continued)

(58) Field of Classification Search
None
See application file for complete search history.

(56) References Cited

U.S. PATENT DOCUMENTS

2006/0072623 A1    4/2006    Park
2009/0248828 A1    10/2009    Gould et al.
(Continued)

FOREIGN PATENT DOCUMENTS

CA    2 837 053 A1    11/2012
EP    2 043 291 A2    4/2009
(Continued)

*Primary Examiner* — Nicholas Corbo
(74) *Attorney, Agent, or Firm* — Birch, Stewart, Kolasch & Birch, LLP

(57) ABSTRACT

A method for transmitting a broadcast signal, the method includes encoding data pipe (DP) data corresponding to each of a plurality of DPs; mapping the encoded DP data to data symbols to generate at least one signal frame; modulating data in the at least one signal frame using an orthogonal frequency division multiplex (OFDM) scheme; inserting a preamble at a beginning of each of the at least one signal frame in a time domain; and transmitting a broadcast signal having the preamble and the modulated data of the at least one signal frame, wherein the preamble includes a wake-up indicator which wakes up a receiver to decode a DP for an emergency alert table (EAT) and acquire the EAT.

16 Claims, 39 Drawing Sheets

Related U.S. Application Data

(60) Provisional application No. 61/870,236, filed on Aug. 27, 2013, provisional application No. 61/865,628, filed on Aug. 14, 2013, provisional application No. 61/865,593, filed on Aug. 13, 2013, provisional application No. 61/856,116, filed on Aug. 12, 2013.

(51) Int. Cl.
    *H04N 21/438*     (2011.01)
    *H04N 21/61*     (2011.01)
    *H04L 29/06*     (2006.01)
    *H04N 7/08*     (2006.01)
    *H04N 5/38*     (2006.01)

(52) U.S. Cl.
    CPC ..... *H04N 21/2383* (2013.01); *H04N 21/4382* (2013.01); *H04N 21/615* (2013.01); *H04N 21/6112* (2013.01)

(56) References Cited

U.S. PATENT DOCUMENTS

| | | |
|---|---|---|
| 2010/0075591 A1 | 3/2010 | Eyer et al. |
| 2010/0158047 A1 | 6/2010 | Lee et al. |
| 2010/0246719 A1 | 9/2010 | Ko et al. |
| 2010/0296506 A1 | 11/2010 | Ryu et al. |
| 2011/0035772 A1 | 2/2011 | Ramsdell et al. |
| 2014/0120861 A1 | 5/2014 | Kwak et al. |
| 2016/0112233 A1 | 4/2016 | Ko et al. |

FOREIGN PATENT DOCUMENTS

| | | |
|---|---|---|
| EP | 2 461 610 A1 | 6/2012 |
| EP | 2 512 042 A1 | 10/2012 |
| KR | 10-2009-0061610 A | 6/2009 |
| KR | 10-2010-0073515 A | 7/2010 |
| KR | 10-2010-0126192 A | 12/2010 |
| WO | WO 2011/145369 A1 | 11/2011 |
| WO | WO 2012/161552 A2 | 11/2012 |

FIG. 18

- Preamble
  - wake_up_flag : 1 bit
  - EAT_flag : 1 bit

- PLS-pre
  - EAT_version : 16 bits

- PLS-post
  - EAT_robust_mode : 1 bit
  - EAT_RB_start : 8 bits
  - EAT_N_RB : 8 bits
  - EAT_splitting_mode : 4 bits
  - EAT_splitting_SF_mode : 2 bits (a)

- Preamble
  - wake_up_flag : 1 bit
  - EAT_flag : 1 bit

- PLS-pre
  - EAT_flag : 1 bit

- PLS-post
  - EAT_robust_mode : 1 bit
  - EAT_RB_start : 8 bits
  - EAT_N_RB : 8 bits
  - EAT_splitting_mode : 4 bits
  - EAT_splitting_SF_mode : 2 bits
  - EAT_version : 16 bits (b)

FIG. 19

♦ Preamble
wake_up_flag : 1 bit
EAT_flag : 1 bit

♦ PLS-pre (3*8 bits)
EAT_version : 14 bits
EAT_robust_mode : 1 bit
EAT_N_RB : 8 bits
EAT_split_flag : 1 bit ♦ PLS-post
EAT_splitting_mode : 4 bits
EAT_splitting_SF_mode : 2 bits

FIG. 20

```
◆EAT information
automatic_tuning_flag                               : 1 bit
num_EAS_messages                                    : 7 bits
If (automatic_tuning_flag == 0x01) {
   automatic_tuning_info
     (
       automatic_tuning_channel_number              : 8 bits
       automatic_tuning_DP_id                       : 8 bits
       automatic_tuning_service_id                  : 16 bits
     )
}
For (m=0; m<num_EAS_messages; m++) {
   EAS_message_id                                   : 32 bits
   EAS_IP_version_flag                              : 1 bit
   EAS_EAT_indicator                                : 1 bit
   EAS_IP_indicator                                 : 1 bit
   EAS_TS_indicator                                 : 1 bit
   EAS_NRT_indicator                                : 1 bit EAS_message_encoding_type                        : 3 bits
   if (EAS_EAT_indicator == 0x01) {
      EAS_message_length /* N */                    : 12 bits
      EAS_message_bytes()                           : 8*N bits
   }
   if (EAS_IP_indicator == 0x01) {
      DP_id                                         : 8 bits
      IP_address                                    : 32/128 bits
      UDP_port_num                                  : 16 bits
   }
   if (EAS_TS_indicator == 0x01) {
      DP_id                                         : 8 bits
      PID                                           : 13/14 bits
   }
   if (EAS_NRT_indicator == 0x01) {
      EAS_NRT_DP_id                                 : 8 bits
      EAS_NRT_service_id                            : 16 bits
   }
}
```

FIG. 21

```
◆ EAT information
automatic_tuning_flag                              : 1 bit
num_EAS_messages                                   : 7 bits
If (automatic_tuning_flag == 0x01) {
  automatic_tuning_info
  (
    automatic_tuning_channel_number                : 8 bits
    automatic_tuning_DP_id                         : 8 bits
    automatic_tuning_service_id                    : 16 bits
  )
}
For (m=0; m<num_EAS_messages; m++) {
  EAS_message_id                                   : 32 bits
  EAS_IP_version_flag                              : 1 bit
  EAS_EAT_indicator                                : 1 bit
  EAS_IP_indicator                                 : 1 bit
  EAS_TS_indicator                                 : 1 bit
  EAS_NRT_indicator                                : 1 bit EAS_message_encoding_type                        : 3 bits
  if (EAS_EAT_indicator == 0x01) {
    EAS_message_length /* N */                     : 12 bits
    EAS_message_bytes()                            : 8*N bits
  }
  if (EAS_IP_indicator == 0x01) {
    DP_id                                          : 8 bits
    IP_address                                     : 32/128 bits
    UDP_port_num                                   : 16 bits
  }
  if (EAS_TS_indicator == 0x01) {
    DP_id                                          : 8 bits
    PID                                            : 13/14 bits
  }
  if (EAS_NRT_indicator == 0x01) {
    DP_id                                          : 8 bits
    IP_address                                     : 32/128 bits
    UDP_port_num                                   : 16 bits
  }
}
```

FIG. 23
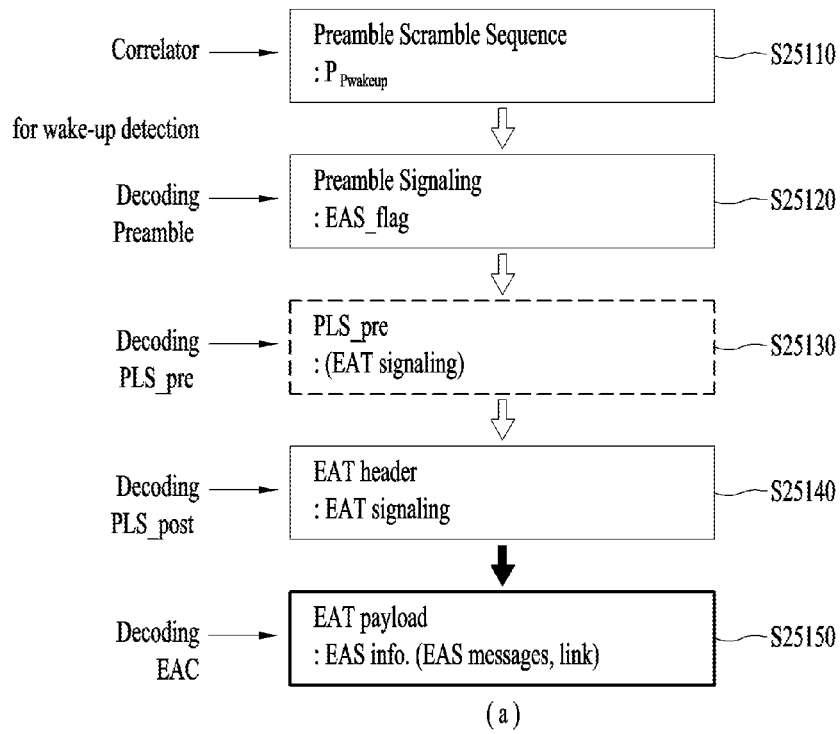
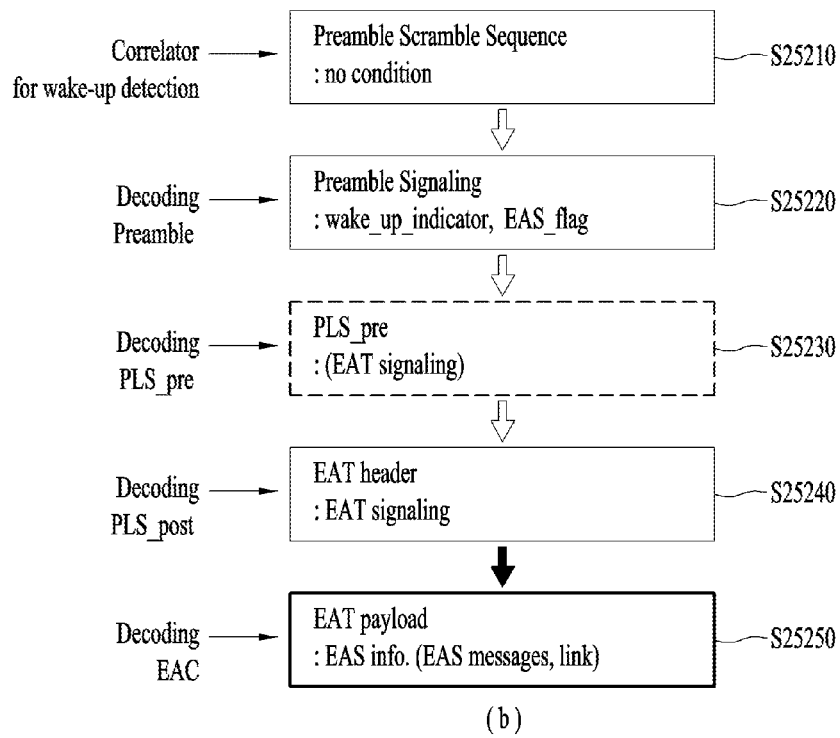

BROADCAST SIGNAL TRANSMITTING APPARATUS, BROADCAST SIGNAL RECEIVING METHOD, BROADCAST SIGNAL TRANSMITTING METHOD, AND BROADCAST SIGNAL RECEIVING APPARATUS

CROSS-REFERENCE TO RELATED APPLICATIONS

This application is a Continuation of co-pending U.S. patent application Ser. No. 14/911,414 filed on Feb. 10, 2016, which is filed as the National Phase of PCT/KR2014/007462 filed on Aug. 12, 2014, which claims the benefit under 35 U.S.C. §119(e) to U.S. Provisional Application Nos. 61/870,236 filed on Aug. 27, 2013, 61/865,628 filed on Aug. 14, 2013, 61/865,593 filed on Aug. 13, 2013 and 61/865,116 filed on Aug. 12, 2013, all of which are hereby expressly incorporated by reference into the present application.

BACKGROUND OF THE INVENTION

Field of the Invention

The present invention relates to an apparatus for transmitting broadcast signals, an apparatus for receiving broadcast signals and methods for transmitting and receiving broadcast signals.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

SUMMARY OF THE INVENTION

An object of the present invention is to provide a broadcast signal transmitting apparatus and broadcast signal receiving apparatus for transmitting and receiving a broadcast signal for a future broadcast service, and a method for transmitting and receiving a broadcast signal for a future broadcast service.

An object of the present invention is to provide an apparatus and method for transmitting broadcast signals to multiplex data of a broadcast transmission/reception system providing two or more different broadcast services in a time domain and transmit the multiplexed data through the same RF signal bandwidth and an apparatus and method for receiving broadcast signals corresponding thereto.

Another object of the present invention is to provide an apparatus for transmitting broadcast signals, an apparatus for receiving broadcast signals and methods for transmitting and receiving broadcast signals to classify data corresponding to services by components, transmit data corresponding to each component as a data pipe, receive and process the data Still another object of the present invention is to provide an apparatus for transmitting broadcast signals, an apparatus for receiving broadcast signals and methods for transmitting and receiving broadcast signals to signal signaling information necessary to provide broadcast signals.

The object of the present invention can be achieved by providing a method for transmitting a broadcast signal.

In an aspect of the present invention, provided herein is a method for transmitting a broadcast signal, the method including encoding data pipe (DP) data corresponding to each of a plurality of DPs for transmitting at least one service component, mapping the encoded DP data to data symbols to generate at least one signal frame, modulating data in the at least one signal frame using an orthogonal frequency division multiplex (OFDM) scheme, and transmitting a broadcast signal having the modulated data.

The signal frame may include a preamble generated as an emergency alert system (EAS) sequence for providing signaling for an emergency state and a signaling information region having signaling information accessible to each DP.

The signaling information region may include PLS-pre and PLS-post, the PLS-pre may include information for receiving and decoding the PLS-post, the PLS-post may include information for decoding the EAC and each DP, and the preamble and the PLS-post may each include an EAC flag indicating whether an EAC is present in the signal frame.

When the EAC flag indicates that the EAC is present in the signal frame, the EAC may be positioned behind the signaling information region, and the EAC may include an emergency alert message.

At least one DP of the signal frame may include additional information associated with the emergency alert message, and the EAC may include information about the at least one DP for transmitting the additional information associated with the emergency alert message.

The object of the present invention can be achieved by providing a method for receiving a broadcast signal.

In another aspect of the present invention, provided herein is a method for receiving a broadcast signal, the method including receiving a broadcast signal, demodulating the broadcast signal using an orthogonal frequency division multiplex (OFDM) scheme, parsing at least one signal frame from the demodulated broadcast signal, demapping DP data corresponding to each of a plurality of data pipes (DPs) for transmitting at least one service component from data symbols included in the parsed at least one signal frame, and decoding the demapped DP data.

The signal frame may include a preamble generated as an emergency alert system (EAS) sequence for providing signaling for an emergency state and a signaling information region having signaling information accessible to each DP.

The signaling information region may include PLS-pre and PLS-post, the PLS-pre may include information for receiving and decoding the PLS-post, the PLS-post may include information for decoding the EAC and each DP, and the preamble and the PLS-post may each include an EAC flag indicating whether an EAC is present in the signal frame.

The method may further include searching for a preamble generated as the emergency alert system (EAS) sequence, detecting the EAC flag included in the preamble and the PLS-post, and when the detected EAC flag indicates that the EAC is present in the signal frame, decoding the EAC positioned behind the signaling information region, wherein the EAC may include an emergency alert message.

The method may further include acquiring additional information associated with the emergency alert message using the decoded EAC, wherein the EAC may include information about the at least one DP having the additional information associated with the emergency alert message.

The object of the present invention can be achieved by providing a broadcast signal transmitting apparatus.

In another aspect of the present invention, provided herein is a broadcast signal transmitting apparatus including an encoder for encoding data pipe (DP) data corresponding to each of a plurality of DPs for transmitting at least one service component, a mapper for mapping the encoded DP data to data symbols to generate at least one signal frame, a modulator for modulating data in the at least one signal frame using an orthogonal frequency division multiplex (OFDM) scheme, and a transmitter for transmitting a broadcast signal having the modulated data.

The signal frame may include a preamble generated as an emergency alert system (EAS) sequence for providing signaling for an emergency state and a signaling information region having signaling information accessible to each DP.

The signaling information region may include PLS-pre and PLS-post, the PLS-pre may include information for receiving and decoding the PLS-post, the PLS-post may include information for decoding the EAC and each DP, and the preamble and the PLS-post may each include an EAC flag indicating whether an EAC is present in the signal frame.

When the EAC flag indicates that the EAC is present in the signal frame, the EAC may be positioned behind the signaling information region, and the EAC may include an emergency alert message.

At least one DP of the signal frame may include additional information associated with the emergency alert message, and the EAC may include information about the at least one DP for transmitting the additional information associated with the emergency alert message.

The object of the present invention can be achieved by providing a broadcast signal receiving apparatus.

In another aspect of the present invention, provided herein is a broadcast signal receiving apparatus including a receiver for receiving a broadcast signal, a demodulator for demodulating the broadcast signal using an orthogonal frequency division multiplex (OFDM) scheme, a parser for parsing at least one signal frame from the demodulated broadcast signal, a demapper for demapping DP data corresponding to each of a plurality of data pipes (DPs) for transmitting at least one service component from data symbols included in the parsed at least one signal frame, and a decoder for decoding the demapped DP data.

The signal frame may include a preamble generated as an emergency alert system (EAS) sequence for providing signaling for an emergency state and a signaling information region having signaling information accessible to each DP.

The signaling information region may include PLS-pre and PLS-post, the PLS-pre may include information for receiving and decoding the PLS-post, the PLS-post may include information for decoding the EAC and each DP, and the preamble and the PLS-post may each include an EAC flag indicating whether an EAC is present in the signal frame.

The broadcast signal receiving apparatus may further include a preamble detector for searching for a preamble generated as the emergency alert system (EAS) sequence, wherein the preamble detector may detect the EAC flag included in the preamble, the decoder may decode the PLS-post, and when the EAC flag included in the decoded PLS-post indicates that the EAC is present in the signal frame, the decoder may decode the EAC positioned behind the signaling information region, and the EAC may include an emergency alert message.

The decoder may acquire additional information associated with the emergency alert message using the decoded EAC, and the EAC may include information about the at least one DP having the additional information associated with the emergency alert message.

The present invention can process data according to service characteristics to control QoS (Quality of Services) for each service or service component, thereby providing various broadcast services.

The present invention can achieve transmission flexibility by transmitting various broadcast services through the same RE signal bandwidth.

The present invention can improve data transmission efficiency and increase robustness of transmission/reception of broadcast signals using a MIMO system.

According to the present invention, it is possible to provide broadcast signal transmission and reception methods and apparatus capable of receiving digital broadcast signals without error even with mobile reception equipment or in an indoor environment.

BRIEF DESCRIPTION OF THE DRAWINGS

FIG. 18 is a diagram illustrating a table structure of a signal frame including EAS information according to the first embodiment of the present invention.

FIG. 19 is a diagram illustrating a table structure of a signal frame including EAS information according to the first embodiment of the present invention.

FIG. 20 is a diagram illustrating an emergency alert table (EAT) according to the first embodiment of the present invention.

FIG. 21 is a diagram illustrating an emergency alert table (EAT) according to the second embodiment of the present invention.

FIG. 23 is a diagram illustrating a procedure for receiving an EAS message by a broadcast signal receiving apparatus according to the third embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
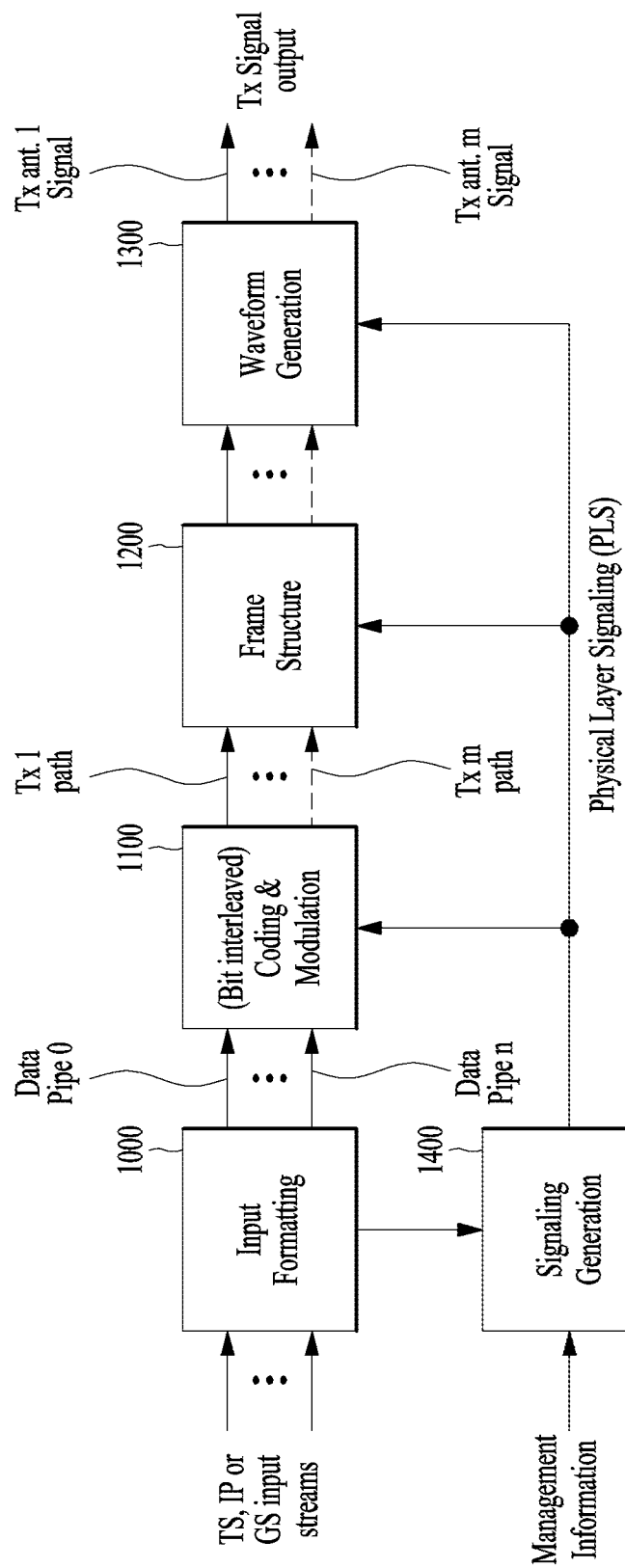
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes or DP data). The data pipe is a logical channel in the physical layer that carries service data or related metadata, which may carry one or multiple service(s) or service component(s). In addition, data transmitted through each data pipe may be called DP data. In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
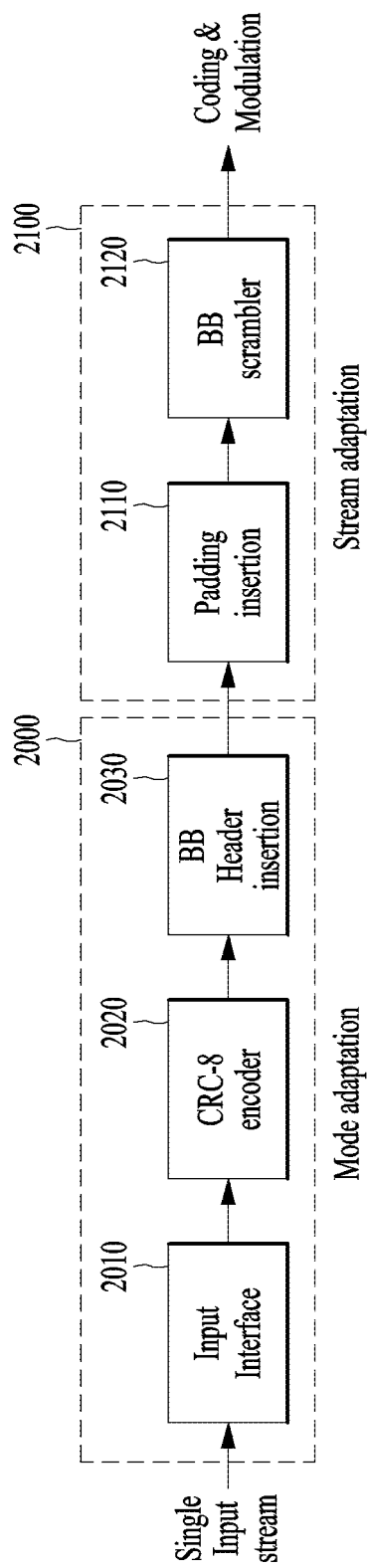
FIG. 2 illustrates an input formatting module according to an embodiment of the present invention.
Figure 3:
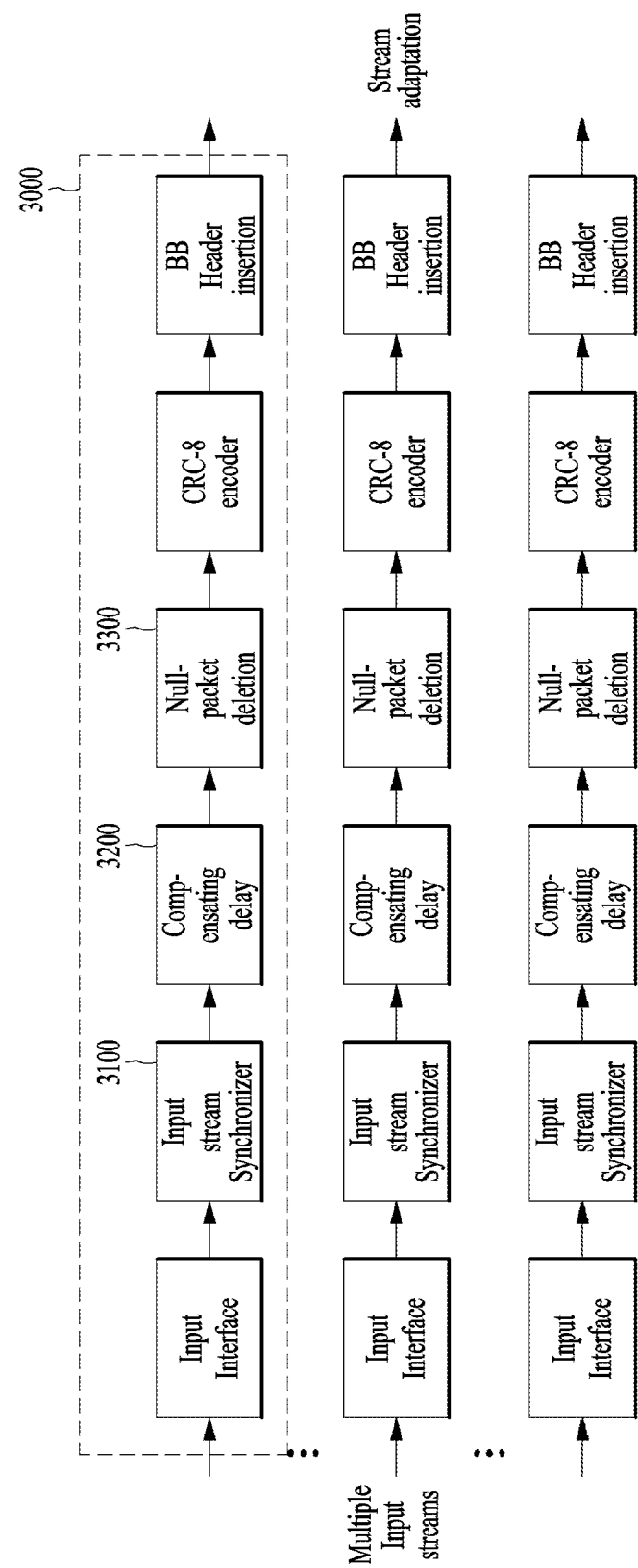
FIG. 3 illustrates an input formatting module according to another embodiment of the present invention.
Figure 4:
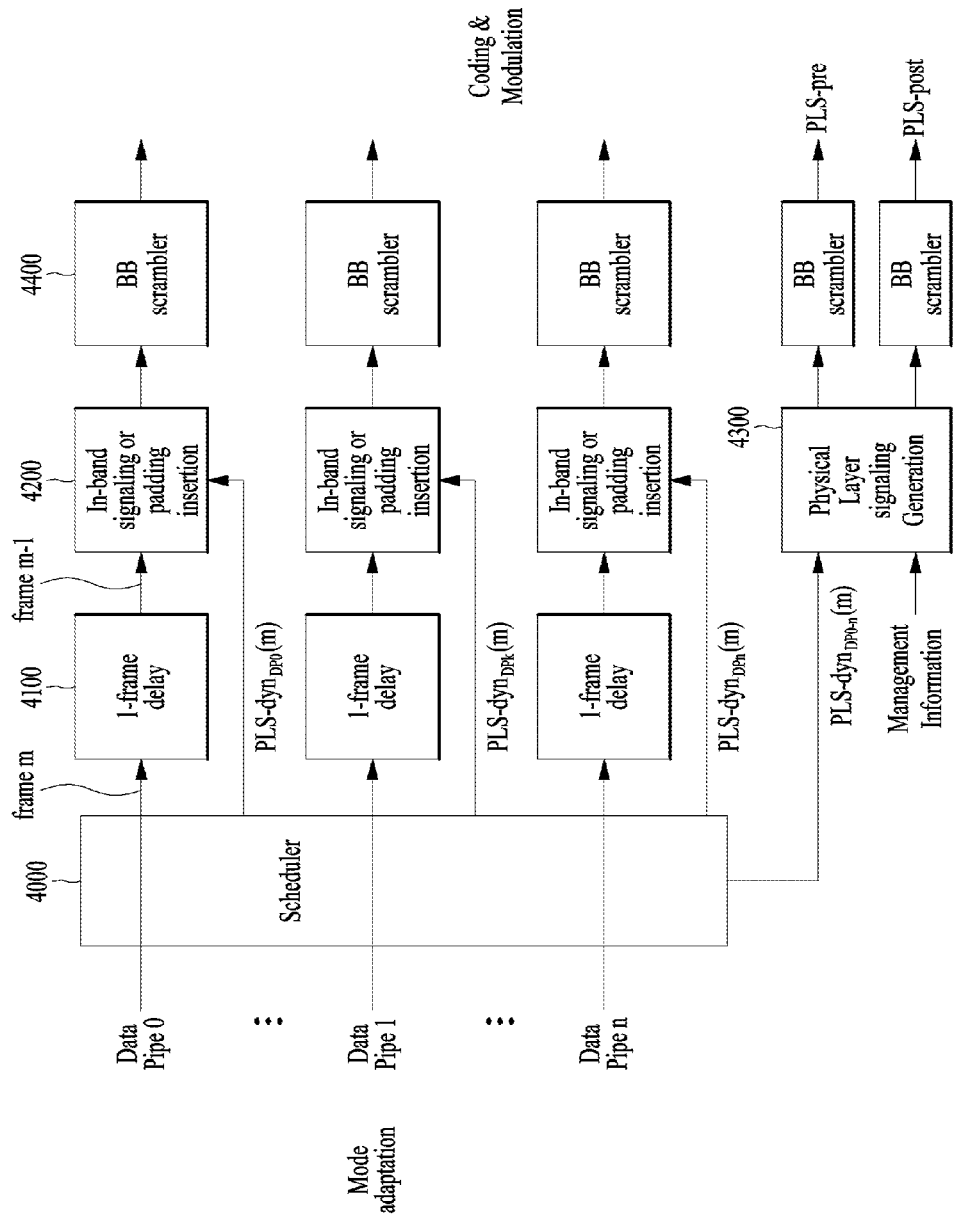
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
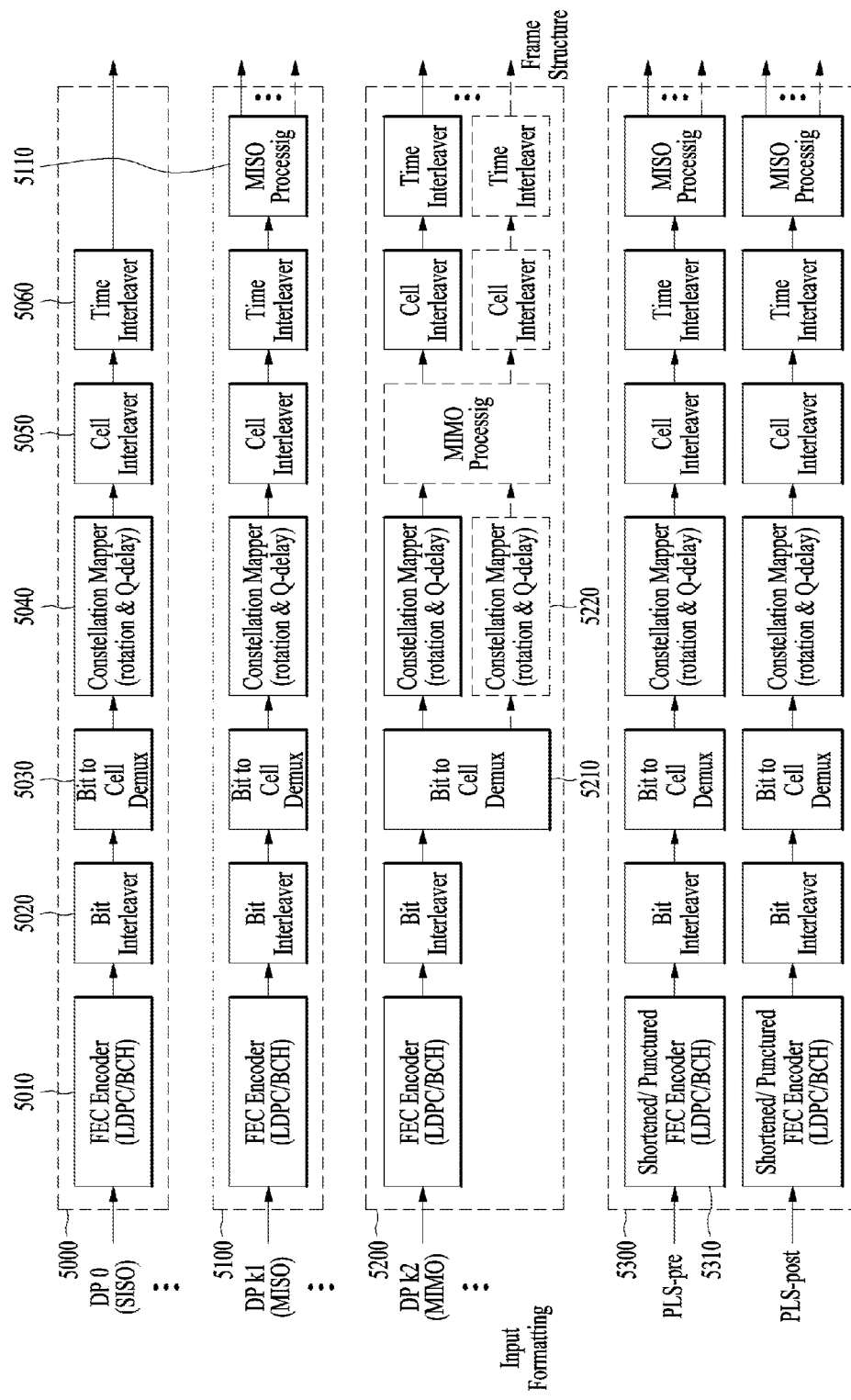
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

In addition, the bit interleaver block 5020 is located between the FEC encoder block 5010 and the constellation mapper block 5040 and can connect output bits of LDPC encoding performed by the FEC encoder block 5010 to bit positions having different reliability values and optimal values of the constellation mapper in consideration of LDPC decoding of the apparatus for receiving broadcast signals. Accordingly, the bit-to-cell demux block 5030 can be replaced by a block having a similar or equal function.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

In addition, the constellation mapper block 5040 can move constellation points on a two-dimensional plane in order to find optimal constellation points. Through this process, capacity of the coding & modulation module 1100 can be optimized. Furthermore, the constellation mapper block 5040 can perform the above-described operation using IQ-balanced constellation points and rotation. The constellation mapper block 5040 can be replaced by a block having a similar or equal function.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
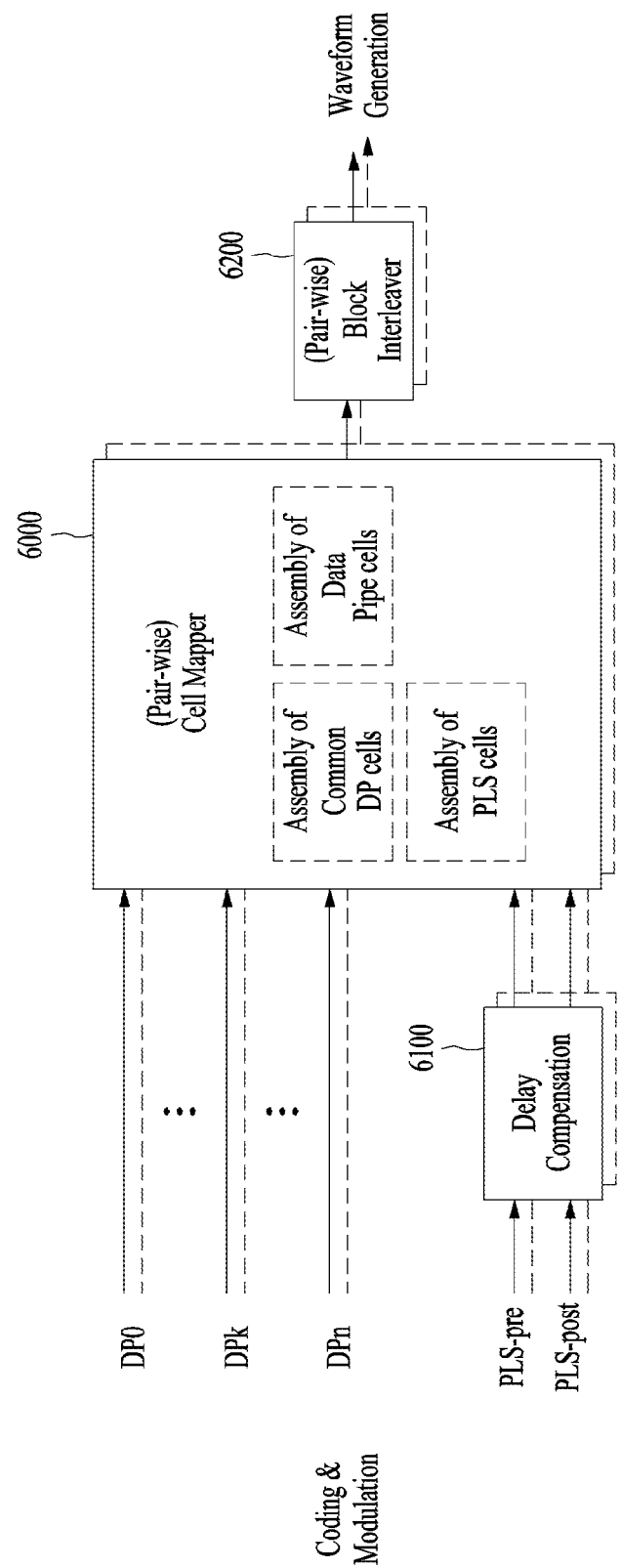
FIG. 6 illustrates a frame structure module according to an embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

As illustrated in FIG. 6, the frame structure module can output at least one signal frame to the waveform generation module.

Figure 7:
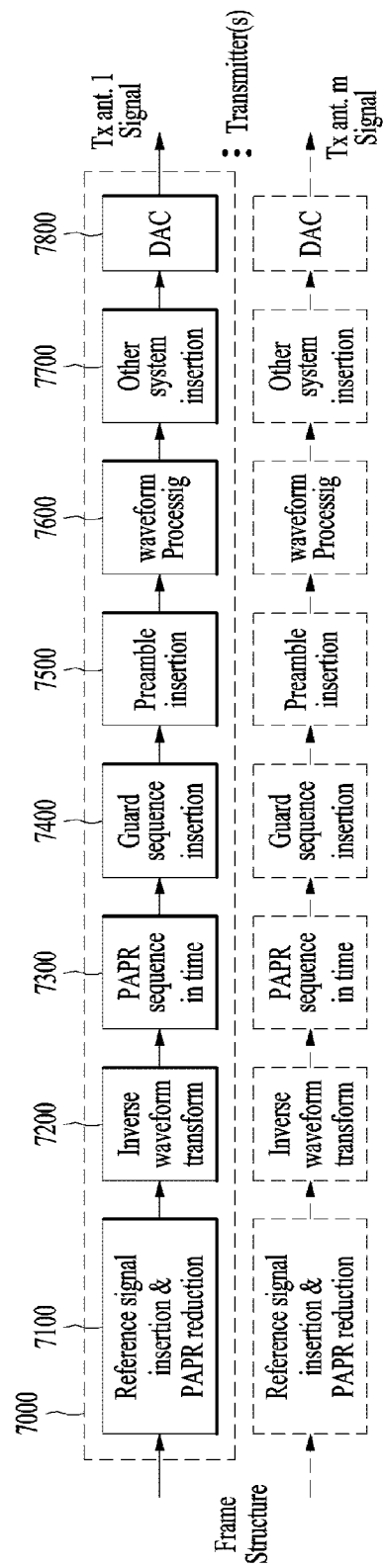
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
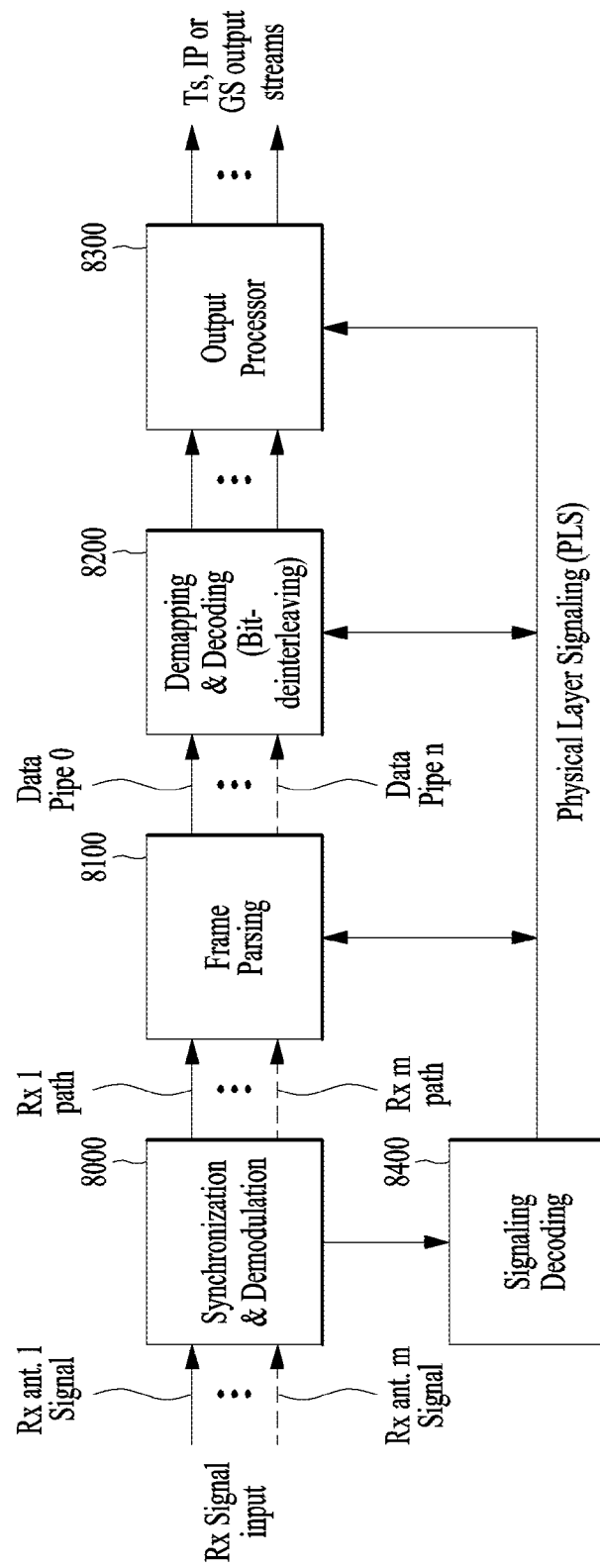
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
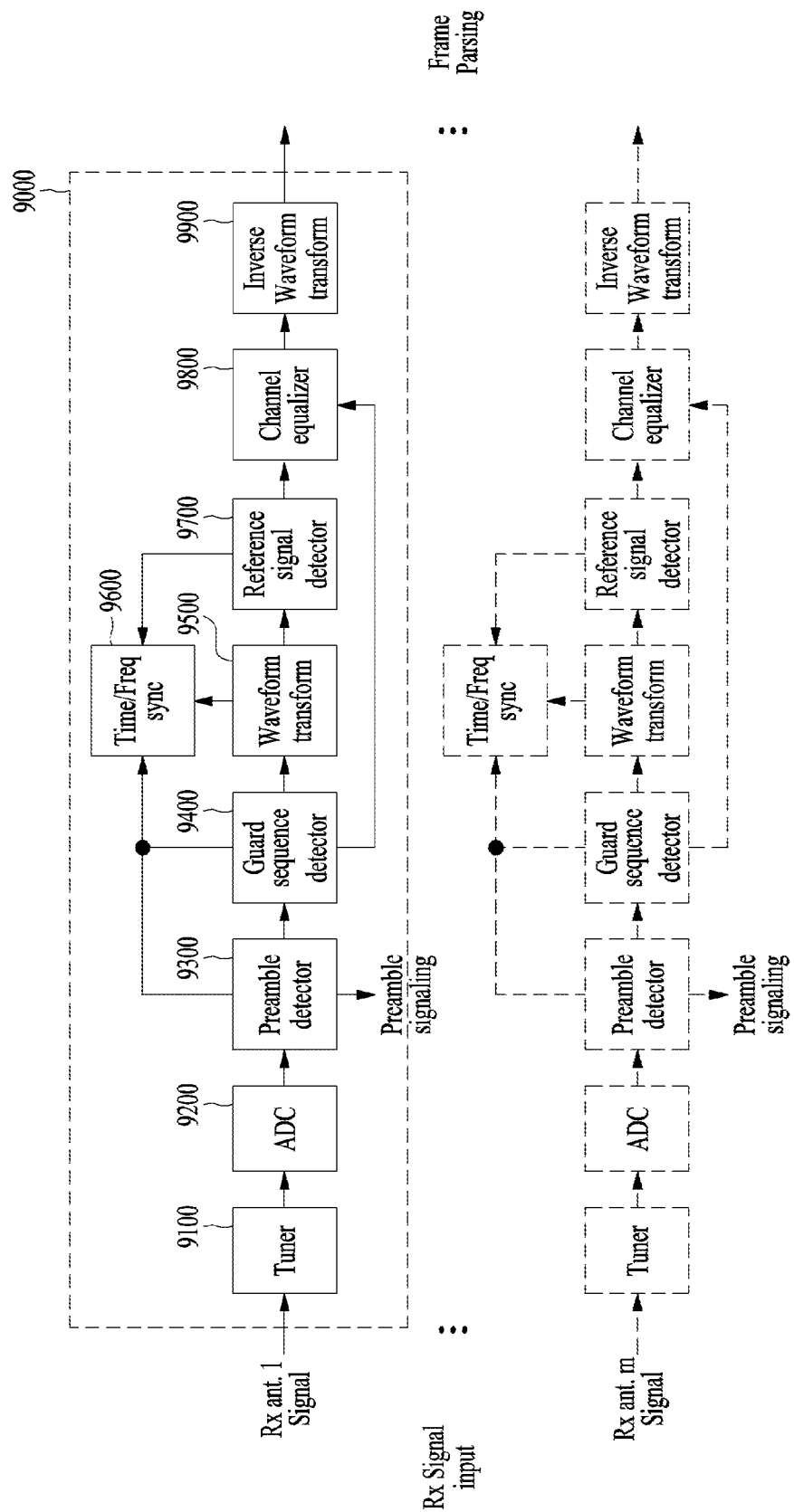
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
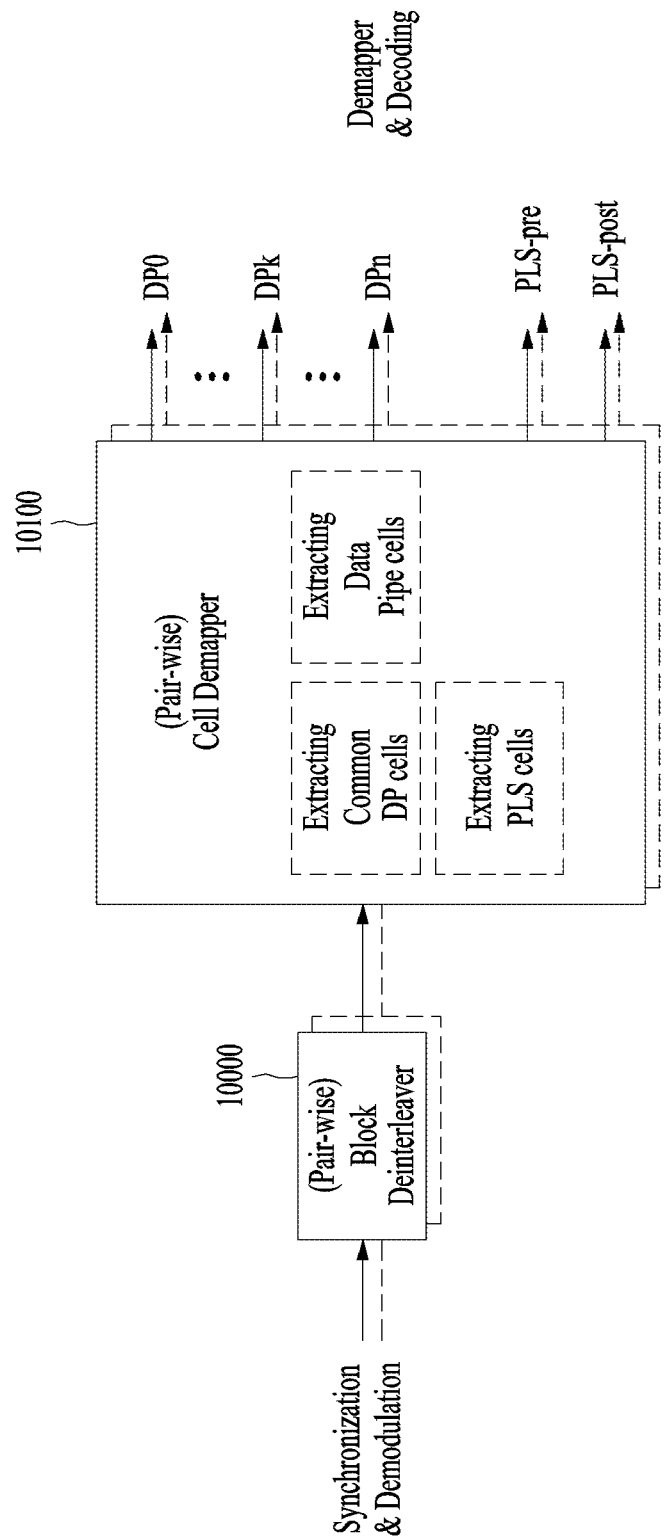
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block deinterleaver 10000 and at least one cell demapper 10100.

The block deinterleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block interleaver 10000 can process two consecutive pieces of data as a pair for each input path. Accordingly, the block interleaver 10000 can output two consecutive pieces of data even when deinterleaving has been performed. Furthermore, the block interleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
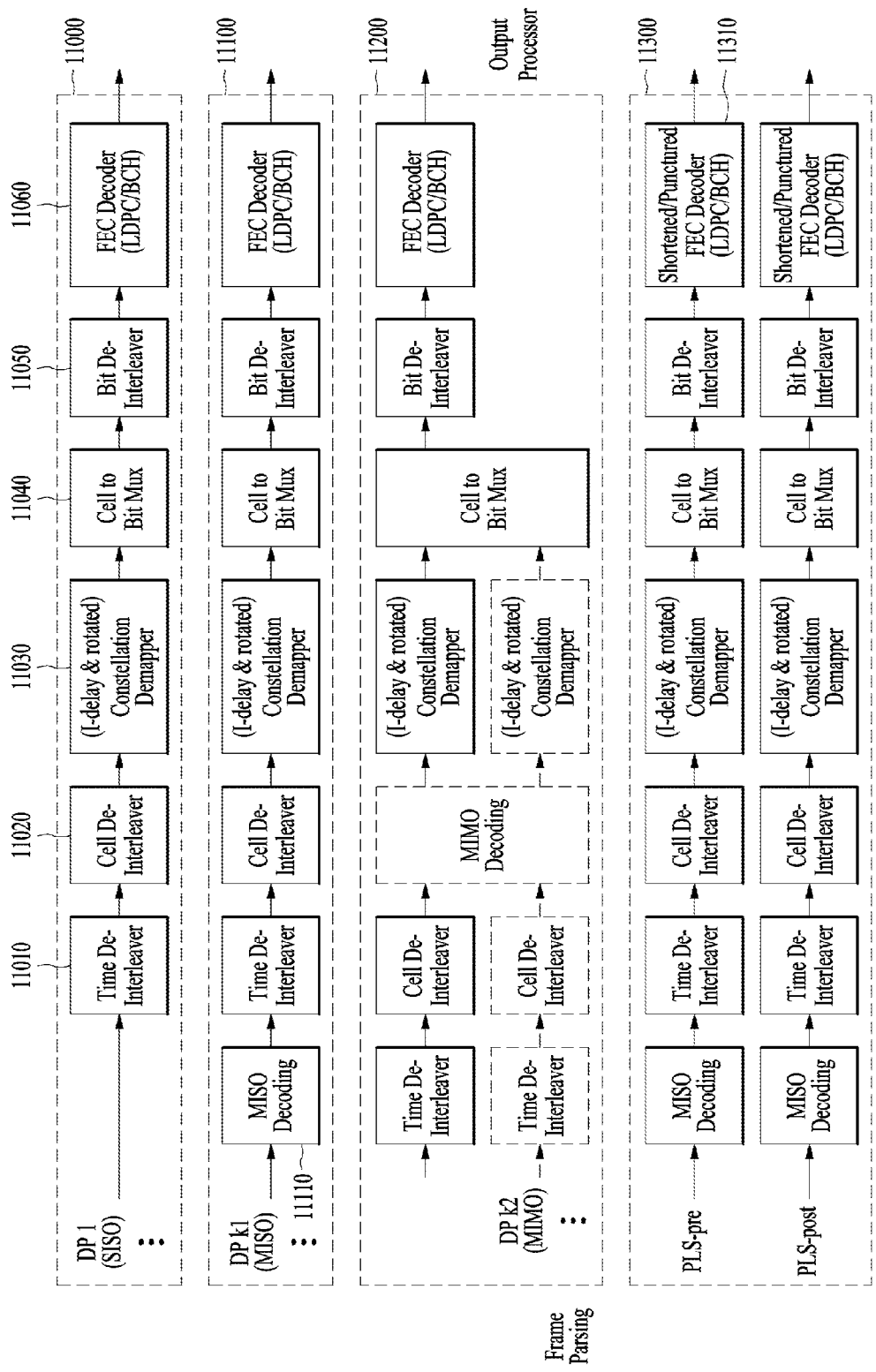
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
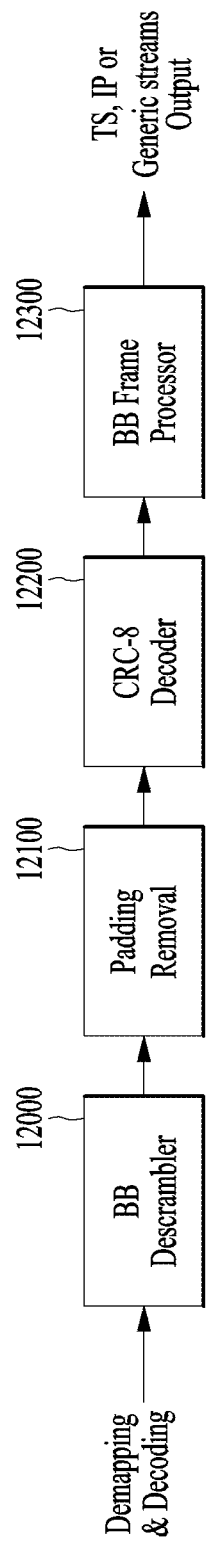
FIG. 12 illustrates an output processor according to an embodiment of the present invention.
Figure 13:
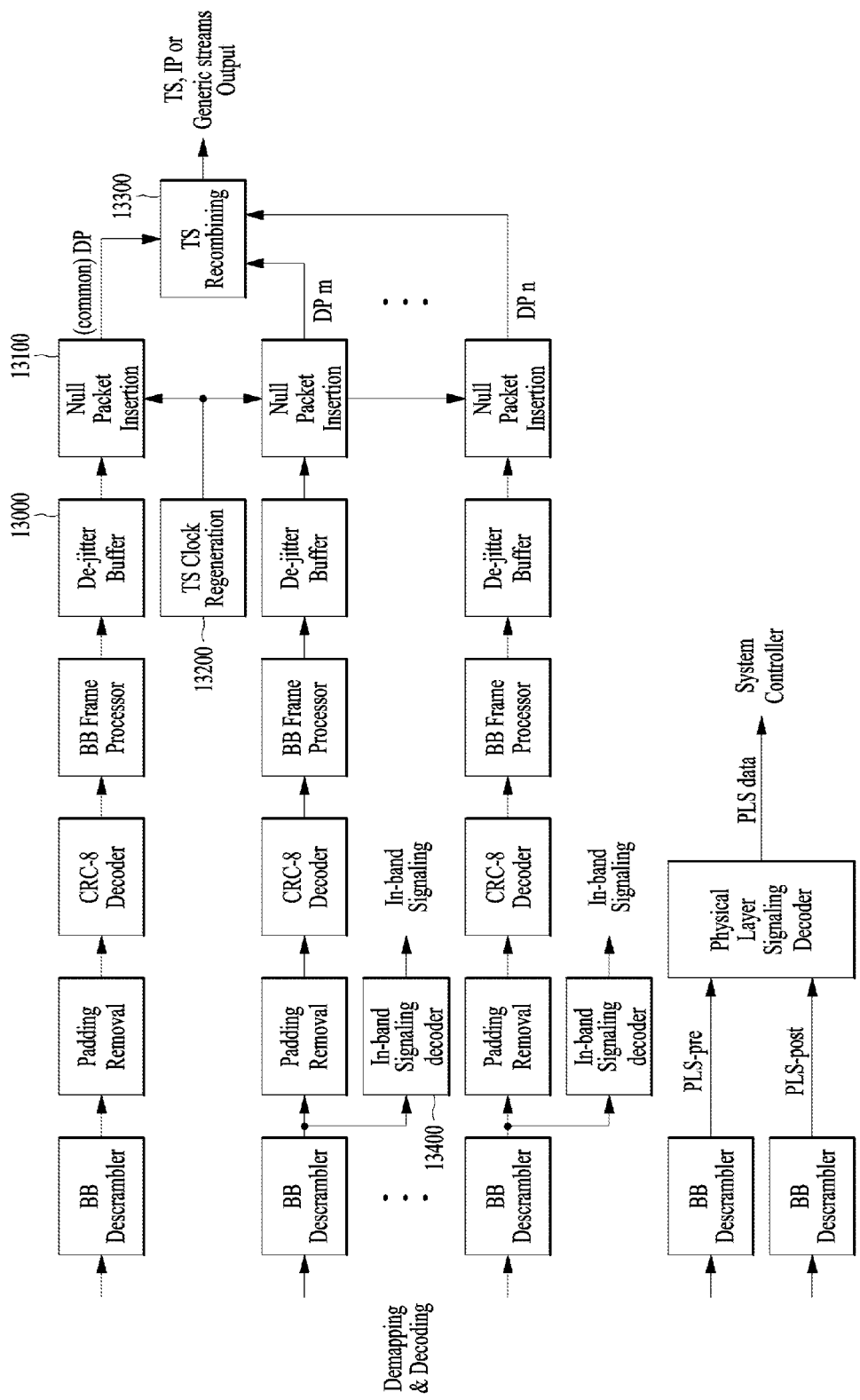
FIG. 13 illustrates an output processor according to another embodiment of the present invention.

FIGS. 12 and 13 illustrate output processors according to embodiments of the present invention.

FIG. 12 illustrates an output processor according to an embodiment of the present invention. The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention. The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de-jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
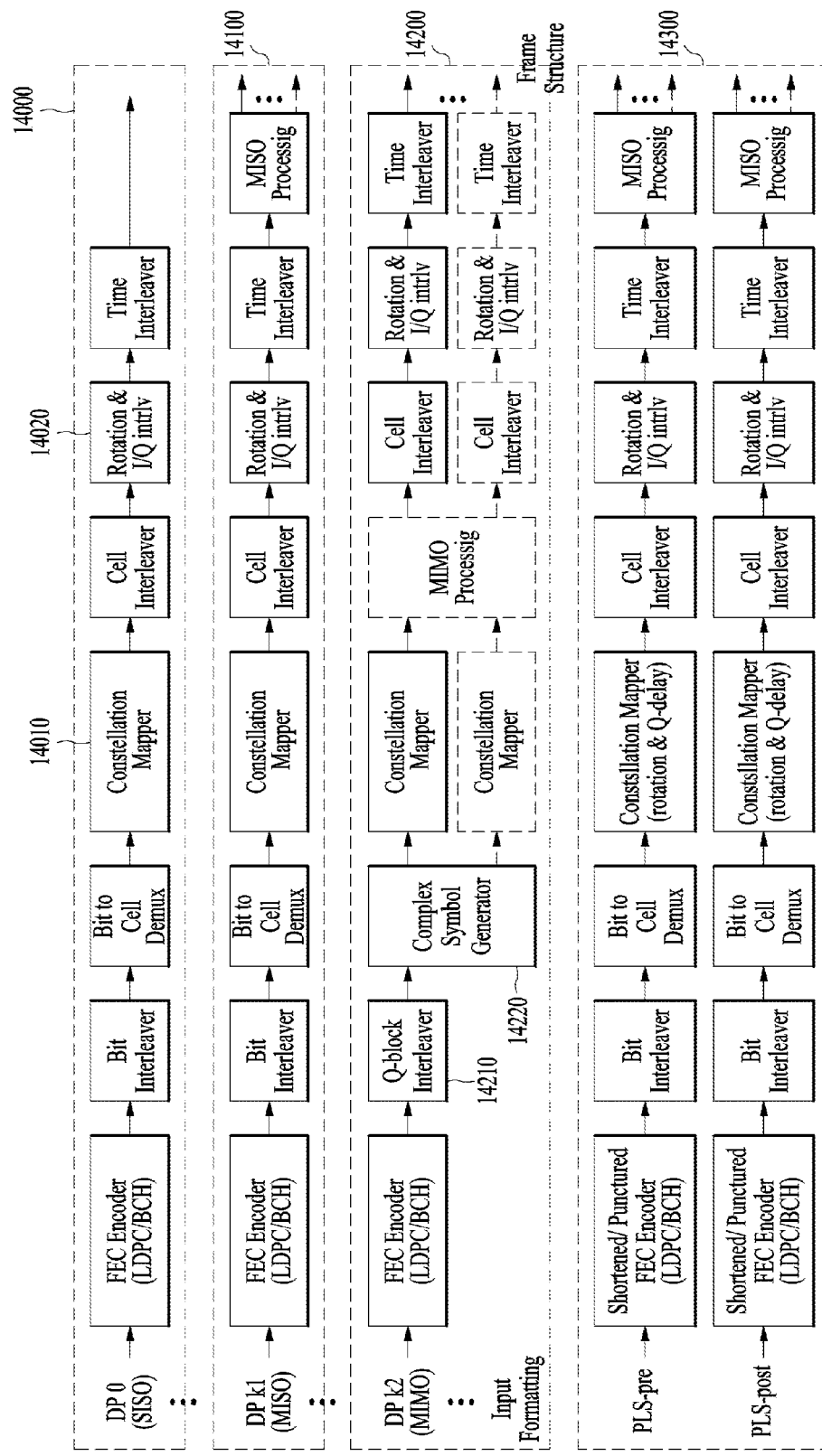
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
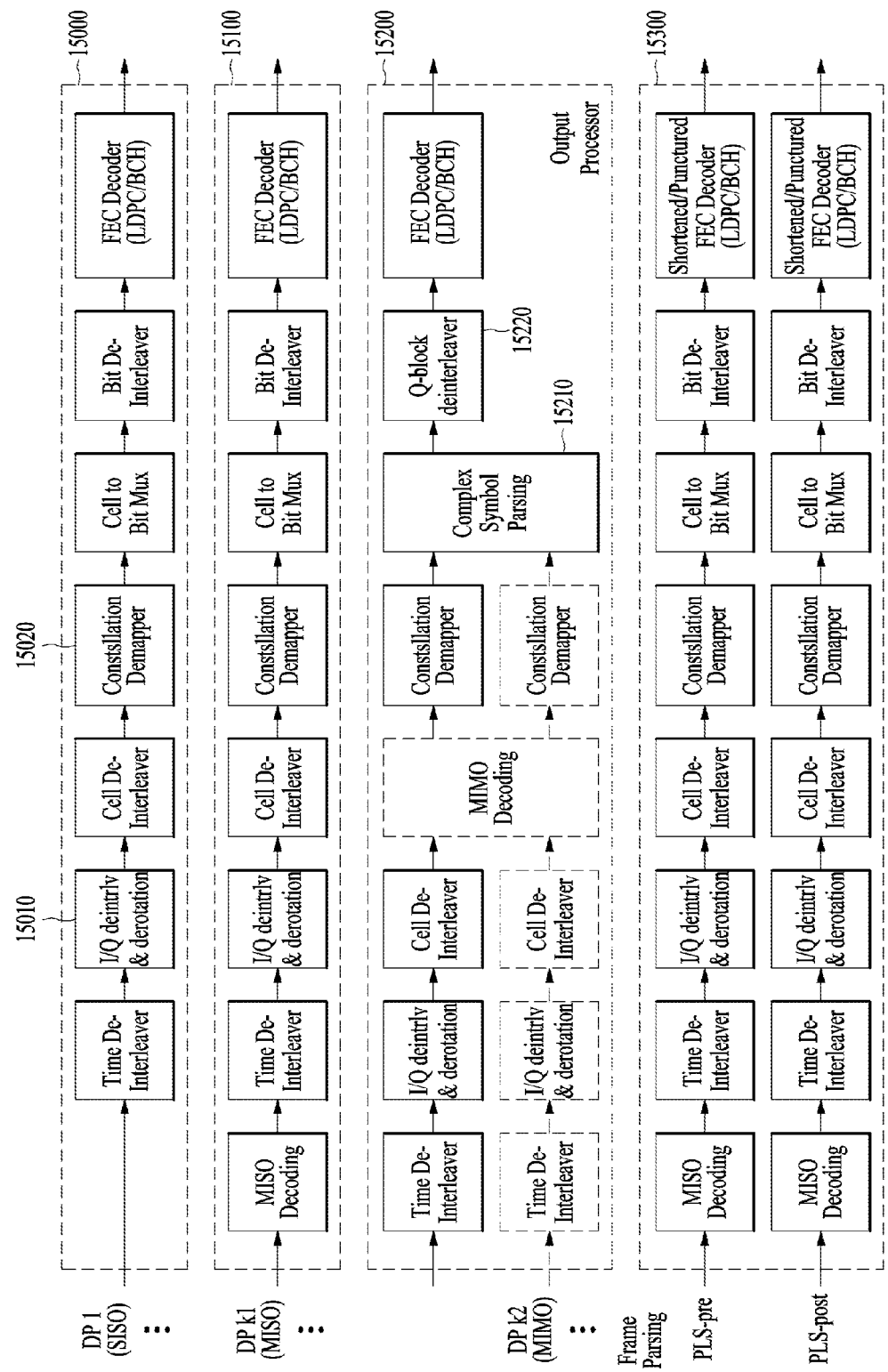
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

Hereinafter, a method for transmitting signaling information associated with emergency alert channel (EAC) in order to acquire the EAC by a broadcast signal receiving apparatus when the aforementioned signal frame (or a frame) transmits the EAC will be described.

The EAC according to an embodiment of the present invention may be a data transmitting channel for transmitting an emergency alert table (EAT) including an emergency alert system (EAS) message and EAS related information. The EAC may be interpreted as including an EAT and may be interchangeably used with the term EAT. In addition, a data pipe (DP) may be represented by a data transmission channel.

DPs for EAT, EAT, and EAC shown in signal frames of each drawing may be data transmitting channels that may be interpreted in the same meaning. Accordingly, a description will be given in terms of the EAC. However, for consistency with a description of drawings, expressions in brackets are used together. For example, EAC (DP for EAT), EAC (EAT), EAC (EAC), and so on may have the same meaning.

The EAT may include an EAT-header and an EAT-payload. The EAT-header may include control signals for receiving the EAT-payload among EAS signals. The EAT-payload may include an EAS message and EAS related information. The EAC-header (EAT header) may a data transmitting channel for transmitting the EAT-header. The EAC-payload (EAT payload) may be a data transmitting channel for transmitting the EAT-payload. The EAC may include an EAC-header (EAT header) and an EAC-payload (EAT payload).

A signaling information region (physical layer signaling channel (PLSC)) may be a data transmitting channel for transmitting physical layer signaling data. The signaling information region (PLSC) may include PLS-pre (PLS pre) and PLS-post (PLS post).

In addition, with regard to a description of the present invention, a slight difference may be flexibly interpreted.

According to a first embodiment of the present invention, a control signal associated with transmission of a corresponding signal when an emergency alert system (EAS) is transmitted in a broadcast network is defined. According to the first embodiment of the present invention, in a signal frame structure, an EAS message and a control signal may be effectively transmitted. The first embodiment of the present invention will be described below with reference to FIGS. 16 to 20.

With regard to a second embodiment of the present invention, a method for transmitting NRT information (additional information for EAS messages or EAS) based on IP will be described. According to the second embodiment of the present invention, a broadcast signal transmitting apparatus may divide an EAS message into EAT, IP, and TS and may transmit the EAS message. The second embodiment of the present invention will be described below with reference to FIG. 21.

With regard to a third embodiment of the present invention, a method for transmitting and receiving an EAS message will be described below. According to the third embodiment of the present invention, the broadcast signal transmitting apparatus may more robustly transmit the EAS message. In addition, a broadcast signal receiving apparatus may search for a preamble and receive the EAS message and may independently receive the EAT from a DP or a PLS. The third embodiment of the present invention will be described below with reference to FIGS. 22 to 27.

With regard to a fourth embodiment of the present invention, an additional embodiment for a wake-up process, repetition or split, and EAS scheduling will be described. According to the fourth embodiment of the present invention, the broadcast signal transmitting apparatus may more robustly transmit the EAS message. In addition, a broadcast signal receiving apparatus may omit a procedure for checking a preamble in a signal frame or a super frame, thereby reducing power consumption. The fourth embodiment of the present invention will be described below with reference to FIGS. 28 to 39.

Figure 16:
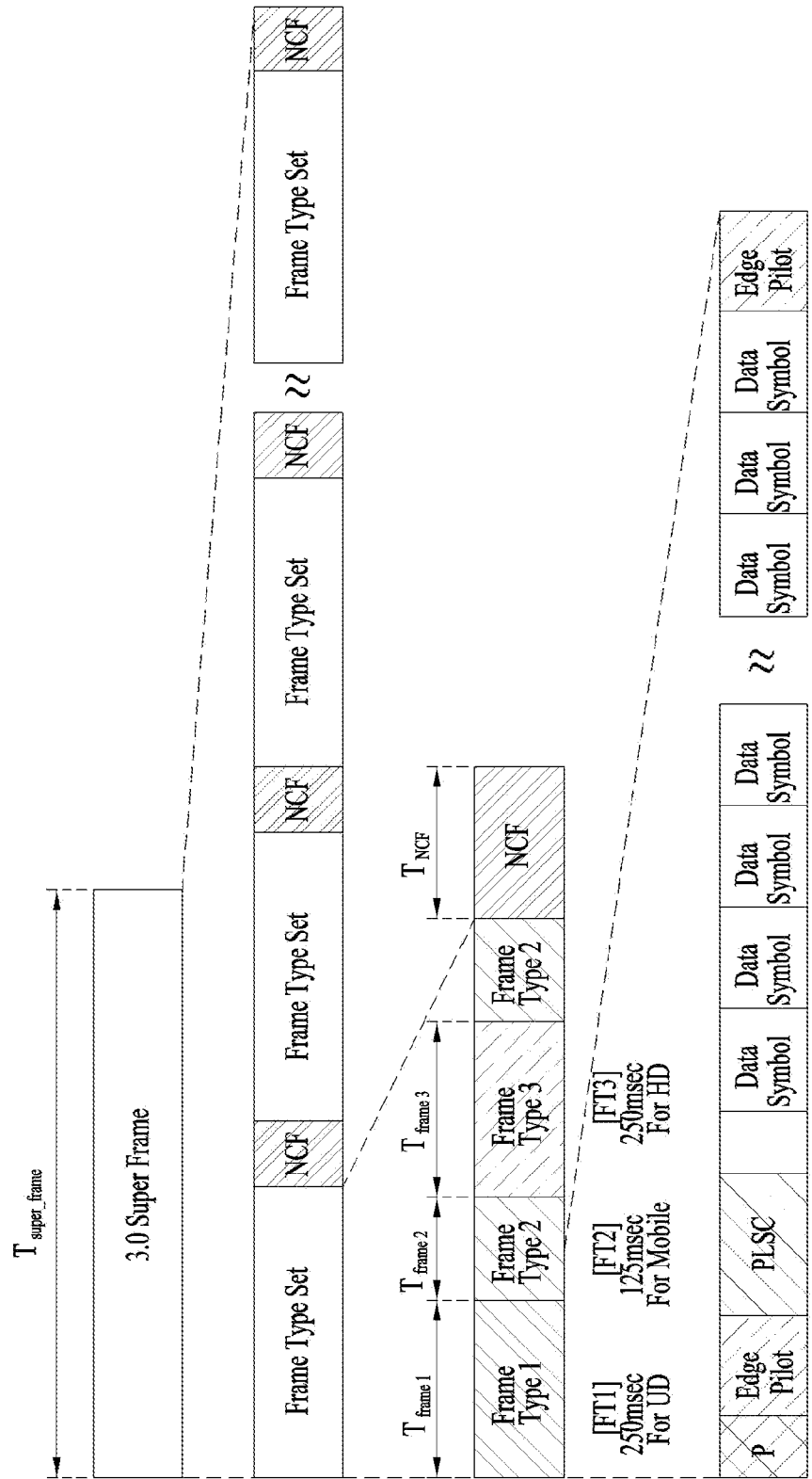
FIG. 16 is a diagram illustrating a structure of a super frame transmitted by a broadcast signal transmitting apparatus according to the first embodiment of the present invention.

FIG. 16 is a diagram illustrating a structure of a super frame transmitted by a broadcast signal transmitting apparatus according to the first embodiment of the present invention.

FIG. 16 illustrates a structure of a super frame according to an embodiment of the present invention. The super frame may be a highest signal frame. The super frame may be continuously transmitted on the time axis through an RF channel and may have a length of a predetermined time unit. In FIG. 16, the length of the super frame may be represented by $T_{super\_frame}$.

The super frame may include at least one frame type set and next coming frame (NCF). The frame type set may be a signal frame unit including at least one signal frame having a specific signal frame type. The frame type set may include the NCF. The NCF may include a communication signal and another arbitrary broadcast signal except for a predetermined signal frame type. The number of frame type sets in the super frame may be changed in some embodiments.

For example, the super frame may have one frame type set. In this case, frame structures of the super frame and the frame type set may be the same and the frame type set may be considered as a super frame.

For example, the super frame may include 8 frame type sets. The frame type set may also be referred to as a frame repetition unit (FRU). The FRU may be a basic multiplexing unit for time division multiplexing (TDM) of a signal frame. The FRU may be repeated 8 times in one super frame.

The frame type set may include at least one signal frame or FEF.

The signal frame may be a predetermined unit of information transmitted in communication, broadcast, etc. The signal frame may be a physical layer time slot that is started with a preamble and ended with a frame edge symbol.

According to an embodiment of the present invention, three profiles, a base profile, a handheld profile, and an advanced profile may be provided. Each profile may be defined by a broadcast signal transceiving scenario for providing services corresponding to different reception environments.

Accordingly, the broadcast signal transmitting apparatus may differently process data corresponding to the respective profiles and a structure of the broadcast signal transmitting apparatus may be changed according to a profile corresponding to data to be transmitted. In addition, the broadcast signal receiving apparatus may receive data corresponding to each profile and process the data using an inverse procedure of a processing procedure of the corresponding broadcast signal transmitting apparatus.

The base profile may correspond to a broadcast signal transceiving scenario for providing a service for a fixed receiving apparatus connected to an antenna. The handheld profile may correspond to a broadcast signal transceiving scenario for providing a service for a portable or vehicle device that operates using battery power. The advanced profile may correspond to a broadcast signal transceiving scenario for providing a service of an ultra high definition television (UHDTV), etc.

As shown in the drawing, a signal frame according to an embodiment of the present invention may transmit data for any one of a base profile, a handheld profile, and an advanced profile. That is, data corresponding to each profile may be transmitted in a signal frame unit, and a broadcast signal receiving apparatus may identify each profile according to a received signal frame and acquire a broadcast signal appropriate for the corresponding broadcast signal receiving apparatus. In addition, one frame type set may include a plurality of signal frames corresponding to the same type of profile, which may be changed according to a designer's intention.

A future extension frame (FEF) may be a preliminary frame included in a frame type set for advancement of a future system. The frame type set may optionally include the FEF and the FEF may be positioned in a last portion of the frame type set.

FIG. 16 illustrates an embodiment in which at least one of frame type set includes four signal frames. A first signal frame may have data for a base profile used in an ultra high definition (UD) apparatus and its length may be represented by $T_{frame1}$. A second signal frame may have data for a handheld profile used in a mobile apparatus and its length may be represented by $T_{frame2}$. A third signal frame may have data for an advanced profile used in a high definition television (HDTV) and its length may be represented by $T_{frame3}$. A fourth signal frame may be the same as a second signal frame.

A profile of data owned by each signal frame in the frame type set may be changed in some embodiments. In addition, the number of signal frames in the frame type set may be changed in some embodiments.

For example, a first signal frame may have data for a base profile, a second signal frame may have data for a handheld profile, and a third signal frame may be a future extended frame (FEF).

As illustrated in a lower port of the drawing, each signal frame may include a preamble P, an edge pilot, a signaling information region (PLSC), and consecutive data symbols.

A preamble according to an embodiment of the present invention may include information or basic transmitting parameters for identifying each signal frame. The signaling information region (PLSC) may include the aforementioned PLS-pre and PLS-post, which will be described in detail. In addition, data symbols may include the aforementioned DPs.

As described above, the signal frame according to an embodiment of the present invention may include EAS information. Hereinafter, a structure of the signal frame for effectively transmitting the EAS information will be described.

Figure 17:
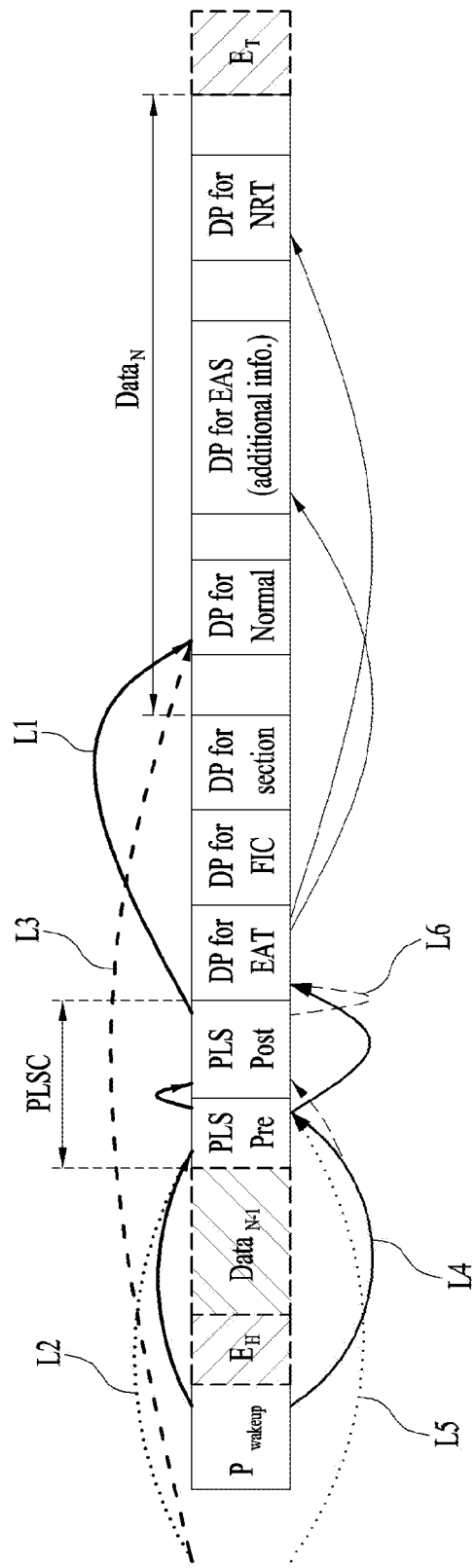
FIG. 17 is a diagram illustrating a structure of a signal frame transmitted by a broadcast signal transmitting apparatus according to the first embodiment of the present invention.

FIG. 17 is a diagram illustrating a structure of a signal frame transmitted by a broadcast signal transmitting apparatus according to the first embodiment of the present invention.

FIG. 17 illustrates the structure of the signal frame for effectively transmitting an emergency alert system (EAS) in a broadcast network by the broadcast signal transmitting apparatus.

To this end, the signal frame may include a preamble for generating an emergency alert system (EAS) sequence for providing signaling for an emergency state and a signaling information region (physical layer signaling channel (PLSC) including signaling information accessible to each DP.

The preamble may permit rapid futurecast universal terrestrial broadcast (UTB) system signal detection and provide basic transmission parameters for effective transmission of signals. The preamble may be positioned in a front portion of each signal frame and may be a pilot symbol with a fixed length, for transmitting basic physical layer signaling (PLS) data.

The preamble may include information associated with basic information about a structure of a signal frame, system signal discovery, transmission of a basic system parameter, initial acquisition of synchronization offset by a receiver, and signaling of an emergency alert system (EAS) event. The EAS may refer to a system for transmitting an emergency alert message. Hereinafter, the EAS information, EAS related information, or the like may be interpreted as including emergency alert message and control information associated therewith. The preamble may include a combination of preamble data and a scramble sequence or a combination of arbitrary sequences.

The broadcast signal transmitting apparatus may wake up the broadcast signal receiving apparatus using the preamble. Wake up may refer to conversion of a broadcast signal receiving apparatus in a power-off mode or a standby mode to a mode for receiving and processing data from the power-off mode or the standby mode for receiving and processing data such as EAS. The standby mode may refer to a mode in which the broadcast signal receiving apparatus performs only a required function in order to minimize power consumption. Hereinafter, information indicating whether the broadcast signal receiving apparatus is woken up may be referred to as a wake_up_indicator.

The broadcast signal transmitting apparatus may determine the wake_up_indicator using two methods.

A first method is a method for setting a scramble sequence of a preamble as the wake_up_indicator. The broadcast signal transmitting apparatus may generate the preamble as an EAS sequence for providing signaling for an emergency state. Hereinafter, a preamble ($P_{wakeup}$) generated as an EAS sequence and a preamble P that is not generated as an emergency alert system (EAS) sequence are differentiated and a detailed description will be given. In addition, when the preamble ($P_{wakeup}$) generated as an EAS sequence is generated, the wake up indicator may refer to "ON", and when the preamble P that is not generated as an EAS sequence is transmitted, the wake up indicator may refer to "OFF".

A second method is a method for setting a wake_up_flag as preamble data as the wake_up_indicator. When the wake_up_flag is "ON", the wake up indicator may indicate "ON".

Hereinafter, the present invention will be described in terms of the case in which a broadcast signal transmitting apparatus transmits a wake up indicator using the first method, but can be applied to the second method in the same way.

When the wake up indicator indicates "ON", this means that an EAC is present in a current signal frame or super frame or an EAC is present in a next signal frame or super frame. In addition, the wake up indicator may indicate whether a broadcast signal receiving apparatus is converted to an active mode from a power-off mode or a standby mode.

As described above, when the broadcast signal transmitting apparatus indicates the broadcast signal receiving apparatus to be woken up, the broadcast signal receiving apparatus may search for a preamble generated as an emergency alert system (EAS) sequence or a wake_up_flag. Then, the broadcast signal receiving apparatus may receive the EAS message and transmits the EAS message to a user.

The preamble may include two types of preambles (normal preamble and robust preamble) for providing different levels of robustness. The normal preamble may be used in a base profile and an advanced profile. The robust preamble may be used in a handheld profile. The robust preamble may have higher detection and decoding performance than the normal preamble.

The normal preamble may include a first normal preamble $P_{normal}$ and a second normal preamble $P_{normal,wakeup}$. The first normal preamble may be a preamble of a signal frame that does not include EAS information. The second normal preamble may be a preamble that is used when EAS information is included in a current signal frame or a super frame included in the current signal frame.

The robust preamble may be a preamble that is designed to detect and decode a preamble symbol in a severe channel condition such as mobile reception. The robust preamble may be a type of repetition of normal preambles and may include the same signaling field having different signaling scrambler sequences (SSSs).

The robust preamble a first robust preamble $P_{robust}$ and a second robust preamble $P_{robust,wakeup}$. The first robust preamble may be a preamble of a signal frame that does not include EAS information. The second robust preamble may be a preamble that is used when EAS information is included in a current signal frame or a super frame to which the current signal frame belongs.

Hereinafter, the preamble ($P_{wakeup}$) may be interpreted as including a second normal preamble $P_{normal,wakeup}$ and a second robust preamble $P_{robust,wakeup}$ that are generated as an emergency alert system (EAS) sequence for providing signaling for an emergency state. In addition, the preamble P may be interpreted as including the first normal preamble $P_{normal}$ and the first robust preamble $P_{robust}$ that are not generated as an emergency alert system (EAS) sequence.

The signaling information region (PLSC) may be a symbol including signaling information that is accessible to each DP in a signal frame. The signaling information region (PLSC) may include PLS-pre (PLS pre) and PLS-post (PLS post). The PLS-pre (PLS pre) and the PLS-post (PLS post) may include information associated with transmission of a signal frame or super frame and control information associated with an EAS. The PLS-pre (PLS pre) may include information for receiving and decoding the PLS-post (PLS post) and the PLS-post (PLS post) may include information for decoding the EAC (DP for EAT) and each DP. However, the present invention is not limited thereto and the PLS-pre (PLS pre) may include information for decoding EAC (DP for EAT) and each DP. The preamble ($P_{wakeup}$) and the PLS-post (PLS post) may each include an EAC flag indicating whether the EAC (DP for EAT) is present in the signal frame or the super frame.

The signal frame may further include a header edge pilot (EH), an EAC (DP for EAT), a data symbol, and a tail edge pilot (ET).

The header edge pilot (EH) may be a symbol positioned in a head of the signal frame and may include various information items for synchronization.

The tail edge pilot (ET) may be a symbol positioned in a tail of the signal frame and may include various information items associated with synchronization and channel estimation that are performed up to a last of the signal frame.

The EAC (DP for EAT) may be a channel for transmitting an emergency alert message a common alerting protocol (CAP) in a physical layer in order to robustly receive a broadcast signal by any broadcast receiving apparatus irrespective of a fixed broadcast receiving apparatus or a mobile broadcast receiving apparatus. In addition, the EAC (DP for EAT) may include information indicating presence of additional information and include information indicating DP or DPs for transmitting the additional information in the signal frame.

When the EAC flag indicates that the EAC (DP for EAT) including an emergency alert message is present in the signal frame or the super frame, the EAC (DP for EAT) may be positioned behind the signaling information region (PLSC). The EAC (DP for EAT) may include the emergency alert message and include information about at least one DP for transmitting additional information associated with the emergency alert message.

The EAC (DP for EAT) may include all signal frames in a super frame or an about one second period (e.g., a frame type set or a frame set). The broadcast signal transmitting apparatus may enhance robustness using the EAC (DP for EAT) and provide higher flexibility to schedule.

When a size of the emergency alert table (EAT) is small, the broadcast signal transmitting apparatus may use a repetition method or a split method within a range of an about one second period (e.g., a super frame). In addition, when the size of the emergency alert table (EAT) is large, the broadcast signal transmitting apparatus may use a split method within a range of an about one second period (e.g., a super frame or a multi super frame) or more or less. The broadcast signal transmitting apparatus may acquire diversity gain from the repetition method or the split method.

The EAC (DP for EAT) may include the EAC-header (EAT header) and an EAC-payload (EAT payload). The EAC-header and the EAC-payload may have independent MODCOD. Accordingly, the broadcast signal receiving apparatus may independently receive and process the EAC (DP for EAT) when being more robust than other data items (DP, PLSC, etc.). The MODCOD may refer to a modulation order (MOD) and a code rate (COD).

As described above, the signal frame may have data for a base profile, a handheld profile, an advanced profile, and the like and basically, the EAS signal transmitted through each profile may be independently processed from an EAS signal transmitted through other profiles.

The MODCOD for the EAC may be defined for each of the base profile, the handheld profile, and the advanced profile and each profile does not necessarily support the same MODCOD. However, each profile may support at least one MODCOD for supporting more robust reception that is defined as a robust EAC.

A data symbol (Data) may be a symbol in which the DP is stored and may include a Normal-DP (DP for Normal), an EAS-DP (DP for EAS), and an NRT-DP (DP for NRT).

The Normal-DP (DP for Normal) may be a DP for transmitting data for a normal service. The EAS-DP (DP for EAS) may be a DP that is used to transmit additional information for the EAS in real time. The NRT-DP (DP for NRT) may be a DP used to transmit the additional information for the EAS in non-real time.

At least one DP of the signal frame may have additional information associated with the emergency alert message and for example, the EAS-DP (DP for EAS) and the NRT-DP (DP for NRT) may include additional information associated with the emergency alert message.

The signal frame may further include the FIC-DP (DP for FIC) and the Section-DP (DP for section).

The FIC-DP (DP for FIC) may be a DP including information for fast acquisition of information of services included in a broadcast signal received by the broadcast signal receiving apparatus through one radio frequency (RF) channel or fast scanning of a plurality of RF channels.

A fast information channel (FIC) may be represented by a fast acquisition channel (FAC) and may perform the same operation. The fast acquisition channel (FAC)-DP may be a dedicated channel for transmitting information for permitting fast service acquisition and channel scanning.

The Section-DP (DP for section) may be a DP for transmitting service information, etc. for all transmission services together.

When the EAC flag indicates that an EAC is present in a current signal frame or a super frame, the EAC (DP for EAT) may be positioned behind the signaling information region (PLSC). When the signal frame includes the FAC-DP (DP for FAC), the EAC (DP for EAT) may be positioned between the signaling information region (PLSC) and the FAC-DP (DP for FAC).

FIG. 17 illustrates an order for processing data of a broadcast signal receiving apparatus according to the first embodiment of the present invention.

A first line L1 to a third line L3 show a procedure for receiving and processing a normal service by a broadcast signal receiving apparatus.

As shown in the first line L1, the broadcast signal receiving apparatus may detect a preamble to acquire a first position of the signal frame, decode the PLS-pre (PLS pre) based on information obtained by decoding the preamble data, and decode the PLS-post (PLS post) based on information obtained by decoding the PLS-pre (PLS pre) to acquire configuration information of the signal frame. Then, the broadcast signal receiving apparatus may decode the Normal-DP (DP for Normal) as a DP for a normal service based on the information obtained by decoding the PLS-post (PLS post).

As shown in a second line L2, when configuration information of a super frame is incorrect or has errors, the broadcast signal receiving apparatus may first decode the PLS-pre (PLS pre) without detection of the preamble. A next processing procedure may be the same as in the aforementioned first line L1. That is, the broadcast signal receiving apparatus may decode the PLS-post (PLS post) based on information obtained by decoding the PLS-pre (PLS pre) to acquire configuration information of the signal frame and decode the Normal-DP (DP for Normal) as a DP for a normal service based on information obtained by decoding the PLS-post (PLS post).

As shown in the third line L3, when the broadcast signal receiving apparatus knows configuration information of an entire super frame, the broadcast signal receiving apparatus may decode the Normal-DP (DP for Normal) as a DP for a normal service without processing of a preamble, a signaling information region (PLSC), or other DPs.

A fourth line L4 and a fifth line L5 show a broadcast signal receiving method for receiving and processing an EAS related service.

As shown in the fourth line L4, the broadcast signal receiving method may include searching for the preamble ($P_{wakeup}$) generated as an emergency alert system (EAS) sequence, detecting an EAC flag included in the preamble ($P_{wakeup}$) and the PLS-post (PLS post), and decoding the EAC (EAC) positioned behind the signaling information region (PLSC).

As shown in the fourth line L4, the broadcast signal receiving apparatus may detect the preamble ($P_{wakeup}$) generated as an EAS sequence for providing signaling for an emergency state to acquire an initial position of the signal frame. In addition, the broadcast signal receiving apparatus may decode the preamble to acquire information indicating that a corresponding preamble is generated as an EAS sequence for providing signaling for the emergency state. In addition, the broadcast signal receiving apparatus may decode the preamble data to acquire information of the EAC flag indicating whether an EAC is present in the signal frame.

When the broadcast signal receiving apparatus acquires information indicating that the preamble is generated as an EAS sequence for providing signaling for an emergency state, this may mean that the preamble indicates that the EAC is present in a current signal frame or super frame or present in a next signal frame or super frame. Accordingly, the broadcast signal receiving apparatus may continuously search for whether EAS information is present in the current or next signal frame.

When an EAC flag indicates the EAC is not present in a signal frame or a super frame, the EAC (DP for EAC), the EAS-DP (DP for EAS), and the NRT-DP (DP for NRT) may be omitted in FIG. 17.

When the EAC flag indicates the EAC is present in a signal frame or a super frame, the signal frame may include the EAC (DP for EAT), the EAS-DP (DP for EAS), and the NRT-DP (DP for NRT) including an emergency alert message, as illustrated in FIG. 17. In this case, the EAC (DP for EAT) may be positioned behind the signaling information region (PLSC).

As shown in the fourth line L4, the broadcast signal receiving apparatus may detect the preamble ($P_{wakeup}$) generated as an EAS sequence for providing signaling for the emergency state to acquire an initial position of a signal frame. The broadcast signal receiving apparatus may decode the PLS-pre (PLS pre) based on information obtained by decoding preamble data and decode the EAC (DP for EAT) based on information obtained by decoding the PLS-pre (PLS pre). Then, the broadcast signal receiving apparatus may acquire the emergency alert message based on information obtained by decoding the EAC (DP for EAT).

In addition, the broadcast signal receiving apparatus may decode the PLS-pre (PLS pre) based on information obtained by decoding the preamble data and decode the PLS-post (PLS post) based on information obtained by decoding the PLS-pre (PLS pre) to acquire configuration information of a signal frame. Then, the broadcast signal receiving apparatus may decode the EAC (DP for EAT) based on information obtained by decoding the PLS-post (PLS post) and acquire an emergency alert message based on information obtained by decoding the EAC (DP for EAT).

The broadcast signal receiving method may further include acquiring additional information associated with the emergency alert message using the decoded EAC. The EAC may include information about at least one DP including additional information associated with the emergency alert message.

The broadcast signal receiving apparatus may decode the EAS-DP (DP for EAS) as DP used when additional information about EAS is transmitted based on information obtained by decoding the EAC (DP for EAT) and acquire additional information associated with the emergency alert message based on information obtained by decoding the EAS-DP (DP for EAS).

In addition, the broadcast signal receiving apparatus may decode the NRT-DP (DP for NRT) as DP used when additional information for the EAS is transmitted in non-real time based on information obtained by decoding the EAC (DP for EAT) and acquire additional information associated with the emergency alert message based on information obtained by decoding the NRT-DP (DP for NRT).

As shown in the fifth line L5, the broadcast signal receiving apparatus may process the EAC in a previous signal frame and then decode the PLS-pre (PLS pre) in a current signal frame. In addition, when the EAC is not present in the previous signal frame, the broadcast signal receiving apparatus may also decode the PLS-pre (PLS pre) in the current signal frame. In this case, the broadcast signal receiving apparatus may omit procedures for detecting and decoding a preamble. Then, the broadcast signal receiving apparatus may decode the PLS-post (PLS post) or decode the EAC based on information obtained by decoding the PLS-pre (PLS pre). In addition, a subsequent procedure is the same as in the aforementioned fourth line L4.

As shown in a sixth line L6, the broadcast signal receiving apparatus may acquire information about the PLS-post (PLS post) and then decode the PLS-post (PLS post) to acquire configuration information of a signal frame. Then, the broadcast signal receiving apparatus may decode the EAC (DP for EAT) based on information obtained by decoding the PLS-post (PLS post) and acquire an emergency alert message based on information obtained by decoding the EAC (DP for EAT). In addition, a subsequent procedure is the same as in the aforementioned fourth line L4.

FIG. 18 is a diagram illustrating a table structure of a signal frame including EAS information according to the first embodiment of the present invention.

FIG. 18(a) illustrates a method for defining and transmitting a control signal associated with transmission of a signal when the broadcast signal transmitting apparatus transmits emergency alert system (EAS) information in a broadcast network, according to an embodiment of the present invention.

The specification discloses a field required by the preamble and the PLS-pre when EAS related signaling is added in the PLS-post and transmitted. A bit of each field illustrated in FIG. 18(a) may be changed in some embodiments, which may be applied below in the same way.

The preamble may include a wake_up_flag and an EAT_flag. The wake_up_flag and the EAT_flag may each be a field included in the preamble and the broadcast signal receiving apparatus may decode the preamble to acquire the wake_up_flag and the EAT_flag.

The wake_up_flag may determine whether the broadcast signal receiving apparatus is converted to an active mode from a standby mode according to a common alerting protocol (CAP) or a priority order given by a broadcast provider. When being converted to the active mode, the broadcast signal receiving apparatus may receive the EAS message and transmit the EAS message to a user. The wake_up_flag may be a field of 1 bit that is set in a transmitting end according to priority of the EAS message.

The EAT_flag may be a field indicating whether the EAC (DP for EAT) is present in a corresponding signal frame or super frame. The EAT_flag may be a field of 1 bit. The EAT_flag may prevent the signaling information region (PLSC) and the EAC (DP for EAT) from being unnecessarily processed in a field without an EAC (DP for EAT) to prevent power consumption when the broadcast signal receiving apparatus is in a standby mode. Accordingly, the EAT_flag may be positioned in a preamble because the broadcast signal receiving apparatus can the EAT_flag information through fastest or a smallest number of operations according to a structure of a signal frame.

The broadcast signal receiving apparatus may require information indicating a version, a position, a length, etc. of the EAC (DP for EAT) in order to receive the EAS message in a normal reception mode. To this end, the PLS-pre may include version information (EAT_version).

The version information (EAT_version) may be a field that has a fixed value according to a super frame and has update information of the EAC (DP for EAT). The version information (EAT_version) may be a 16-bit field. The version information (EAT_version) may include information indicating whether the PLS-post and the EAT are an old version or a new version. Accordingly, the broadcast signal receiving apparatus may prevent an unnecessary additional operation when the EAS message is not updated.

Like the EAT_flag, a specific value of the version information (EAT_version) may indicate whether the EAC (DP for EAT) is present in a corresponding signal frame or a super frame. For example, when a value of the version information (EAT_version) is "0", this may indicate that the EAC (DP for EAT) is not present in the corresponding signal frame or super frame. When a value of the version information (EAT_version) is a value except for "0", this may indicate that the EAC (DP for EAT) is present in the corresponding signal frame or super frame and the corresponding signal frame or super frame may further include version information, etc. Accordingly, the broadcast signal receiving apparatus may decode the version information (EAT_version) to acquire information indicating whether the EAC (DP for EAT) is present in a corresponding signal frame or superframe without repeatedly decoding a preamble.

The PLS-post may include additional signaling information for receiving the EAC (DP for EAT). For example, the PLS-post may include an EAT_robust_mode, an EAT_RB_start, an EAT_N_RB, an EAT_splitting_mode, and an EAT_splitting_SF_mode.

The EAT_robust_mode may be a field of 1 bit indicating whether the EAC (DP for EAT) has one most robust MOD-COD irrespective of a profile or a MODCOD dependent upon the profile when a signal frame has various types of MODCOD profiles. The broadcast signal receiving apparatus may know the MODCOD of the EAT from the field and decode the EAT.

The EAT_RB_start may be a field indicating start information as one of information about a position of the EAC (DP for EAT) allocated in a unit of a resource block (RB). The resource block (RB) may be a signaling unit for arranging DPs in a signal frame. The resource block (RB) may be represented by a data pipe unit (DPU).

The EAT_RB_start may be a field of 8 bits. The field may indicate a turn of an RB from which the EAC (DP for EAT) is started. When a length of the PLS_post is known, the field may be omitted. This is because the EAC (DP for EAT) is positioned immediately after the PLS_post.

The EAT_N_RB may be a field indicating the number of RBs occupied by the EAC (DP for EAT) started from the EAT_RB_start. The EAT_N_RB may be a field of 8 bits. The broadcast signal receiving apparatus may decode the EAC (DP for EAT) using EAT_N_RB.

The EAT_splitting_mode may be a field indicating the number of signal frames split from data of the EAC (DP for EAT) when the data of the EAC (DP for EAT) is split into EAC (DP for EAT) of the plurality of signal frames and is transmitted. The EAT_splitting_mode may be a 4-bit field. For example, when a value of the EAT_splitting_mode is "0", this may indicate that the EAC (DP for EAT) is not present in a corresponding signal frame. In addition, when a value of the EAT_splitting_mode is "1", this may indicate that repetition or split is not performed in a super frame. In addition, when a value of the EAT_splitting_mode is "2" to "15", this may indicate split into "2" to "15" signal frames.

The EAT_splitting_SF_mode may be a field indicating the number of super frames split from data of the EAC (DP for EAT) when the data of the EAC (DP for EAT) is split into EAC (DP for EAT) of the plurality of super frames and is transmitted. The EAT_splitting_SF_mode may be a field of 2 bits. For example, when a value of the EAT_splitting_SF_mode is "0", this may indicate that the EAC (DP for EAT) is not present in a corresponding super frame. When a value of the EAT_splitting_SF_mode is "1", this may indicate split into one super frame. When a value of the EAT_splitting_SF_mode is "2" to "3", this may indicate split into "2" to "3" super frames.

For example, in the case of EAT_splitting_mode="4" and EAT_splitting_SF_mode="2", this means that the broadcast signal transmitting apparatus splits data of the EAC (DP for EAT) into "4" pieces and transmits the data on a "2"-pieces basis in "2" super frames. When the data is split and transmitted likewise, if a channel is changed, time diversity gain may be obtained and data of the EAC (DP for EAT) may be transmitted with a predetermined data rate on a small amount basis.

The EAT_segment_number may be a field indicating a turn of EAT data pieces of a corresponding signal frame when data of EAC (DP for EAT) is split and transmitted. The EAT_segment_number may be a field of 2 bits. However, when a signal frame index, a super frame id, or a super frame index is used, a turn of data pieces of the EAC (DP for EAT) of a corresponding signal frame among data pieces of an entire EAC (DP for EAT) without using the EAT_segment_number.

When the above information items have a static value in a super frame, the information items may be inserted into the PLS-pre for signaling a fixed value in a fixed value, which will be described below.

FIG. 18(b) illustrates a method for defining and transmitting a control signal associated with transmission of a signal when the broadcast signal transmitting apparatus transmits emergency alert system (EAS) information in a broadcast network, according to another embodiment of the present invention.

The PLS-pre may include the EAT_flag and the PLS-post may include the version information (EAT_version). In addition, the same description as in FIG. 18(a) will be omitted below.

When a length of the version information (EAT_version) is high, information about the version information (EAT_version) may be divided into two fields. The EAT_flag positioned in the PLS-pre may indicate whether the EAC (DP for EAT) is present in a corresponding signal frame or super frame. The broadcast signal receiving apparatus may use the EAT_flag positioned in the PLS-pre in a normal reception mode in which a preamble is not detected. That is, the broadcast signal receiving apparatus may detect the PLS-pre in a normal reception mode without detection of a preamble to know that the EAC (DP for EAT) is present in the corresponding signal frame or super frame. The version information (EAT_version) positioned in the PLS-post may have update information of the EAT.

When this method is used, the broadcast signal receiving apparatus may decode the PLS-pre and the PLS-post to know the version information (EAT_version).

FIG. 19 is a diagram illustrating a table structure of a signal frame including EAS information according to the first embodiment of the present invention.

FIG. 19 discloses a field required in a preamble, a PLS-pre, and a PLS-post, for minimizing EAS message information signaled in the PLS-post and decoding the EAC (DP for EAT) only by a preamble and EAS signaling information of the PLS-pre when the broadcast signal transmitting apparatus transmits emergency alert system (EAS) information in a broadcast network.

In FIG. 19, the same parts as in FIG. 18(a) or 18(b) may have the same meaning and thus a detailed description thereof will be omitted here.

The preamble may include the wake_up_flag and the EAT_flag.

The PLS-pre may include the version information (EAT_version), the EAT_robust_mode, the EAT_N_RB, and the EAT_split_flag. A detailed description of the version information (EAT_version), the EAT_robust_mode, and the EAT_N_RB is the same as in FIG. 18(a) or 18(b). The EAT_split_flag may be a field indicating whether data of the EAC (DP for EAT) is split and transmitted. The EAT_split_flag may be a field of 1 bit. When a length of the PLS-post is known, the EAT_RB_start may be omitted from the PLS-pre. This is because the EAC (DP for EAT) is positioned immediately after the PLS-post.

The PLS-post may include the EAT_splitting_mode and the EAT_splitting_SF_mode.

As described above, the broadcast signal transmitting apparatus may position the EAT_robust_mode and the EAT_N_RB in the PLS-pre to minimize the amount of data included in the PLS-post. When the EAC (DP for EAT) is not split, the broadcast signal receiving apparatus may decode the EAC (DP for EAT) only by the preamble and EAS signaling information of the PLS-pre. When the EAC (DP for EAT) is split, the broadcast signal receiving apparatus may decode the EAC (DP for EAT) using EAS signaling information included in the preamble, the PLS-pre, and the PLS-post.

FIG. 20 is a diagram illustrating an emergency alert table (EAT) according to the first embodiment of the present invention.

FIG. 20 discloses an emergency alert table (EAT) transmitted through the EAC (DP for EAT) by the broadcast signal transmitting apparatus according to an embodiment of the present invention. The broadcast signal transmitting apparatus may add all EAS messages in the EAT and transmit the EAS messages through the illustrated EAT or may split the messages to EAT, IP, and TS in an arbitrary condition and transmit the messages.

The automatic_tuning_flag may be a field for allowing the broadcast signal receiving apparatus to automatically set a channel and a service. The automatic_tuning_flag may be a field of 1 bit. For example, when the automatic_tuning_flag has a value '1', this may indicate the broadcast signal receiving apparatus to automatically set a channel and a service. Channel information required when the automatic_tuning_flag has a value of '1' may be included as an automatic_tuning_info field in the EAT.

The automatic_tuning_info field may include an Automatic_tuning_channel_number, an Automatic_tuning_DP_id, and an Automatic_tuning_service_id.

The Automatic_tuning_channel_number may indicate a number of a channel set when a channel is automatically set. The Automatic_tuning_channel_number may be a field of 8 bits. The Automatic_tuning_DP_id may be a field indicating an ID of a data pipe (DP) for transmitting an automatic setting service. The Automatic_tuning_DP_id may a field of 8 bits. The Automatic_tuning_service_id may be a field indicating an ID of a service to be received by automatic channel setting. The Automatic_tuning_service_id may be a field of 16 bits.

The broadcast signal receiving apparatus may automatically set a channel through the aforementioned Automatic_tuning_channel_number, Automatic_tuning_DP_id, and Automatic_tuning_service_id and may provide a corresponding service to a user.

The num_EAS_messages may be a field indicating the number of EAS message sets transmitted in a current EAT. The num_EAS_messages may be a field of 7 bits.

The EAS_message_id may be a field indicating a dedicated ID number for differentiating a message set from another message set. The EAS_message_id may be a field of 32 bits. The number of bits may be increased or reduced according to a valid period of the dedicated ID number.

The EAS_IP_version_flag may be a field indicating a version of an IP in the case of data transmitted to the IP. The EAS_IP_version_flag may be a field of 1 bit. The EAS_IP_version_flag may indicate whether the corresponding IP is an IPv4 address or an IPv6 address.

Each EAS message set may include EAS message and additional data transfer paths. Each transfer path may be redundantly transmitted or independently transmitted according to setting of each indicator. An indicator for each transfer path may include an EAS_EAT_indicator, an EAS_IP_indicator, an EAS_TS_indicator, and an EAS_NRT_indicator.

The EAS_EAT_indicator may be a field indicating whether the EAT includes an EAS message while being transmitted. The EAS_EAT_indicator may be a field of 1 bit. For example, when the EAS_EAT_indicator has a value of '1', the EAT may include an EAS_message_length and an EAS_message_byes( ) for transmission of an EAS message. The EAS_message_length may be a field indicating a length of the EAS message having a corresponding EAS_message_id included in the EAT. The EAS_message_length may be a field of 12 bits. The EAS_message_bytes( ) may be a field indicating an EAS message that is represented by a byte data of a length defined by the EAS_message_length. The EAS_message_bytes( ) may be a field of 8*(EAS_message_length) bits.

The EAS_IP_indicator may be a field indicating whether a partial portion or entire portion of additional information for EAS messages or EAS is transmitted through an IP datagram. For example, when the EAS_IP_has a value of '1', the EAT may include a DP_id, an IP_address, and an UDP_port_num for transmission of an EAS message through an IP datagram. The DP_id may be a field indicating a data pipe (DP) of a physical layer that includes a corresponding IP and is transmitted. The DP_id may be a field of 8 bits. The IP_address may be a field indicating a specific IP address to which EAS related information is transmitted. The IP address may be 32 bits or 128 bits according to the EAS_IP_version_flag. The UDP_port_num may be a field indicating a port of a corresponding IP through which the EAS related information is transmitted. The UDP_port_num may be a field of 16 bits.

The EAS_TS_indicator may be a field indicating whether a partial portion or entire portion of additional information for EAS messages or EAS is transmitted through a transport stream (TS). For example, when the EAS_TS_has a value of '1', the EAT may include a DP_id and a PID for transmitting an EAS message to an MPEG TS. The DP_id may include a field including a data pipe (DP) ID of a physical layer that includes the corresponding TS and is transmitted. The PID may be a field including identification information about data transmitted by the EAS related information.

The EAS_NRT_indicator may be a field indicating whether a partial portion or entire portion of additional information for EAS messages or EAS is transmitted through a non real time (NRT) DP. The NRT DP may include at least one service. The EAS_NRT_indicator may be a field of 1 bit. For example, when the EAS_NRT_indicator has a value of '1', the EAT may include an EAS_NRT_DP_id and an EAS_NRT_service_id. The broadcast signal transmitting apparatus may include an EAS_NRT_DP_id and an EAS_NRT_service_id as well as an IP so as to be used when another data transmitting method is used. The EAS_NRT_DP_id may be a field including an ID of a DP for non real time (NRT) including an NRT service for EAS. The EAS_NRT_DP_id may be a field of 8 bits. The EAS_NRT_service_id may include an NRT service ID indicating a service indicating additional information for an EAS message or EAS among services included in a DP for NRT. The EAS_NRT_service_id may be a field of 16 bits.

All of the EAS messages may be included in the EAT and transmitted through the EAS_EAT_indicator or is split to EAT, IP, and TS in an arbitrary condition and is transmitted. However, when the messages are split to the EAT, the IP, and the TS and transmitted, the EAS message may be transmitted by only the EAS message information included in the EAT to alert the broadcast signal receiving apparatus.

FIG. 21 is a diagram illustrating an emergency alert table (EAT) according to the second embodiment of the present invention.

FIG. 21 discloses an emergency alert table (EAT) transmitted through the EAC (DP for EAT) by the broadcast signal transmitting apparatus, according to another embodiment of the present invention. The broadcast signal transmitting apparatus may add all EAS messages in the EAT and transmit the EAS messages through the illustrated EAT or may split the messages to EAT, IP, and TS in an arbitrary condition and transmit the messages.

The same configurations of the EAT as those of FIG. 20 among configurations of the EAT illustrated in FIG. 21 have the same description as in the above description of FIG. 20 and thus a detailed description thereof will be omitted here.

The EAS_NRT_indicator may be a field indicating whether a partial portion or entire portion of additional information for EAS messages or EAS is transmitted through a non real time (NRT) DP. The EAS_NRT_indicator may be a field of 1 bit. For example, when the EAS_NRT_indicator has a value of '1', the EAT may include a DP_id, an IP_address, and an UDP_port_num.

The DP_id may be a field including an ID for NRT including an NRT service for EAS. The IP_address may be a field including an IP address of an NRT service, for transmitting EAS related information. The IP_address may be 32 bits or 128 bits according to an EAS_IP_version_flag. The UDP_port_num may be a field indicating a port of a corresponding IP, to which the EAS related information is transmitted. The UDP_port_num may be a field of 16 bits.

Figure 22:
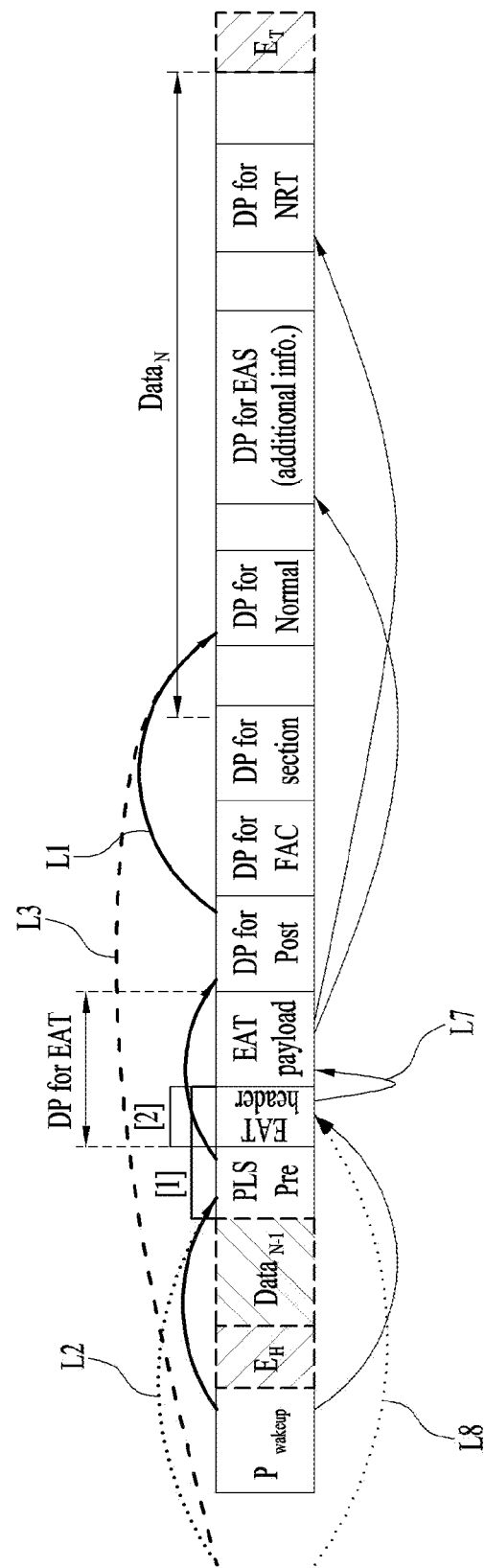
FIG. 22 is a diagram illustrating a structure of a signal frame according to the third embodiment of the present invention.

FIG. 22 is a diagram illustrating a structure of a signal frame according to the third embodiment of the present invention.

FIG. 22 discloses a structure of a signal frame for effectively transmitting emergency alert system (EAS) information by the broadcast signal transmitting apparatus in a broadcast network.

To this end, an EAC-header (EAT header) and an EAC-payload (EAT payload) may be positioned in a dedicated signal period positioned between a PLS-pre (PLS pre) and a PLS-post (PLS post) in a signal frame or positioned at a predetermined position irrespective of a normal signal.

The same configurations of the signal frame as those of FIG. 17 among configurations of the EAT illustrated in FIG. 22 have the same description as in the above description of FIG. 17 and thus a detailed description thereof will be omitted here.

As shown in a seventh line L7, when an EAC is not present in a previous signal frame and cannot be known by signaling information (PLS signaling or in-band signaling), the broadcast signal receiving apparatus may first decode a preamble to check whether the EAC is present in order to check whether the EAC is present in a current signal frame. In this case, when there is no error in the PLS-pre (PLS pre), the broadcast signal receiving apparatus may obtain EAC related information through the PLS-pre (PLS pre).

For example, the broadcast signal receiving apparatus may detect a preamble ($P_{wakeup}$) generated as an EAS sequence for providing signaling for an emergency state to obtain an initial position of a signal frame. The broadcast signal receiving apparatus may decode the EAC-header (EAT header) based on information obtained by decoding preamble data and decode the EAC-payload (EAT payload) based on information obtained by the EAC-header (EAT header). Then, the broadcast signal receiving apparatus may obtain an emergency alert message based on information obtained by decoding the EAC-payload (EAT payload). In addition, the broadcast signal receiving apparatus may decode the PLS-pre (PLS pre) based on information obtained by decoding preamble data, decode the EAC (DP for EAT) based on information obtained by decoding the PLS-pre (PLS pre), and acquire an emergency alert message based on information obtained by decoding the EAC (DP for EAT).

As shown in an eighth line L8, when the broadcast signal receiving apparatus can know whether an EAC of a current signal frame is present in a previous signal frame, the broadcast signal receiving apparatus may process the EAC of the current signal frame after the previous signal frame. In this case, the broadcast signal receiving apparatus may obtain a length of the EAC-payload (EAT payload) from the EAC-header (EAT header) of the current signal frame or previous signaling information (PLS signaling or in-band signaling).

For example, in a normal operating state, when the broadcast signal receiving apparatus knows that an EAC is present in a current signal frame through signaling information (PLS signaling or in-band signaling) after the EAC is processed in the previous signal frame, the broadcast signal receiving apparatus may first decode the EAC-header (EAT header) in the current signal frame and decode the EAC-payload (EAT payload) based on information obtained by decoding the EAC-header (EAT header).

FEC coding for the EAC-header (EAT header) may code alone the EAC-header (EAT header). In addition, the FEC coding for the EAC-header (EAT header) may collectively code the PLS-pre (PLS pre) and the EAC-header (EAT header) as indicated by [1] or may partially collect the EAC-header (EAT header) and the EAC-payload (EAT payload) and may code them as indicated by [2]. When a size of the EAC-header (EAT header) is small, FEC capability is degraded, and thus the broadcast signal transmitting apparatus or the broadcast signal receiving apparatus may collect data of different blocks and perform FEC encoding/decoding on the data as indicated by [1] and [2]. When the size of the EAC-header (EAT header) is sufficiently large, FEC encoding/decoding may be independently performed.

FIG. 23 is a diagram illustrating a procedure for receiving an EAS message by a broadcast signal receiving apparatus according to the third embodiment of the present invention.

The broadcast signal receiving apparatus may acquire control information about EAS related signals through a preamble and an EAC-header (EAT header). In addition, the broadcast signal receiving apparatus may acquire EAS related control information from the PLS-pre and may rapidly process an EAS signal. Hereinafter, a method for receiving a broadcast signal by a broadcast signal receiving apparatus will be described in detail. The EAS_flag may be interested in the same way as the EAC flag (EAS_flag).

FIG. 23(*a*) illustrates a procedure for detecting a preamble ($P_{wakeup}$) generated as an EAS sequence for providing signaling for an emergency state and receiving an EAS message by the broadcast signal receiving apparatus.

First, the broadcast signal receiving apparatus may receive a broadcast signal.

Then, the broadcast signal receiving apparatus may search for the preamble ($P_{wakeup}$) generated as an emergency alert system (EAS) sequence (S25110). For example, the broadcast signal receiving apparatus may check whether a scramble sequence of a preamble ($P_{wakeup}$) is an EAS sequence for providing signaling for an emergency state through a correlator. In addition, the broadcast signal receiving apparatus may activate a preamble check block every period for testing a preamble and check the preamble. The preamble check block may be a preamble detector 9300 for searching for a preamble generated as an emergency alert system (EAS) sequence.

When the broadcast signal receiving apparatus checks the EAS sequence, the broadcast signal receiving apparatus may decode the preamble ($P_{wakeup}$) generated as the emergency alert system (EAS) sequence and may detect and decode EAC flag (EAS_flag) indicating whether an EAC is present in a current signal frame based on information obtained by decoding the preamble ($P_{wakeup}$) (S25120).

When the EAC flag (EAS_flag) indicates that the EAC is present in the current signal frame or super frame, the broadcast signal receiving apparatus may detect and decode the EAC-header (EAT header) to acquire control information about the EAC (S25140).

Then, the broadcast signal receiving apparatus may detect and decode the EAC-payload (EAT payload) based on the information obtained by decoding the EAC-header (EAT header). The broadcast signal receiving apparatus may acquire an EAS message and additional information based on information obtained by decoding the EAC-payload (EAT payload) (S25150). In this case, the broadcast signal receiving apparatus may omit a procedure for decoding the PLS-pre (PLS pre).

When the PLS-pre (PLS pre) and the EAC-header (EAT header) are collectively FEC encoded as indicated by [1] of FIG. 22, the broadcast signal receiving apparatus may detect and decode the PLS-pre (PLS pre) to acquire control information about the EAC (S25130). Then, the broadcast signal receiving apparatus may detect and decode the EAC-header (EAT header) based on information obtained by decoding the PLS-pre (PLS pre) to further acquire control information about the EAC (S25140).

FIG. 23(*b*) illustrates a procedure for detecting preamble data included in a preamble and receiving an EAS message by the broadcast signal receiving apparatus.

First, the broadcast signal receiving apparatus may receive a broadcast signal.

Then, the broadcast signal receiving apparatus may search for a preamble that does not include EAS information (S25210). For example, the broadcast signal receiving apparatus may search for a preamble through a correlator. In addition, the broadcast signal receiving apparatus may activate a preamble check block every period for testing a preamble and check the preamble. The preamble check block may be the preamble detector 9300 for searching for a preamble generated as an emergency alert system (EAS) sequence.

Then, the broadcast signal receiving apparatus may search for and decode preamble data and acquire the wake_up_flag or the EAC flag based on information obtained by decoding the preamble data (S25220).

When the wake_up_flag instructs the broadcast signal receiving apparatus to be inverted to an active mode from a power-off mode or a standby mode or the EAC flag (EAS_flag) indicates that the EAC is present in the current signal frame or super frame, the broadcast signal receiving apparatus may detect and decode the EAC-header (EAT header) to acquire control information about the EAC (S25240).

Then, the broadcast signal receiving apparatus may detect and decode the EAC-payload (EAT payload) based on information obtained by decoding the EAC-header (EAT header). The broadcast signal receiving apparatus may acquire an EAS message and additional information based on information obtained by decoding the EAC-payload (EAT payload) (S25250). In this case, the broadcast signal receiving apparatus may omit a procedure for decoding the PLS-pre (PLS pre).

When the PLS-pre (PLS pre) and the EAC-header (EAT header) are collectively FEC encoded as indicated by [1] of FIG. 22, the broadcast signal receiving apparatus may detect and decode the PLS-pre (PLS pre) to acquire control information about the EAC (S25230). Then, the broadcast signal receiving apparatus may detect and decode the EAC-header (EAT header) based on information obtained by decoding the PLS-pre (PLS pre) to further acquire control information about the EAC (S25240).

Figure 24:
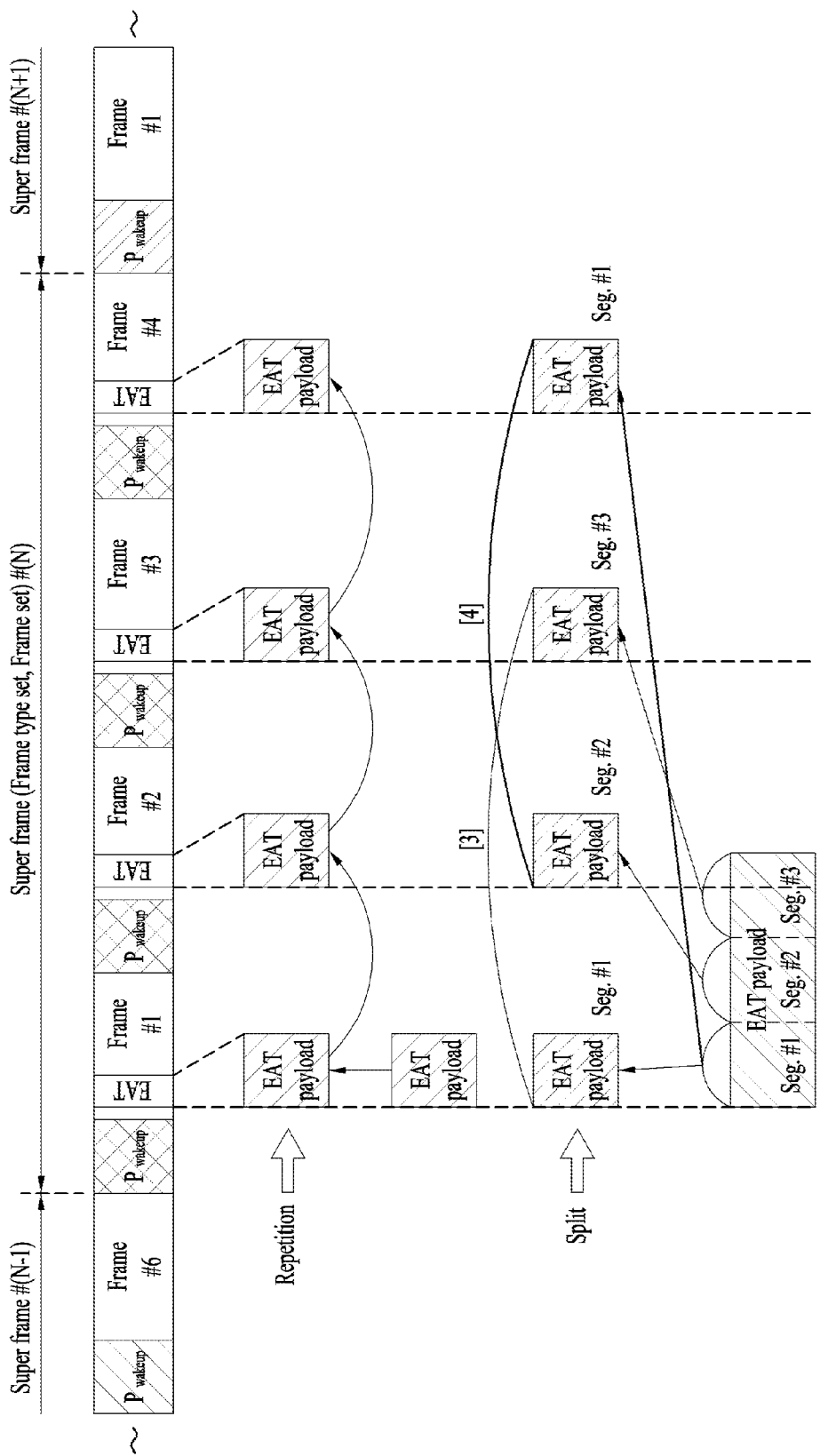
FIG. 24 is a diagram illustrating a method for repeating or splitting and transmitting an EAC by a broadcast signal transmitting apparatus according to the third embodiment of the present invention.

FIG. 24 is a diagram illustrating a method for repeating or splitting and transmitting an EAC by a broadcast signal transmitting apparatus according to the third embodiment of the present invention.

FIG. 24 illustrates a method for arranging EAS messages in order to more robustly transmit an EAS message by a broadcast signal transmitting apparatus.

FIG. 24 illustrates super frames (N−1, N, and N+1). However, the present invention is not limited thereto and the super frame may be replaced with a signal frame or a frame type set.

Each signal frame may include a preamble ($P_{wakeup}$) and an EAC (EAT). The EAC (EAT) may include an EAT-header and an EAT-payload. The EAT-header may have the same value in a super frame. When information such as a number, a length, etc. of an EAT-payload of each signal frame is included in the EAT-header, a corresponding value of information of the EAT-header may be changed every signal frame. The remaining signals except for the preamble ($P_{wakeup}$) and the EAC (EAT) that are required to describe FIG. 21 are not described in FIG. 21 for convenience of description, but matters shown in FIGS. 17 and 21 may be added.

FIG. 24 discloses a method for applying repetition and split to a super frame in order to enhance robustness by a broadcast signal transmitting apparatus. Repetition and split may also be applied to a frame type set or an arbitrary frame set. The broadcast signal transmitting apparatus may more robustly transmit an EAS message using repetition and split.

The repetition method may be a method for repeatedly transmitting the same EAC (EAT) in all signal frames of one super frame or one frame type set by the broadcast signal transmitting apparatus. For example, the EAT-payload may be repeatedly arranged in four signal frames in one super frame.

The broadcast signal transmitting apparatus may selectively use the repetition method and the split method in order to enhance reception reliability. For example, the broadcast signal transmitting apparatus may first transmit the EAC (EAT) using the EAC (EAT) and may retransmit the EAC (EAT) during one super frame using the repetition method after an arbitrary super frame elapses. Alternatively, the broadcast signal transmitting apparatus may transmit the EAC (EAT) using the repetition method in one super frame and transmit the EAC (EAT) in another super frame using the split method. Alternatively, when the number of signal frames is sufficient in one super frame, the broadcast signal transmitting apparatus may split the EAC (EAT) and then may repeatedly transmit the split set.

Likewise, when the broadcast signal transmitting apparatus transmits the EAC (EAT) or the EAS related information in units of super frames using the repetition method and the split method, a reception success rate of the broadcast signal receiving apparatus may be enhanced.

The split method may be a method for first splitting an original EAT-payload into an arbitrary number of EAC segments and adding and transmitting the split EAT segments in the EAC (EAT) of each signal frame in a corresponding super frame by the broadcast signal transmitting apparatus.

The broadcast signal transmitting apparatus may repeatedly add each EAC segment (EAT segment) in one super frame. For example, when the broadcast signal transmitting apparatus splits and transmits 3 EAC segments for 4 signal frames, the broadcast signal transmitting apparatus may arrange EAC segments from a first signal frame of the super frame. Accordingly, a first EAC segment Seg.#1, a second EAC segment Seg.#2, and a third EAC segment Seg.#3 may be sequentially arranged in each signal frame. In addition, when the number of signal frames is higher than the number of EAC segments, the broadcast signal transmitting apparatus may sequentially rearrange and transmit the EAC segments from the first EAC segment Seg.#1 in the remaining signal frame. However, the present invention is not limited thereto, and the broadcast signal transmitting apparatus may arrange and transmit an arbitrary EAC segment in the remaining signal frames.

Even if the broadcast signal receiving apparatus begins to receive a broadcast signal in an intermediate portion of a super frame or does not receive at least one EAC segment from the beginning, when the broadcast signal receiving apparatus receives only EAC segments including an original EAT-payload, the broadcast signal receiving apparatus may decode the EAC (EAT) to restore the original EAT-payload.

For example, as indicated by [3], the broadcast signal receiving apparatus may sequentially receive the first EAC segment Seg.#1, the second EAC segment Seg.#2, and the third EAC segment Seg.#3 and restore the original EAT-payload. As indicated by [4], the broadcast signal receiving apparatus may sequentially receive the second EAC segment Seg.#2, the third EAC segment Seg.#3, and the third EAC segment Seg.#1 and may rearrange sequences of the received EAC segments to restore the original EAT-payload.

A rule of the split method is as follows.

Signal Frame (n)→EAC segment (n % M), where n is a natural number of 0 to (N−1).  [Expression 1]

Here, n may be a number of a signal frame in one super frame or a frame type set and may have a value of 0 to (N−1). N is the number of all signal frames in a corresponding super frame. M is the number of EAC segments. n % M may indicate a remainder obtained by dividing M by n.

[Expression 1] is used to determine an EAC segment to be transmitted in an nth signal frame (signal frame (n)). The EAC segment (m) may indicate an $(m+1)^{th}$ EAC segment.

When the number of all signal frames in a super frame is sufficient, the broadcast signal transmitting apparatus may repeatedly transmit each split EAC segment in a super frame a plurality of times.

Signal Frame (n)→EAC segment ((n % N)% M), where n is a natural number of 0 to (L−1).  [Expression 2]

Here, n may be a number of a signal frame in one super frame or a frame type set and may have a value of 0 to (L−1). L is the number of all signal frames in a corresponding super frame. M is the number of the number of all signal frames in a super frame, N is the number of all signal frames used in split, and M is the number of EAC segments. n % M may indicate a remainder obtained by dividing M by n.

[Expression 2] is used to determine an EAC segment to be transmitted in an $n^{th}$ signal frame (signal frame (n)). The EAC segment (m) may indicate an $(m+1)^{th}$ EAC segment.

Likewise, the broadcast signal transmitting apparatus may add and transmit each EAC segment to an EAC (EAT) of each signal frame.

Figure 25:
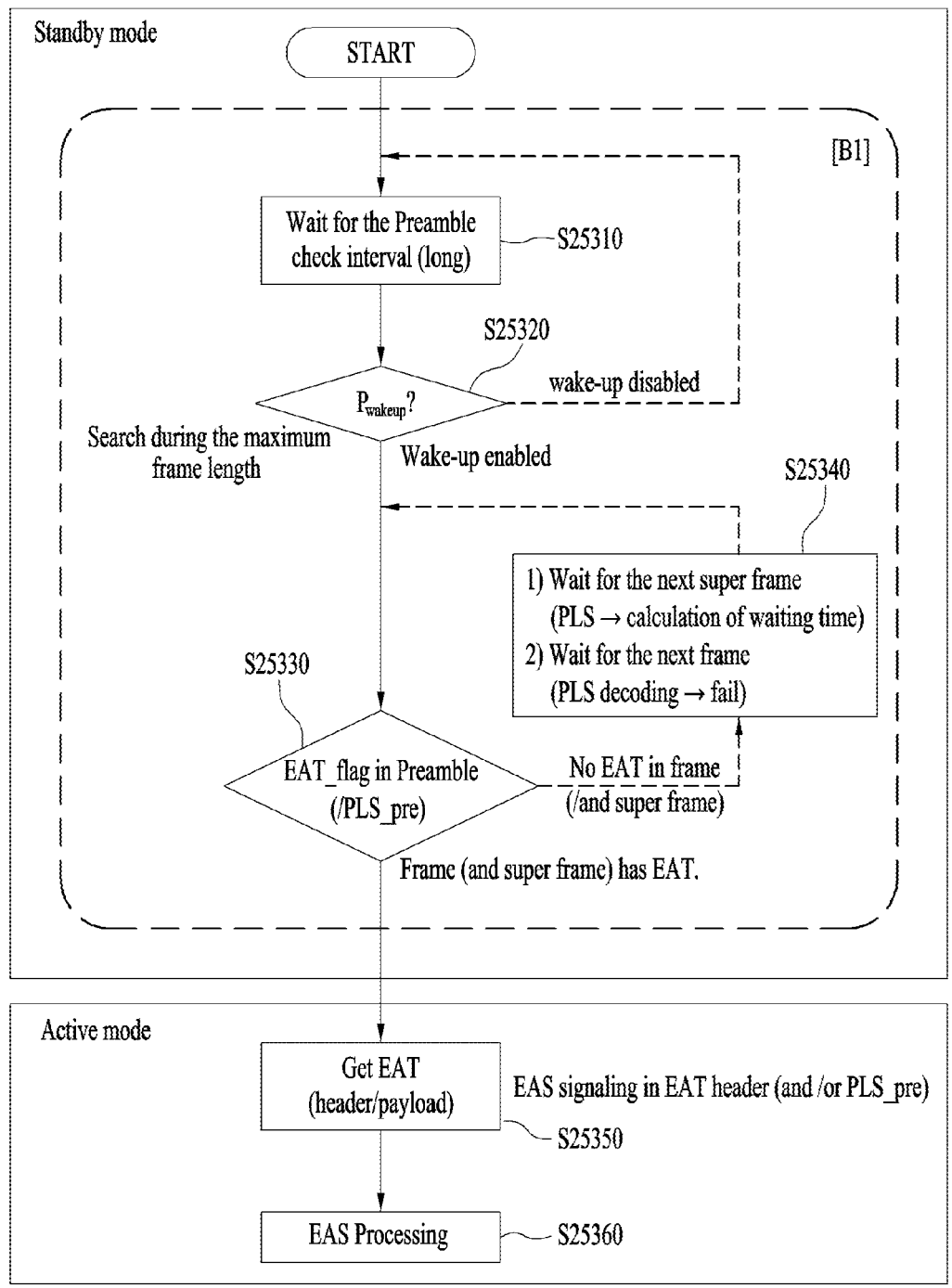
FIG. 25 is a diagram illustrating a wake-up process using a preamble generated as an EAS sequence according to the third embodiment of the present invention.

FIG. 25 is a diagram illustrating a wake-up process using a preamble generated as an EAS sequence according to the third embodiment of the present invention.

FIG. 25 illustrates a method for searching for a preamble to acquire an EAS message by a broadcast signal receiving apparatus when a broadcast signal transmitting apparatus inserts a wake-up indication signal into a preamble and transmits the preamble, according to an embodiment of the present invention. The embodiment illustrated in FIG. 26 corresponds to the case in which there is one preamble.

To this end, a method for receiving an EAS message by the broadcast signal receiving apparatus may include searching for a preamble generated as an emergency alert system (EAS) sequence, detecting an EAC flag included in the preamble or the PLS-post, an decoding the EAC including an emergency alert message positioned behind a signaling information region (PLSC) when the detected EAC flag indicates that the EAC is present in the signal frame.

A mode of the broadcast signal receiving apparatus may include a standby mode and an active mode.

The standby mode may refer to a mode in which the broadcast signal receiving apparatus performs only a required function in order to minimize power consumption. The broadcast signal receiving apparatus may perform a wake-up process in a standby mode. The wake-up process may refer to conversion of a broadcast signal receiving apparatus in a power-off mode or a standby mode to a mode for receiving and processing data from the power-off mode or the standby mode for receiving and processing data such as EAS.

The active mode generally refers to a mode in which the broadcast signal receiving apparatus receives a broadcast signal and provides the broadcast signal to a user. The broadcast signal receiving apparatus may decode the EAC (EAT) and transmit the EAS message to the user in an active mode.

First, an operation of a broadcast signal receiving apparatus in a standby mode will be described below in detail.

The broadcast signal receiving apparatus may wait for a time point for testing a preamble (S25310).

The broadcast signal receiving apparatus may search for a preamble ($P_{wakeup}$) generated as an emergency alert system (EAS) sequence (S25320).

For example, the broadcast signal receiving apparatus may activate a preamble check block every period for testing a preamble and check the preamble. The preamble check block may be the preamble detector 9300 for searching for a preamble generated as an emergency alert system (EAS) sequence. The broadcast signal receiving apparatus may search for a preamble during a length of a maximum signal frame.

When the broadcast signal receiving apparatus is wake-up disable to search for a preamble ($P_{wakeup}$) generated as an emergency alert system (EAS) sequence, the broadcast signal receiving apparatus may re-wait for a period for testing a preamble (S110). The broadcast signal receiving apparatus may stop functions except for a timer until the preamble check period is returned, thereby minimizing power consumption.

When the broadcast signal receiving apparatus is wake-up enable to search for the preamble ($P_{wakeup}$) generated as an emergency alert system (EAS) sequence, the broadcast signal receiving apparatus may detect an EAC flag included in the preamble ($P_{wakeup}$) or the PLS-pre (S25330). For example, the preamble detector 9300 may detect the EAC flag included in the preamble, and a demapping & decoding module 8200 or a decoder may decode the PLS-pre to detect the EAC flag.

When the EAC flag has information indicating that an EAC (EAT) is not present in a current signal frame or super frame (No EAT in frame and super frame), if information of the super frame can be obtained from the PLS, the broadcast signal receiving apparatus may determine that an EAS related signal is not present in the current super frame, wait for a next super frame, and then recheck the EAC flag (S25340). In addition, when information of a super frame cannot be obtained from the PLS, the broadcast signal receiving apparatus may wait for a next signal frame and then recheck the EAC flag (S25340). In this case, waiting time may be a minimum frame length.

When the EAC flag has information indicating that the EAC (EAT) is present in the current signal frame or super frame (Frame has EAT), the broadcast signal receiving apparatus may receive the EAC (EAT) and transmit the EAS message to the user in an active mode.

Hereinafter, an operation of a broadcast signal receiving apparatus in an active mode will be described in detail.

When the EAC flag indicates that the EAC (EAT) is present in a signal frame or a super frame, the broadcast signal receiving apparatus may decode the EAC (EAT) positioned behind the signaling information region (PLSC) (S25350). For example, the demapping & decoding module 8200 or the decoder may decode the PLS-pre (PLS pre), and when the EAC flag included in the decoded PLS-pre (PLS pre) indicates that the EAC is positioned in the signal frame or the super frame, the demapping & decoding module 8200 or the decoder may decode the EAC (EAT) positioned behind the PLS-pre (PLS pre). In this case, the broadcast signal receiving apparatus may acquire the EAC (EAT) using EAS signaling information of the EAT-header and the PLS-pre (PLS pre).

Then, the broadcast signal receiving apparatus may perform EAS processing (S25360). For example, the broadcast signal receiving apparatus may transmit an emergency alert message to the user based on information obtained by decoding the EAC (EAT).

In addition, the broadcast signal receiving apparatus may acquire additional information associated with the emergency alert message using decoded EAC (EAT). In this case, the EAC (EAT) may include information about at least one DP with additional information associated with the emergency alert message. For example, the demapping & decoding module 8200 or the decoder may acquire additional information associated with the emergency alert message using the decoded EAC.

Figure 26:
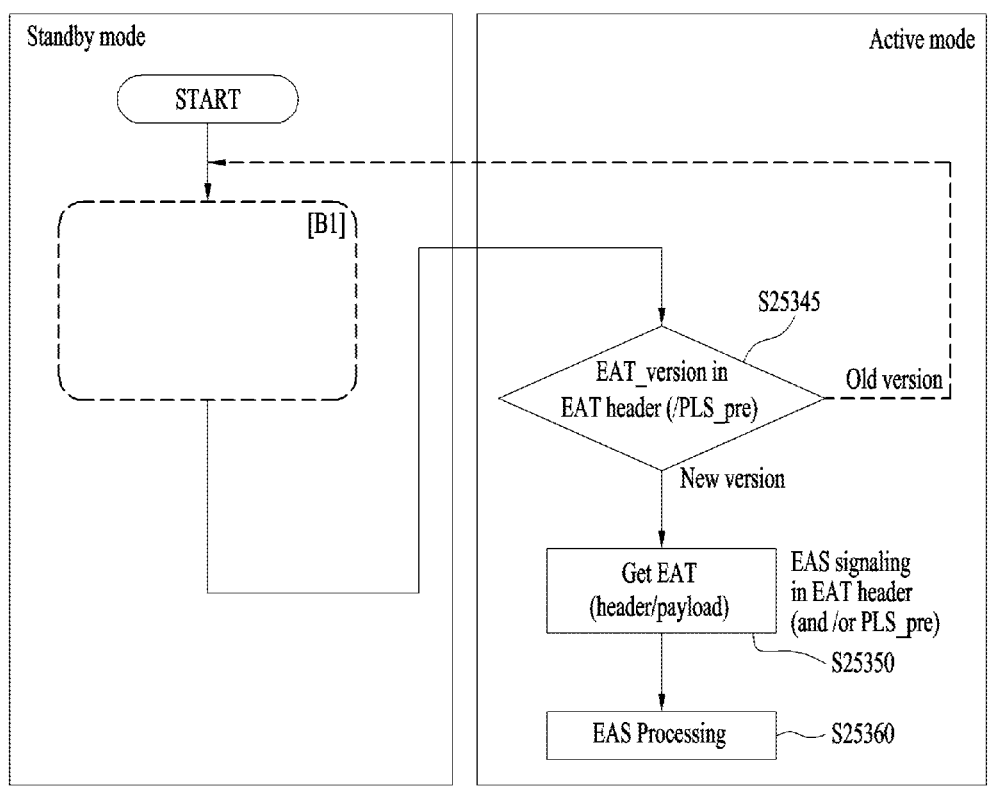
FIG. 26 is a diagram illustrating a versioning procedure of an EAS according to the third embodiment of the present invention.

FIG. 26 is a diagram illustrating a versioning procedure of an EAS according to the third embodiment of the present invention.

FIG. 26 illustrates a method for acquiring an EAS message of a new version using version information by a broadcast signal receiving apparatus, according to an embodiment of the present invention.

A configuration of [B1] indicated by a dotted line in FIG. 26 is the same as that of [B1] indicated by a dotted line in FIG. 25, and thus will be omitted in FIG. 26. An operation of the portion [B1] of FIG. 26 is also the same as the aforementioned description and thus a detailed description thereof will be omitted.

When wake up indication of a specific emergency state is dismissed by a user, the broadcast signal receiving apparatus may select whether the wake up indication of the emergency state to be received later is discarded. To this end, version information of the EAS may be used. EAS versioning will be described in detail.

According to the present embodiment, the broadcast signal receiving apparatus may be a mode in which a specific version of wake up indication is dismissed and is returned to a standby mode. The wake up indication may be dismissed by setting of the user or the broadcast signal receiving apparatus. Then, the broadcast signal receiving apparatus may receive EAS information through a procedure of [B1].

Upon acquiring information indicating the a corresponding signal frame is a signal frame in which EAS information is present through the procedure of [B1], the broadcast signal receiving apparatus may check a version of the EAS information (S25345). The version information (EAT_version) of the EAS information may be present in an EAT-header. In some embodiments, the version information of the EAS information may be present in the PLS-pre (PLS pre) or the PLS-post (PLS post). The broadcast signal receiving apparatus may check whether a version of current EAS information or wake up indication is the same as a version of previously dismissed EAS information or wake up indication through version information. Upon checking EAS information or wake up indication of a previous version, the broadcast signal receiving apparatus may return to an initial process and may be standby and may not decode the EAS information. Upon checking EAS information or wake up indication of a new version, the broadcast signal receiving apparatus may decode the EAS information. A subsequent procedure may be performed in the same way as the description of FIG. 25.

Figure 27:
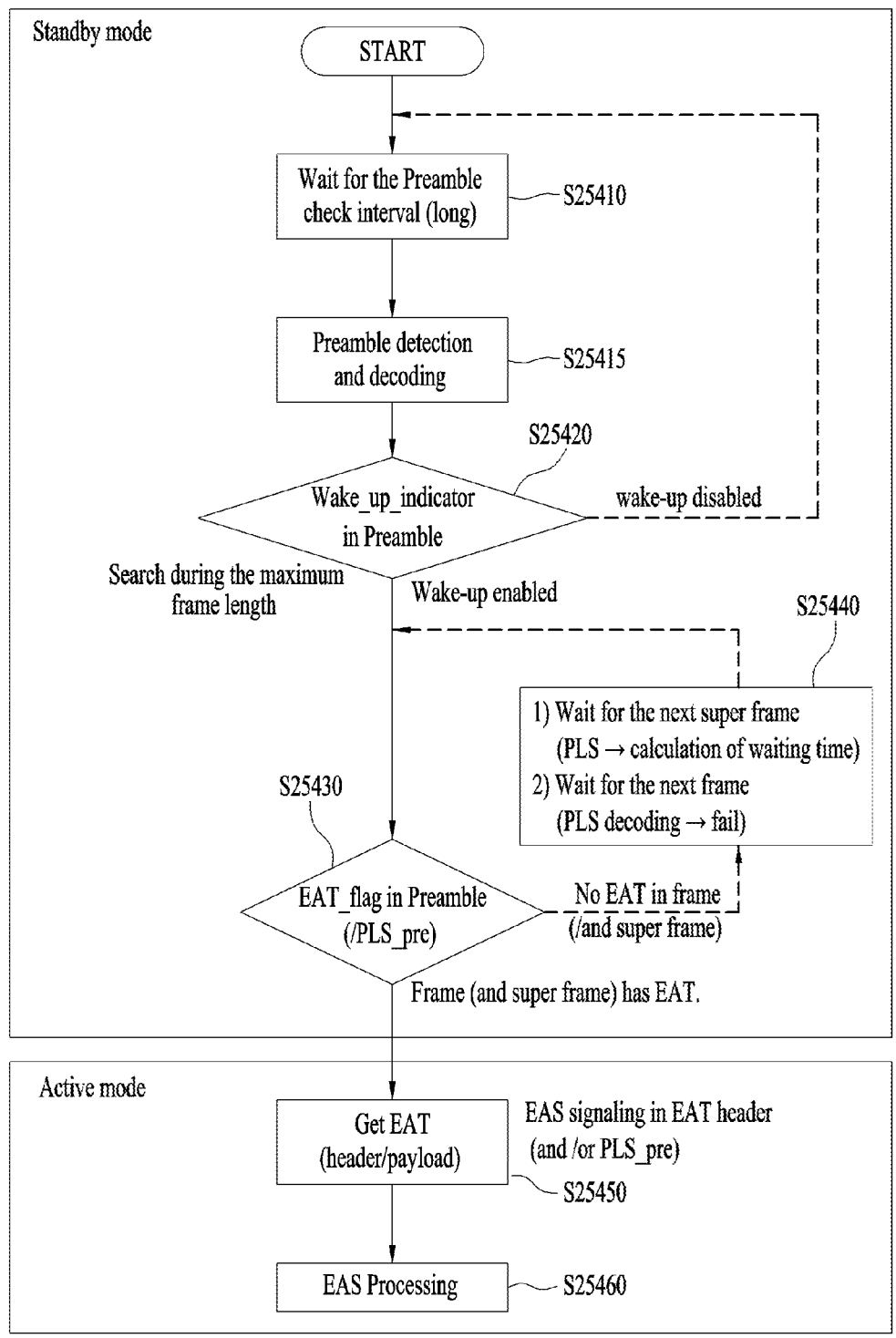
FIG. 27 is a diagram illustrating a wake up process using preamble data according to the third embodiment of the present invention.

FIG. 27 is a diagram illustrating a wake up process using preamble data according to the third embodiment of the present invention.

FIG. 27 illustrates a method for searching for a preamble and acquiring an EAS message by a broadcast signal receiving apparatus when a broadcast signal transmitting apparatus inserts wake-up indication information into preamble data and transmits the preamble data, according to an embodiment of the present invention.

The same configurations of the wake up process as those of FIG. 25 among configurations of the wake up process illustrated in FIG. 27 have the same description as in the above description of FIG. 25 and thus a detailed description thereof will be omitted here. In detail, descriptions of S25410, S25430, S25440, S25450, and S25460 in FIG. 27 may be the same as those of S25310, S25330, S25340, S25350, and S25360 in FIG. 25.

Hereinafter, FIG. 27 will be described in terms of a difference from FIG. 25.

The broadcast signal receiving apparatus may check a preamble every period for preamble check using a preamble check block. Then, upon retrieving a preamble, the broadcast signal receiving apparatus may decode preamble data (S25415).

The broadcast signal receiving apparatus may decode the preamble data to check a wake up indicator (wake_up_indicator) (S25420).

For example, the wake up indicator (wake_up_indicator) may be the wake_up_flag indicating whether the broadcast signal receiving apparatus is converted to an active mode from a power-off mode or a standby mode, or an EAC flag indicating whether the EAC is present in a current signal frame or super frame.

When wake-up is disabled, the broadcast signal receiving apparatus may return to an initial operation S25410 and stop functions except for a timer until the preamble check period is returned, thereby minimizing power consumption.

When wake-up is enabled, the broadcast signal receiving apparatus may check the EAT_flag included in a preamble or PLS-pre (S25430).

Figure 28:
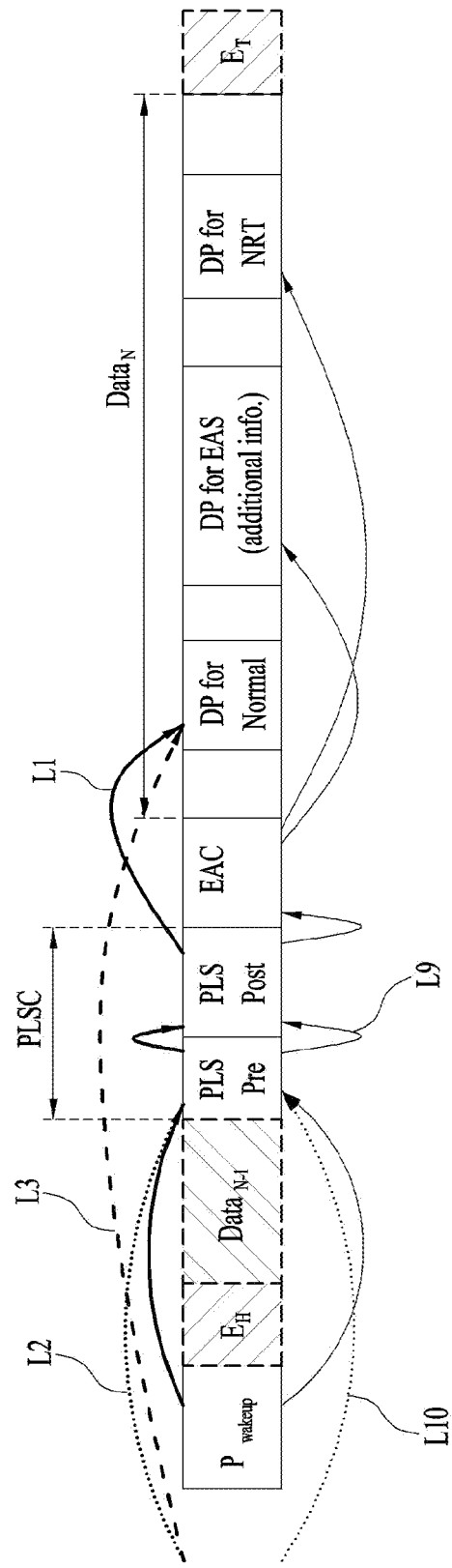
FIG. 28 is a diagram illustrating a structure of a signal frame according to the fourth embodiment of the present invention.

FIG. 28 is a diagram illustrating a structure of a signal frame according to the fourth embodiment of the present invention.

FIG. 28 illustrates a structure of a signal frame for effectively transmitting emergency alert system (EAS) information in a broadcast network by a broadcast signal transmitting apparatus.

To this end, the EAC (EAC) may be positioned in a dedicated signal period positioned behind a signaling information region (PLSC) in a signal frame or positioned at a predetermined position in the signal frame irrespective of a normal signal.

The same configurations of the signal frame as those of FIG. 17 or 22 among configurations of the signal frame illustrated in FIG. 28 have the same description as in the above description of 17 or 22 and thus a detailed description thereof will be omitted here.

The EAC (EAC) may be a channel for transmitting an emergency alert table (EAT) including an EAS message and EAS related information. The EAC (EAC) may be positioned in a dedicated signal period positioned behind the signaling information region (PLSC) in a signal frame or positioned at a predetermined position in the signal frame irrespective of a normal signal.

The EAC (EAC) for EAT transmission may have independent MODCOD. A code rate of an FEC corresponding to the COD and a configuration method may be based on the same method as the PLS-post. Additional parity (AP) may be used to reinforce robustness. MOD used in the EAC (EAC) may be used in most robust modulation (MOD) in each profile in BPSK. In addition, an arbitrary MOD may be used.

As shown in a ninth line L9, when an EAC is not present in a previous signal frame and cannot know the EAC from signaling information (PLS signaling or in-band signaling), the broadcast signal receiving apparatus may first decode a preamble to check whether the EAC (EAC) is present in order to check whether the EAC (EAC) is present in a current signal frame. In this case, when there is no error in the signaling information region (PLSC), the broadcast signal receiving apparatus may obtain EAC (EAC) related information through the signaling information region (PLSC).

For example, the broadcast signal receiving apparatus may detect the preamble ($P_{wakeup}$) generated as an EAS sequence for providing signaling for an emergency state to acquire an initial position of a signal frame. The broadcast signal receiving apparatus may decode preamble data and the PLS-pre (PLS pre) to acquire EAC (EAC) related control information. Then, the broadcast signal receiving apparatus may decode the EAC (EAC) to acquire an emergency alert message.

When EAS related information is also present in the PLS-post (PLS post), the broadcast signal receiving apparatus may decode the PLS-pre (PLS pre) and then decode the EAC (EAC).

As shown in a tenth line L10, the broadcast signal receiving apparatus may process the EAC in the previous signal frame and then may first decode the PLS-pre (PLS pre) in a current signal frame. In addition, when the EAC is not present in the previous signal frame, the broadcast signal receiving apparatus may also first decode the PLS-pre (PLS pre) in the current signal frame. Then, the broadcast signal receiving apparatus may decode the PLS-post (PLS post) or decode the EAC (EAC) based on information obtained by decoding the PLS-pre (PLS pre). In addition, a subsequent procedure is the same as in the aforementioned fourth line L4 shown in FIG. 17.

In addition, when the broadcast signal receiving apparatus knows a position, a length, and other information of the EAC of the current signal frame in the previous signal frame, the broadcast signal receiving apparatus may decode the EAC (EAC) of the current signal frame immediately after the previous signal frame is processed.

Figure 29:
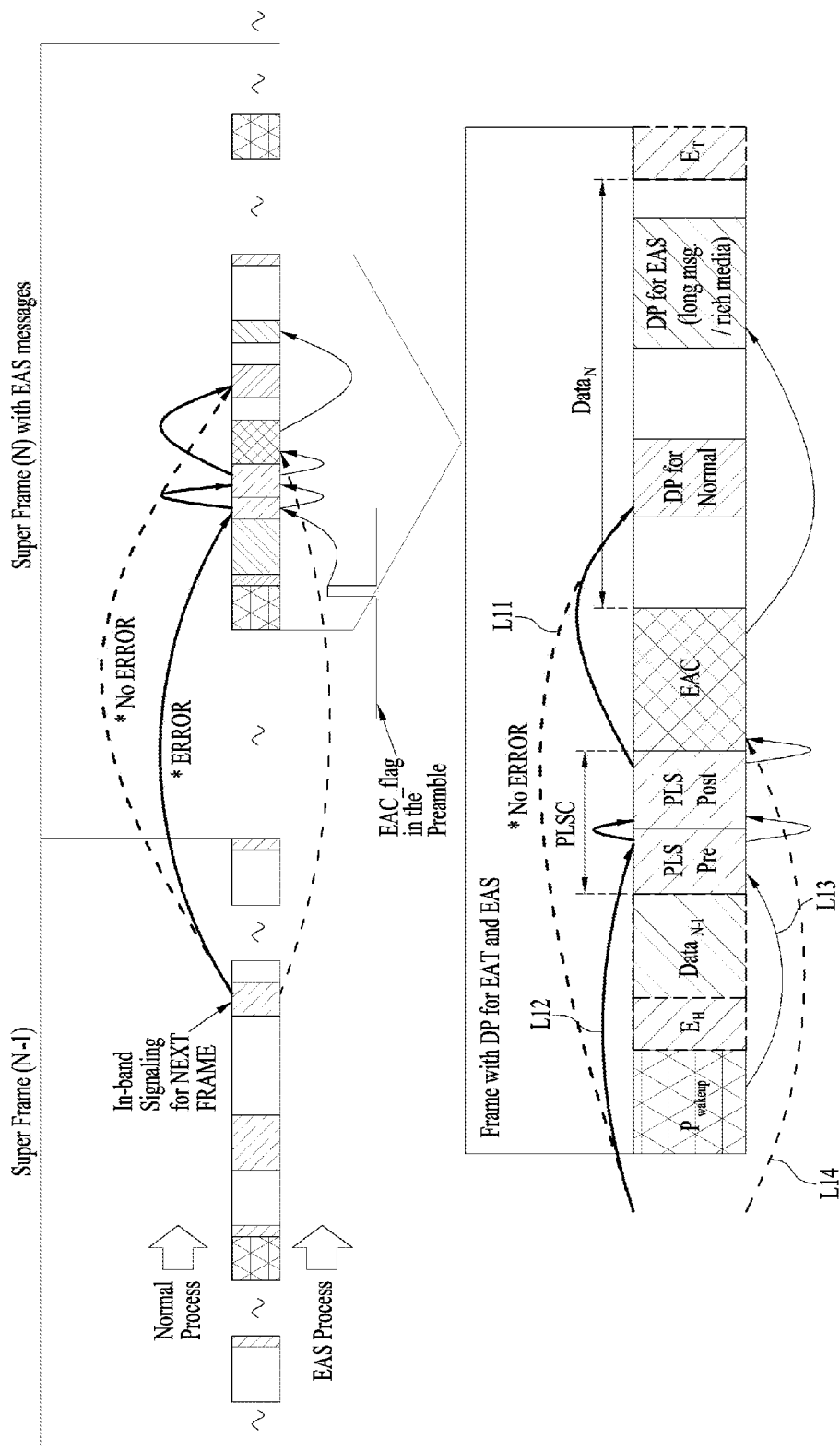
FIG. 29 is a diagram illustrating an operating sequence when a broadcast signal transmitting apparatus uses in-band signaling according to the fourth embodiment of the present invention.

FIG. 29 is a diagram illustrating an operating sequence when a broadcast signal transmitting apparatus uses in-band signaling according to the fourth embodiment of the present invention.

FIG. 29 illustrates a method for decoding a Normal-DP (DP for Normal) of a signal frame to be received immediately after at least one signal frame if error does not occur when the broadcast signal transmitting apparatus decodes an in-band signaling region (in-band signaling for NEXT FRAME) in the previous signal frame, according to an embodiment of the present invention.

FIG. 29 illustrates a previous super frame N−1 that does not include an EAS message and a current super frame N including an EAS message. At least one signal frame or super frame may be present between the previous super frame N−1 and the current super frame N. A normal process refers to a procedure for receiving and processing a normal service by a broadcast signal receiving apparatus. The EAS process refers to a procedure for receiving and processing an EAS related service by a broadcast signal receiving apparatus. The normal process and the EAS process may be performed in parallel.

The previous super frame N−1 may include at least one signal frame and the signal frame may include the in-band signaling region (in-band signaling for NEXT FRAME) including information about a next signal frame.

The broadcast signal receiving apparatus may decode the preamble and the signaling information region (PLSC) in a first signal frame of all super frames. In addition, when error occurs during decoding of the in-band signaling region (in-band signaling for NEXT FRAME) in a signal after the broadcast signal receiving apparatus acquires information indicating EAS information is present in a current or next signal frame, the broadcast signal receiving apparatus may perform an operation for searching for a signal frame including an EAS message at a predetermined signal frame length period.

As shown in an eleventh line L11, when error occurs during decoding of the in-band signaling region (in-band signaling for NEXT FRAME) in a previous signal frame by the broadcast signal receiving apparatus, the broadcast signal receiving apparatus may decode a normal DL (DP for Normal) to be received immediately after at least one signal frame.

As shown in a twelfth line L12, when error occurs during decoding of the in-band signaling region (in-band signaling for NEXT FRAME) in a signal frame in the previous super frame N−1 by the broadcast signal receiving apparatus, the broadcast signal receiving apparatus may first decode the PLS-pre (PLS pre) after at least one signal frame and decode the PLS-post (PLS post) based on information obtained by decoding the PLS-pre (PLS pre) to acquire configuration information of the signal frame. Then, the broadcast signal receiving apparatus may decode the Normal-DP (DP for Normal) as a DP for a normal service based on information obtained by decoding the PLS-post (PLS post).

As shown in a thirteenth line L13, the broadcast signal receiving apparatus may detect a preamble ($P_{wakeup}$) generated as an EAS sequence for providing signaling for an emergency state to acquire an initial position of the signal frame. A subsequent procedure is the same as the above description and a description thereof will be omitted.

As shown in a fourteenth line L14, when the broadcast signal receiving apparatus knows a position, a length, and other information of the EAC (EAC) of a current signal frame during decoding of the in-band signaling region (in-band signaling for NEXT FRAME) in a previous signal frame, the broadcast signal receiving apparatus may decode the EAC (EAC) of a current signal frame immediately after the previous signal frame is processed. A subsequent procedure is the same as the above description and a description thereof is omitted here.

Figure 30:
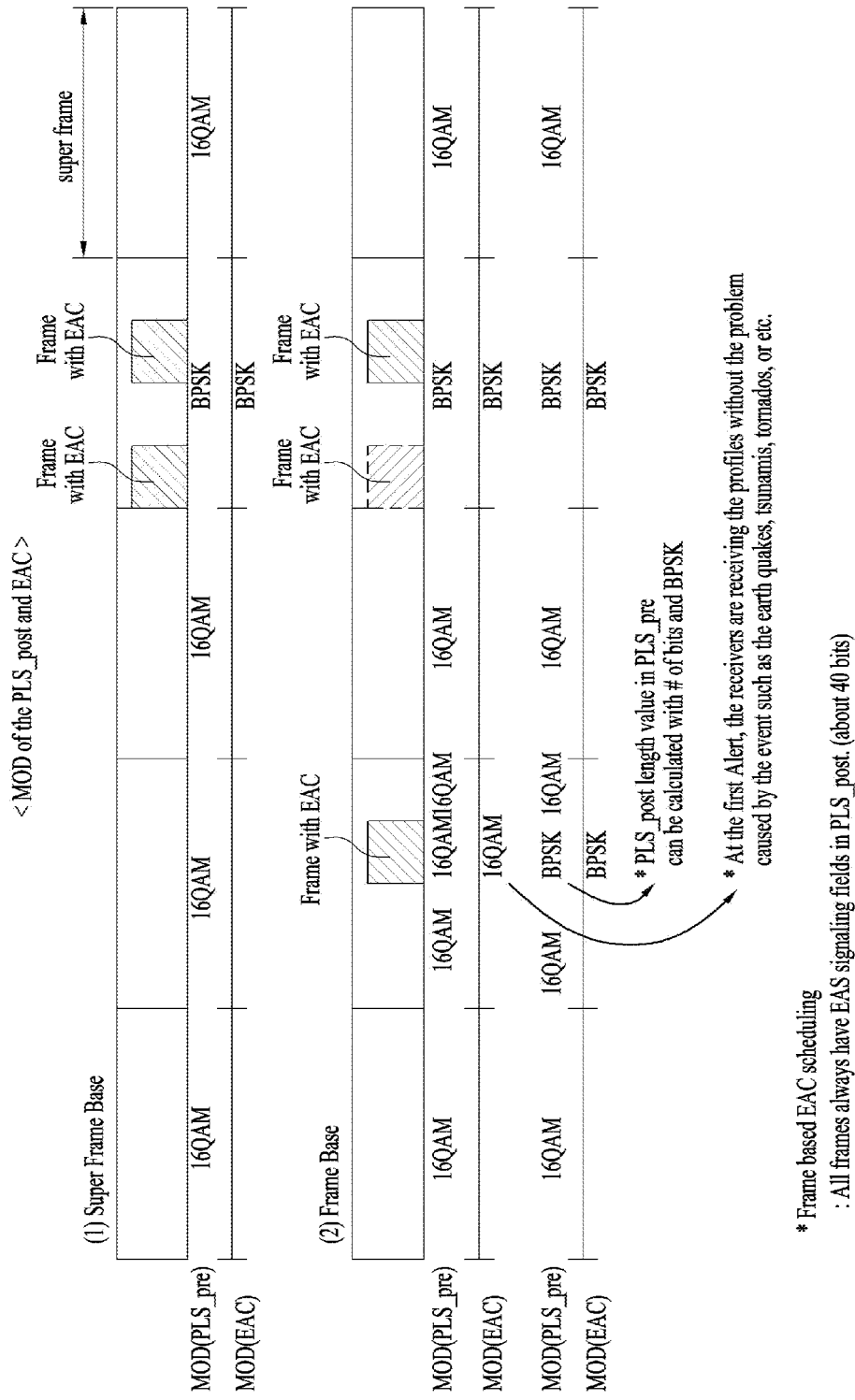
FIG. 30 is a diagram illustrating a scheduling method for transmitting an EAC according to the fourth embodiment of the present invention.

FIG. 30 is a diagram illustrating a scheduling method for transmitting an EAC according to the fourth embodiment of the present invention.

Referring to FIG. 30, an embodiment (1) corresponds to a method for transmitting an EAC in a unit of a super frame. According to the method, EAS information that is currently generated until a next super frame is started cannot be transmitted.

An embodiment (2) corresponds to a method for transmitting an EAC in a unit of a signal frame. As in the embodiment (2), when EAS information is generated, the broadcast signal transmitting apparatus may directly transmit the EAC at a desired fast time. In this case, a modulation order of the EAC may be changed according to a PLS.

Figure 31:
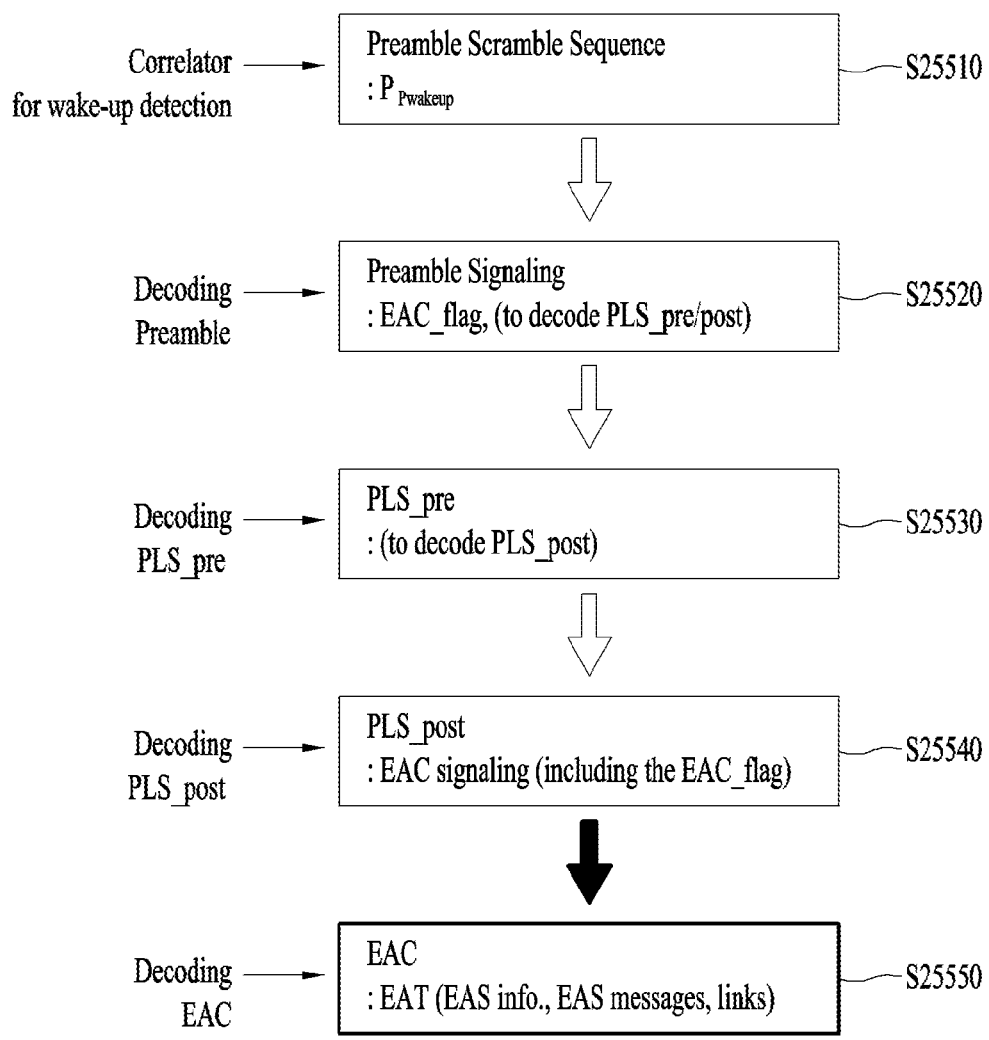
FIG. 31 is a diagram illustrating a procedure for receiving an EAS message by a broadcast signal receiving apparatus according to the fourth embodiment of the present invention.

FIG. 31 is a diagram illustrating a procedure for receiving an EAS message by a broadcast signal receiving apparatus according to the fourth embodiment of the present invention.

Hereinafter, a method for receiving a broadcast signal by a broadcast signal receiving apparatus when a preamble generated as an EAS sequence for providing signaling for an emergency state is transmitted by a wake up indicator (wake_up_indicator) by the broadcast signal transmitting apparatus will be described.

FIG. 31 illustrates a procedure for detecting a preamble ($P_{wakeup}$) generated as an EAS sequence for providing signaling for an emergency state and receiving an EAS message by a broadcast signal receiving apparatus.

First, the broadcast signal receiving apparatus may receive a broadcast signal.

Then, the broadcast signal receiving apparatus may search for a preamble ($P_{wakeup}$) generated as an emergency alert system (EAS) sequence (S25510). The broadcast signal receiving apparatus may check whether a scramble sequence of the preamble ($P_{wakeup}$) is an EAS sequence for providing signaling for an emergency state through a correlator. When the preamble is generated as the EAS sequence for providing signaling for an emergency state, the preamble may indicate that the EAC is present in a current signal frame, frame type set (Frame Type Set), or super frame or indicate that the EAC is present in a next signal frame, frame type set (Frame Type Set), or super frame.

Upon checking the EAS sequence, the broadcast signal receiving apparatus may decode the preamble ($P_{wakeup}$) generated as the emergency alert system (EAS) sequence. The preamble ($P_{wakeup}$) may include preamble data for providing control information for decoding the PLS-pre or the PLS-post. The broadcast signal receiving apparatus may detect and decode the EAC flag (EAS_flag) indicating whether the EAC is present in a current signal frame or super frame based on information obtained by decoding the preamble ($P_{wakeup}$) (S25520).

When the EAC flag (EAC_flag) indicates that the EAC is present in the current signal frame or super frame, the broadcast signal receiving apparatus may detect and decode the PLS-pre to acquire control information for decoding the PLS-post (S25530).

Then, the broadcast signal receiving apparatus may decode the PLS-post based on information obtained by decoding the PLS-pre (S25540). The PLS-post may include control information for decoding the EAC and the EAC flag (EAS_flag).

Then, the broadcast signal receiving apparatus may detect and decode the EAC based on information obtained by decoding the PLS-post (S25550). The EAC may transmit an emergency alert table (EAT). The emergency alert table (EAT) may include control information for an EAS message, EAS related information, and EAS additional information.

Figure 32:
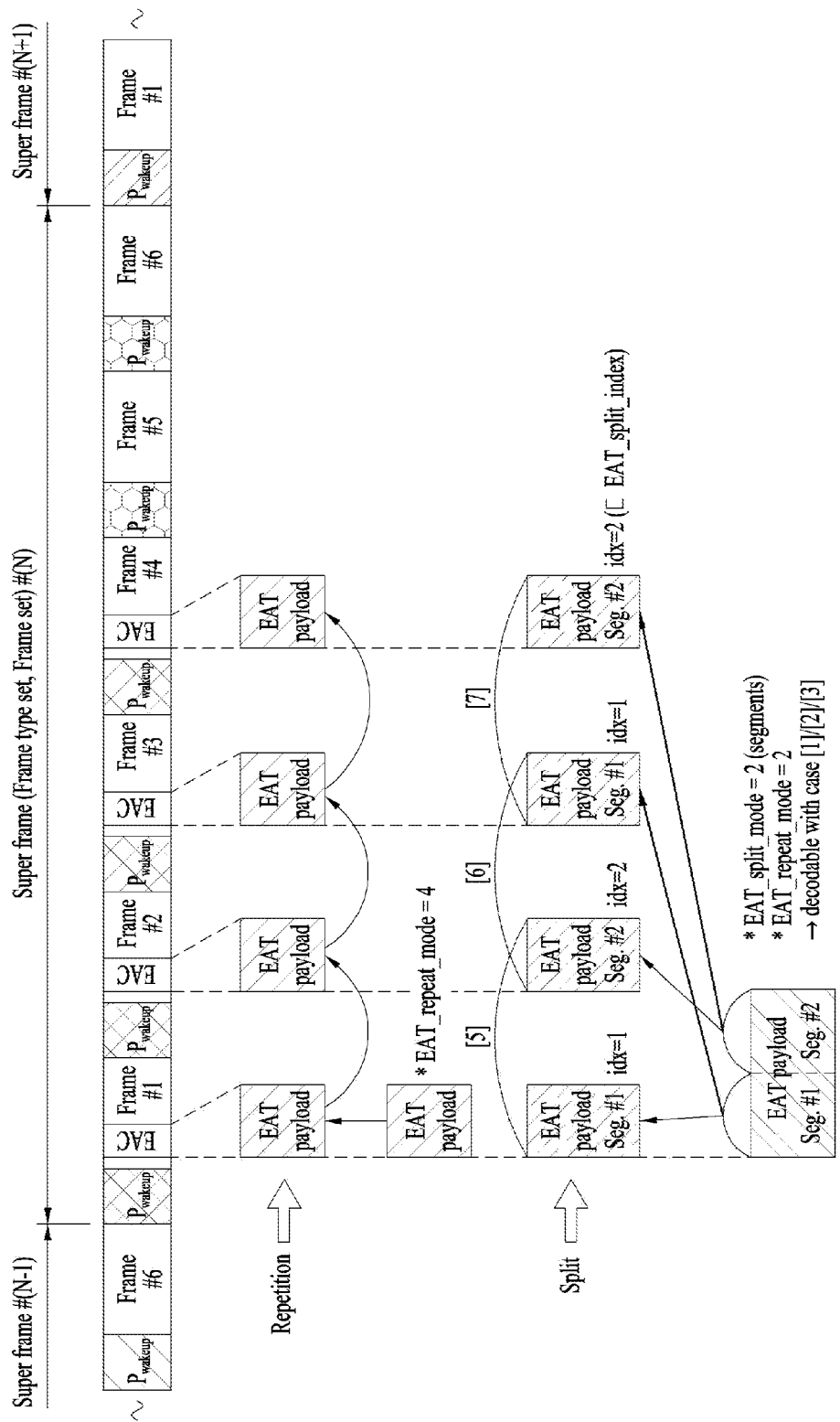
FIG. 32 is a diagram illustrating a method for repeating or splitting and transmitting an EAT by a broadcast signal receiving apparatus according to the fourth embodiment of the present invention.

FIG. 32 is a diagram illustrating a method for repeating or splitting and transmitting an EAT by a broadcast signal receiving apparatus according to the fourth embodiment of the present invention.

FIG. 32 illustrates a method for arranging EAS messages in order to more robustly transmit an EAS message by a broadcast signal transmitting apparatus.

The same configurations as those of FIG. 24 among configurations of FIG. 32 have the same description as in the above description of FIG. 24 and thus a detailed description thereof will be omitted here.

Each signal frame may include a preamble ($P_{wakeup}$) and an EAC (EAC). The EAC (EAC) may include an EAT-header and an EAT-payload. The EAT-header may have the same value in a super frame. When information such as a number, a length, etc. of an EAT-payload of each signal frame is included in the EAT-header, a corresponding value of information of the EAT-header may be changed every signal frame.

For example, the broadcast signal transmitting apparatus may repeatedly arrange the EAT-payload in four signal frames in one super frame.

For example, the broadcast signal transmitting apparatus may split an original EAT-payload into two EAT segments and may repeatedly arrange each split EAT segment in a total of four signal frames in one super frame two times. In this case, the broadcast signal transmitting apparatus may sequentially arrange EAT segments from a first signal frame of a super frame. Accordingly, a first EAT segment Seg.#1 and a second EAT segment Seg.#2 may be sequentially arranged in each signal frame. In addition, when the number of signal frames is higher than the number of EAT segments, the broadcast signal transmitting apparatus may sequentially rearrange and transmit the EAT segments from the first EAT segment Seg.#1 in the remaining signal frame. However, the present invention is not limited thereto, and the broadcast signal transmitting apparatus may arrange and transmit an arbitrary EAC segment in the remaining signal frames. For example, the broadcast signal transmitting apparatus may arrange the EAT signals in a signal frame at an order of the first EAT segment Seg.#1, the second EAT segment Seg.#2, the first EAT segment Seg.#1, and the second EAT segment Seg.#2.

When the broadcast signal transmitting apparatus transmits a broadcast signal by applying repetition and split, even if the broadcast signal receiving apparatus begins to receive the broadcast signal in an intermediate portion of a super frame or does not receive at least one EAC segment from the beginning, the broadcast signal receiving apparatus may decode the EAC to restore an original EAT-payload by receiving only EAT segments including an original EAT-payload.

For example, as shown in [5], the broadcast signal receiving apparatus may sequentially receive the first EAT segment Seg.#1 and the second EAT segment Seg.#2 and may restore an original EAT-payload. As shown in [6], the broadcast signal receiving apparatus may sequentially receive the second EAT segment Seg.#2 and the first EAT segment Seg.#1 and may rearrange sequences of the respective received EAT segments to restore the original EAT-payload. In addition, as shown in [7], the broadcast signal receiving apparatus may sequentially receive the repeated first EAT segment Seg.#1 and second EAT segment Seg.#2 to restore the original EAT-payload.

Figure 33:
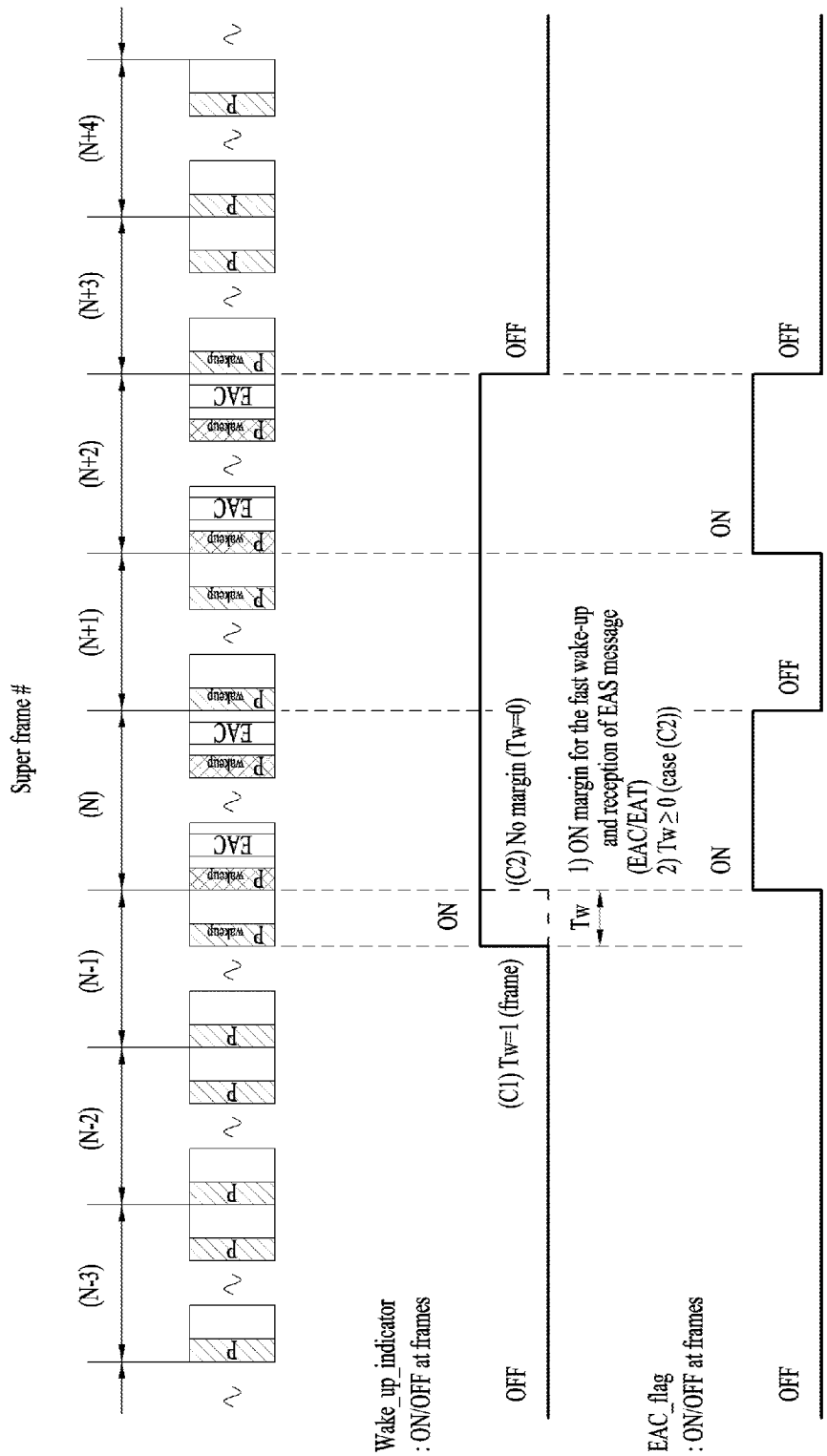
FIG. 33 is a diagram illustrating a method for transmitting an EAC in a unit of a super frame by a broadcast signal transmitting apparatus according to the fourth embodiment of the present invention.

FIG. 33 is a diagram illustrating a method for transmitting an EAC in a unit of a super frame by a broadcast signal transmitting apparatus according to the fourth embodiment of the present invention.

The broadcast signal transmitting apparatus may set an wake up indicator to indicate "ON" in a unit of a super frame or signal frame or may continuously set the wake up indicator to indicate "ON" from a signal frame in which the wake up indicator is first set to indicate "ON" to a last signal frame for transmitting the EAC.

The broadcast signal transmitting apparatus may set the EAC flag included in the preamble to "ON" in all signal frames in a super frame including the EAC and set the EAC flag included in the signaling information region (PLSC) to "ON" only in a signal frame including the EAC. In addition, the broadcast signal transmitting apparatus may set the EAC flag included in the preamble and the EAC flag included in the PLS.

Accordingly, the broadcast signal transmitting apparatus may add the EAC to a signal frame in a unit of a super frame and transmit the EAC or may transmit the EAC in a unit of a signal frame. Hereinafter, a case in which the broadcast signal transmitting apparatus adds an EAC to a signal frame in a unit of a super frame and transmits the EAC will be described.

FIG. 33 illustrates a plurality of super frames N−3, N−2, N−1, N, N+1, N+2, N+3, and N+4. The super frames N−3, N−2, N−1, N+1, N+3, and N+4 may not include the EAC (EAC) and the super frames N and N+2 may include the EAC (EAC). Each super frame may include at least one frame type set and signal frame, and each signal frame may include a preamble and an EAC.

A Period from a Super Frame N−3 to a Super Frame N−2

The period from the super frame N−3 to the super frame N−2 may be a period for transmitting a normal broadcast signal by a broadcast signal transmitting apparatus. The broadcast signal transmitting apparatus may set both a wake up indicator and an EAC flag to indicate "OFF".

When the wake up indicator indicates "OFF", the broadcast signal transmitting apparatus may add the preamble P that is not generated as an emergency alert system (EAS) sequence to a signal frame and may transmit the preamble P. In addition, when the EAC flag indicates "OFF", this indicates that the EAC is not present in a current signal frame or super frame.

Accordingly, the broadcast signal receiving apparatus does not have to unnecessarily search for an EAC because an EAS message is not transmitted in the super frame N−3 and the super frame N−2.

A Period of a Super Frame N−1

The period of the super frame N−1 may be a period in which an emergency state when an EAS message needs to be transmitted occurs and the broadcast signal transmitting apparatus transmits a broadcast signal for waking up the broadcast signal receiving apparatus. The broadcast signal transmitting apparatus may set a wake up indicator to indicate "ON" and set the EAC flag to indicate "OFF" from a fast signal frame if possible before the EAC (EAC) is transmitted.

As indicated by (C1), the broadcast signal transmitting apparatus may set a wake up indicator to indicate "ON" before at least one super frame or signal frame from a signal in which the EAC (EAC) is transmitted. In addition, as indicated by (C2), the broadcast signal transmitting apparatus may set a wake up indicator to indicate "ON" simultaneously with a super frame or signal frame in which the EAC (EAC) is transmitted. "Tw" may refer to an interval between a signal frame in which the wake up indicator is set to indicate "ON" and a signal frame in which the EAC (EAC) is present and its unit may be a signal frame.

When the wake up indicator indicates "ON", the broadcast signal transmitting apparatus may transmit a preamble ($P_{wakeup}$) generated as an EAS sequence. However, when the EAC flag indicates "OFF", this may indicate that an EAC (EAC) is not present in a current signal frame in the super frame N−1.

Accordingly, since an EAS message is not transmitted in the super frame N−1 but the EAC (EAC) is included from a next super fame, the broadcast signal transmitting apparatus may wake up the broadcast signal receiving apparatus. That is, the broadcast signal receiving apparatus may be converted into a mode for receiving and processing data from a power-off mode or a standby mode in order to receive and process data such as EAS.

A Period of a Super Frame N

The super frame N may be a period in which the EAS message is transmitted. All signal frames in the super frame N may include the EAC (EAC). The broadcast signal transmitting apparatus may set both a wake up indicator and an EAC flag to indicate "ON".

When the wake up indicator indicates "ON", the broadcast signal transmitting apparatus may transmit a preamble ($P_{wakeup}$) generated as an EAS sequence. In addition, the EAC flag indicates "ON", this indicates that the EAC (EAC) is present in a current signal frame in the super frame N.

Accordingly, the broadcast signal receiving apparatus may detect and decode the EAC (EAC) in a period of the super frame N to acquire the EAS message.

A Period of a Super Frame N+1

The period of the super frame N+1 may be a period for transmitting a signal for waking up the broadcast signal receiving apparatus similarly to the period of the super frame N−1. The broadcast signal transmitting apparatus may set to the wake up indicator to indicate "ON" and set the EAC flag to indicate "OFF".

When the wake up indicator indicates "ON", the broadcast signal transmitting apparatus may transmit the preamble ($P_{wakeup}$) generated as an EAS sequence. However, when the EAC flag indicates "OFF", this indicates that the EAC (EAC) is not present in a current signal frame in the super frame N+1.

Accordingly, the broadcast signal transmitting apparatus may maintain the broadcast signal receiving apparatus in a wake up mode.

A Period of a Super Frame N+2

The super frame N+2 may be a period in which an EAS message is transmitted and its operation is the same as an operation in the super frame N.

A Period of Super Frames N+3 and N+4

When there is no plan to transmit the EAS message any longer, the broadcast signal transmitting apparatus may set both the wake up indicator and the EAC flag to indicate "OFF". For example, the broadcast signal transmitting apparatus may convert the preamble ($P_{wakeup}$) generated as an EAS sequence into the preamble P that is not generated as an EAS sequence and transmit the preamble P that is not generated as an EAS sequence.

As described above, the broadcast signal transmitting apparatus may set ON/OFF of the EAC flag in a unit of a super frame.

Figure 34:
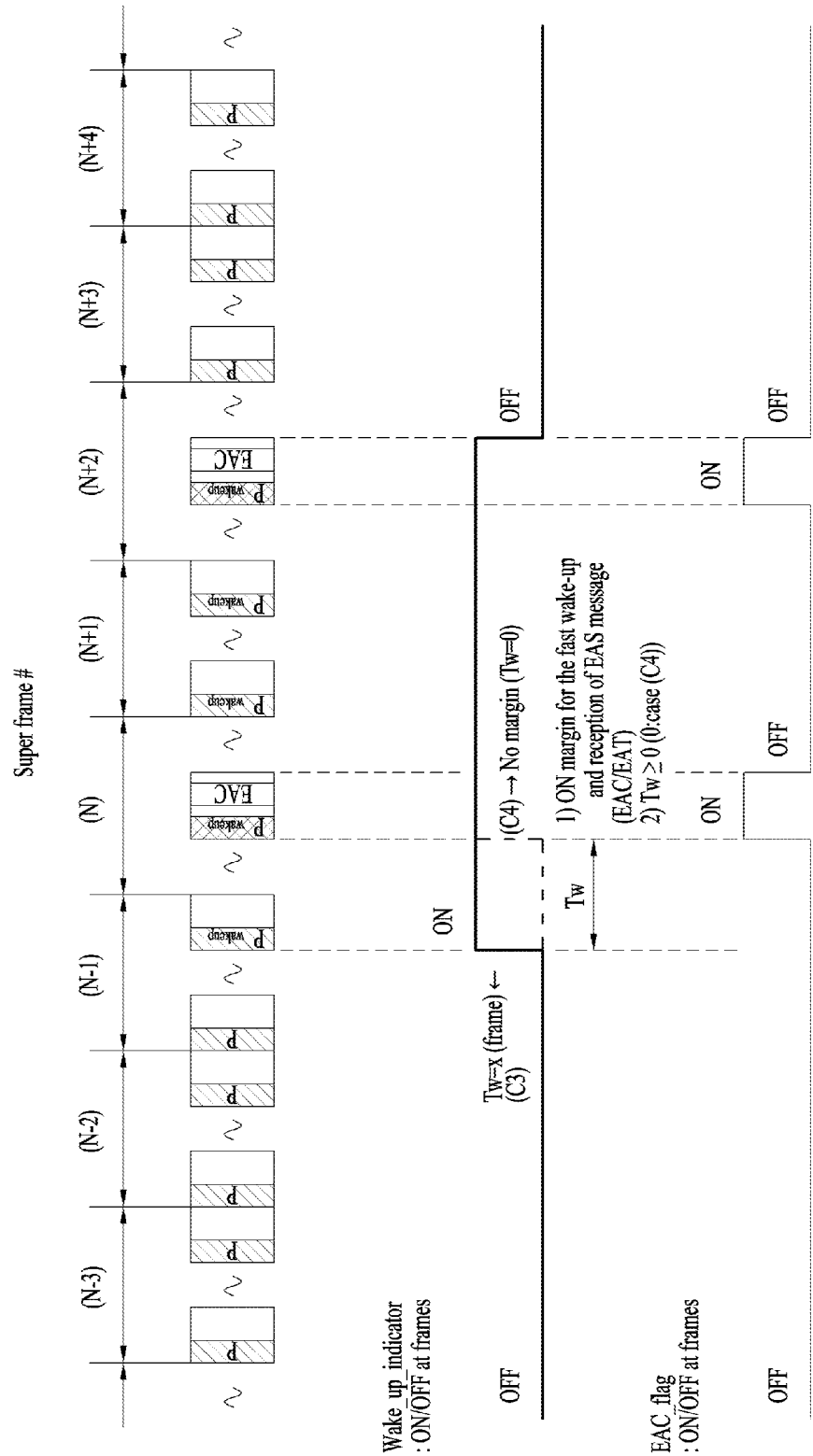
FIG. 34 is a diagram illustrating a method for transmitting an EAC by a broadcast signal transmitting apparatus in a unit of a signal frame according to the fourth embodiment of the present invention.

FIG. 34 is a diagram illustrating a method for transmitting an EAC by a broadcast signal transmitting apparatus in a unit of a signal frame according to the fourth embodiment of the present invention.

FIG. 34 illustrates the case in which the broadcast signal transmitting apparatus transmits the EAC in a unit of a signal frame. The same configurations as those of FIG. 33 among configurations illustrated in FIG. 34 have the same description as in the above description of FIG. 33 and thus a detailed description thereof will be omitted here.

A Period of the Super Frame N−1

As shown in (C3), the broadcast signal transmitting apparatus may set a wake up indicator to indicate "ON" before at least one super frame or signal frame from a signal frame in which the EAC (EAC) is transmitted. In addition, as shown in (C4), the broadcast signal transmitting apparatus may set the wake up indicator simultaneously with a super frame or signal frame in which the EAC (EAC) is transmitted.

A Period of the Super Frame N

The super frame N may be a period in which an EAS message is transmitted in some signal frames. Only some signal frame in the super frame N may include the EAC (EAC). The broadcast signal transmitting apparatus may set both the wake up indicator and the EAC flag to indicate "ON" only in the signal frame including the EAC (EAC).

When the wake up indicator indicates "ON", the broadcast signal transmitting apparatus may transmit the preamble ($P_{wakeup}$) generated as an EAS sequence. In addition, the EAC flag indicates "ON", this indicates that the EAC (EAC) is present in a current signal frame in the super frame N.

Accordingly, the broadcast signal receiving apparatus may detect and decode the EAC (EAC) to acquire the EAS message only in the signal frame including the EAC (EAC) in the period of the super frame N.

A Period of the Super Frame N+2

The super frame N+2 may be a period in which the EAS message is transmitted in some signal frame and its operation is the same as in the super frame N. That is, only some signal frames in the super frame N+2 includes the EAC. The broadcast signal transmitting apparatus may set both the wake up indicator and the EAC flag to indicate "ON" only in the signal frame including the EAC.

When there is no plan to transmit an EAS message any longer from some signal frame in which the EAS message is transmitted, the broadcast signal transmitting apparatus may set both the wake up indicator and the EAC flag to indicate "OFF" from the corresponding signal frame.

As described above, the broadcast signal transmitting apparatus may set ON/OFF of the EAC flag in a unit of a signal frame. In addition, signal frames in which the EAC is present may be present in one super frame or may be continuously present in a plurality of super frames.

Figure 35:
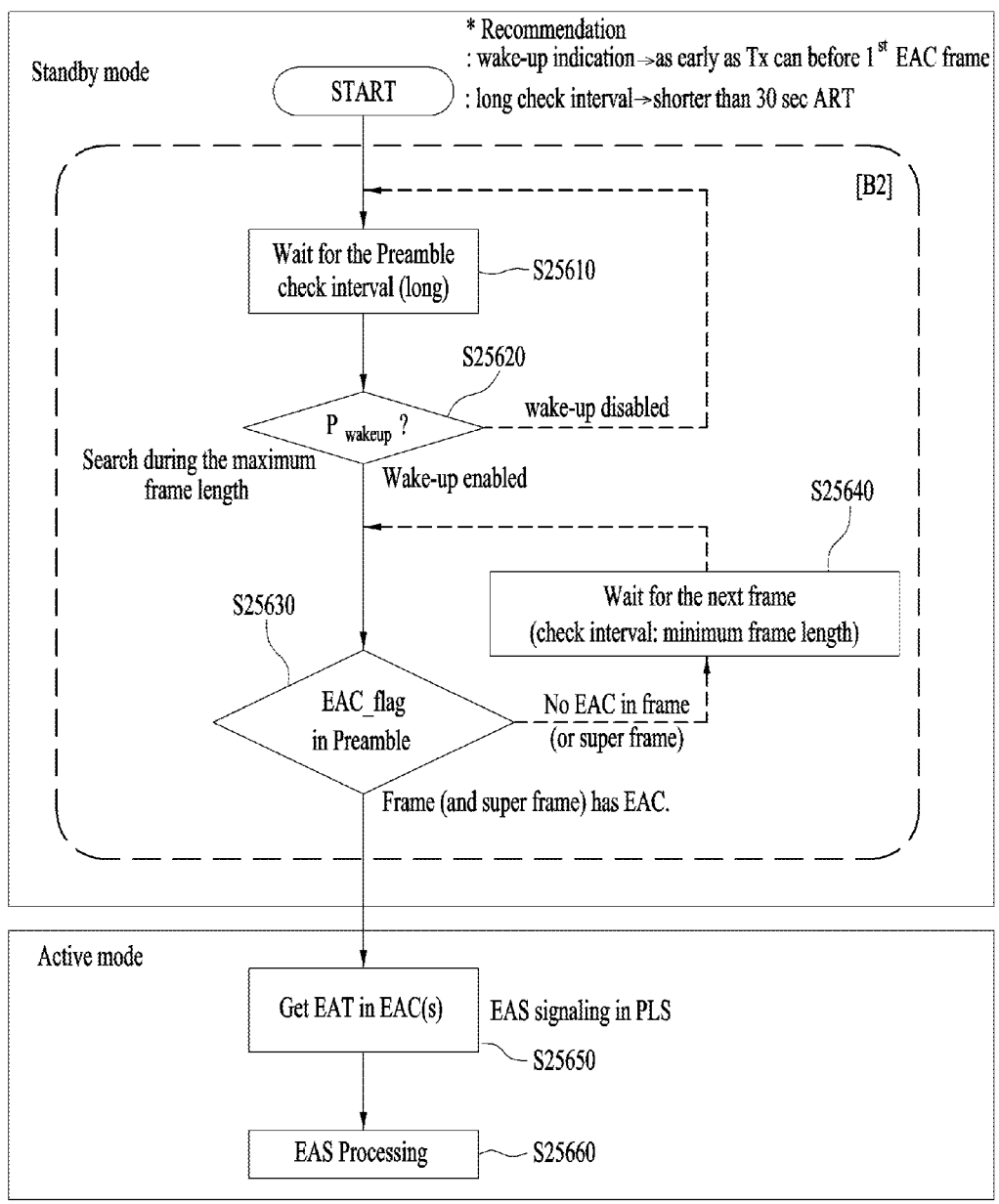
FIG. 35 is a diagram illustrating a procedure for receiving an EAS message without decoding PLS-post by a broadcast signal receiving apparatus according to the fourth embodiment of the present invention.

FIG. 35 is a diagram illustrating a procedure for receiving an EAS message without decoding PLS-post by a broadcast signal receiving apparatus according to the fourth embodiment of the present invention.

FIG. 35 illustrates a method for searching for a preamble to acquire an EAS message by a broadcast signal receiving apparatus when a broadcast signal transmitting apparatus inserts a wake-up indication signal into a preamble and transmits the preamble, according to an embodiment of the present invention. That is, FIG. 35 corresponds to an embodiment of a method for acquiring an EAS message without decoding the PLS-post by the broadcast signal receiving apparatus acquires when the broadcast signal transmitting apparatus sets a scramble sequence of the preamble to the wake up indicator (wake_up_indicator). The broadcast signal transmitting apparatus may set the wake up indicator (wake_up_indicator) to "ON" as soon as possible before a first signal frame in which the EAC is present. In addition, the embodiment illustrated in FIG. 35 corresponds to the case in which there is one preamble.

The same configurations as those of FIG. 25 among configurations of FIG. 35 have the same description as in the above description of FIG. 25 and thus a detailed description thereof will be omitted here.

The broadcast signal receiving apparatus may wait for a time point for testing a preamble (S25610).

The broadcast signal receiving apparatus may search for a preamble ($P_{wakeup}$) generated as an emergency alert system (EAS) sequence (S25620).

When the broadcast signal receiving apparatus is wake-up disable to search for a preamble ($P_{wakeup}$) generated as an emergency alert system (EAS) sequence, the broadcast signal receiving apparatus may re-wait for a period for testing a preamble (S25610). In addition, the broadcast signal receiving apparatus may wait for a predetermined time period and then re-search for a preamble. The predetermined time period may be 30 seconds or may be a value equal to 30 seconds or more or 30 seconds or less.

When the broadcast signal receiving apparatus is wake-up enable to search for the preamble ($P_{wakeup}$) generated as an emergency alert system (EAS) sequence, the broadcast signal receiving apparatus may detect an EAC flag included in the preamble ($P_{wakeup}$) or the PLS-pre (S25630). In this case, the broadcast signal receiving apparatus may omit detection of the PLS-post.

When the EAC flag indicates that an EAC is not present in a current signal frame or super frame (No EAT in frame or super frame), the broadcast signal receiving apparatus may determine that an EAS related signal is not present in the current signal frame or super frame and re-detect the EAC flag in a next signal frame or super frame based on signal frame or super frame information obtained from the PLS-pre (S25640). In addition, the broadcast signal receiving apparatus may wait for a predetermined time period and then detect the EAC flag. The predetermined time period may be a minimum frame length or may be a minimum frame length or more or a minimum frame length or less.

When the EAC flag indicates that the EAC is present in the current signal frame or super frame (Frame has EAT), the broadcast signal receiving apparatus may receive the EAC and transmit the EAS message to a user in an active mode.

Hereinafter, an operation of a broadcast signal receiving apparatus in an active mode will be described.

When the EAC flag indicates that the EAC is present in the signal frame, the broadcast signal receiving apparatus may decode the EAC (S25650).

Then the broadcast signal receiving apparatus may perform EAS processing (S25660).

Figure 36:
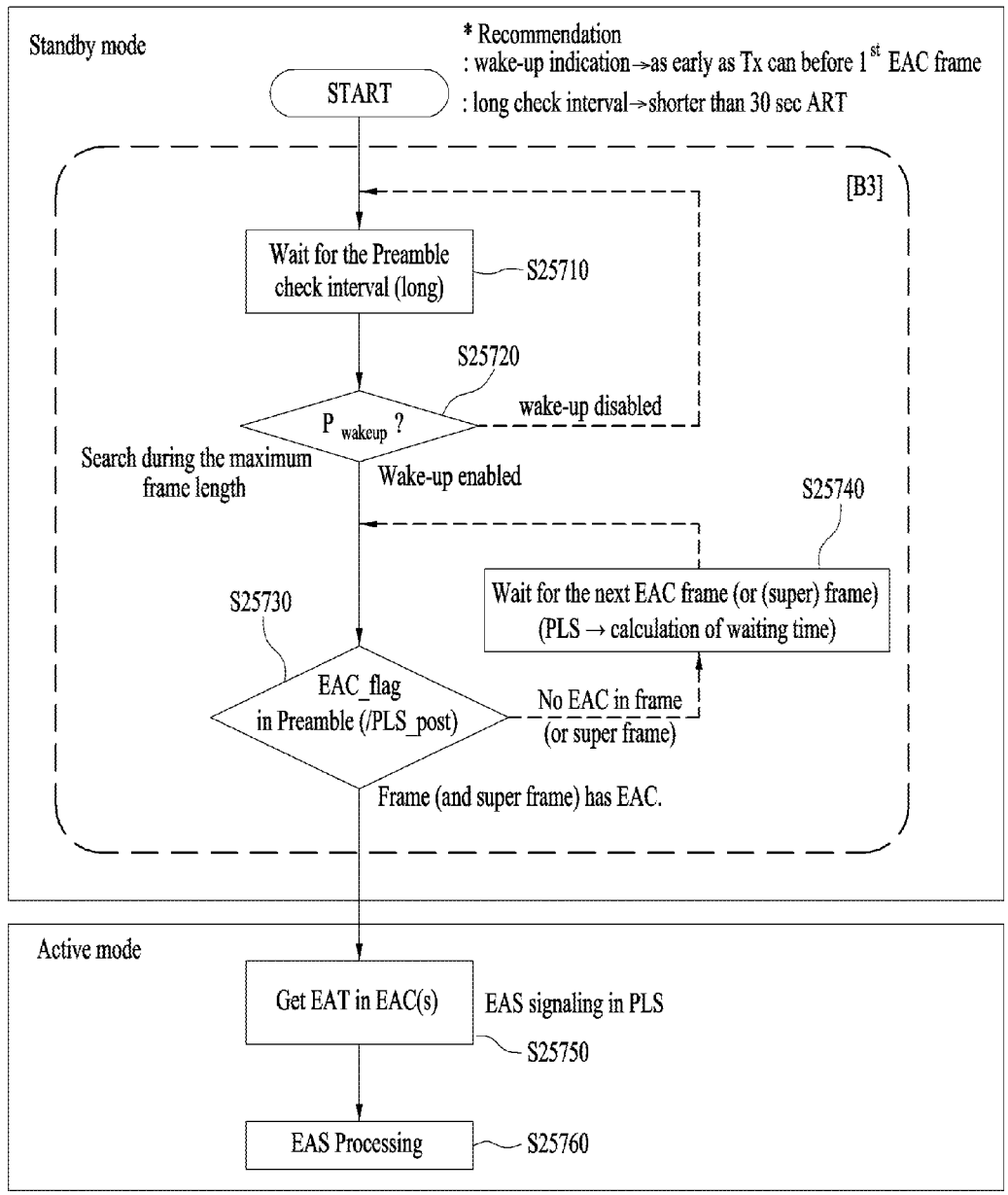
FIG. 36 is a diagram illustrating a procedure for decoding PLS-post and receiving an EAS message by a broadcast signal receiving apparatus according to the fourth embodiment of the present invention.

FIG. 36 is a diagram illustrating a procedure for decoding PLS-post and receiving an EAS message by a broadcast signal receiving apparatus according to the fourth embodiment of the present invention.

FIG. 36 illustrates a method for decoding the PLS-post and acquiring the EAS message by a broadcast signal receiving apparatus when a broadcast signal transmitting apparatus sets a scramble sequence of a preamble to a wake up indicator (wake_up_indicator).

The same configurations as those of FIG. 25 or 34 among configuration of FIG. 36 have the same description as in the above description of FIG. 25 or 34 and thus a detailed description thereof will be omitted here.

The broadcast signal receiving apparatus may wait for a time point for testing a preamble (S25710).

The broadcast signal receiving apparatus may search for a preamble ($P_{wakeup}$) generated as an emergency alert system (EAS) sequence (S25720).

When the broadcast signal receiving apparatus is wake-up disable to search for a preamble ($P_{wakeup}$) generated as an emergency alert system (EAS) sequence, the broadcast signal receiving apparatus may re-wait for a period for testing a preamble (S25710).

When the broadcast signal receiving apparatus is wake-up enable to search for the preamble ($P_{wakeup}$) generated as an emergency alert system (EAS) sequence, the broadcast signal receiving apparatus may detect an EAC flag included in the preamble ($P_{wakeup}$) or the PLS-pre. In addition, the broadcast signal receiving apparatus may detect and decode the PLS-post based on information obtained by decoding the preamble or the PLS-pre (S25730).

When the EAC flag indicates that an EAC is not present in a current signal frame or super frame (No EAT in frame or super frame), the broadcast signal receiving apparatus may acquire configuration information of a signal frame or a super frame based on information obtained by decoding the PLS-post.

Accordingly, the broadcast signal receiving apparatus may wait for a next signal frame or super frame including the EAC, check the preamble, and then detect the EAC flag (S25740). In addition, the broadcast signal receiving apparatus may wait for an arbitrary signal frame or super frame including the EAC, check the preamble, and then detect the EAC flag.

In this case, the broadcast signal receiving apparatus may omit a procedure for checking a preamble in a signal frame or super frame that does not include the EAC, thereby reducing power consumption.

Hereinafter, an operation of a broadcast signal receiving apparatus in an active mode will be described.

When the EAC flag indicates that the EAC is present in a signal frame or a super frame, the broadcast signal receiving apparatus may decode the EAC (S25750).

Then, the broadcast signal receiving apparatus may perform EAS processing (S25760).

Although FIG. 36 illustrates a procedure for detecting and decoding the PLS-post by the broadcast signal receiving apparatus in a standby mode, the present invention is not limited thereto. The broadcast signal receiving apparatus may detect and decode the EAC flag included in the PLS-post in an active mode. The EAC flag may be one of dynamic PLS signaling data of the PLS-post.

Accordingly, the broadcast signal receiving apparatus may detect the EAC flag a total of two times by detecting the EAC flag included in the preamble ($P_{wakeup}$) or PLS-pre and then detecting the EAC flag included in the PLS-post. In addition, when the EAC flag indicates that the EAC is present in the current signal frame or super frame in both two cases, the broadcast signal receiving apparatus may perform operation S25750, and when the EAC flag indicates that the EAC is not present in the current signal frame or super frame in at least one case, the broadcast signal receiving apparatus may perform operation S25740.

Figure 37:
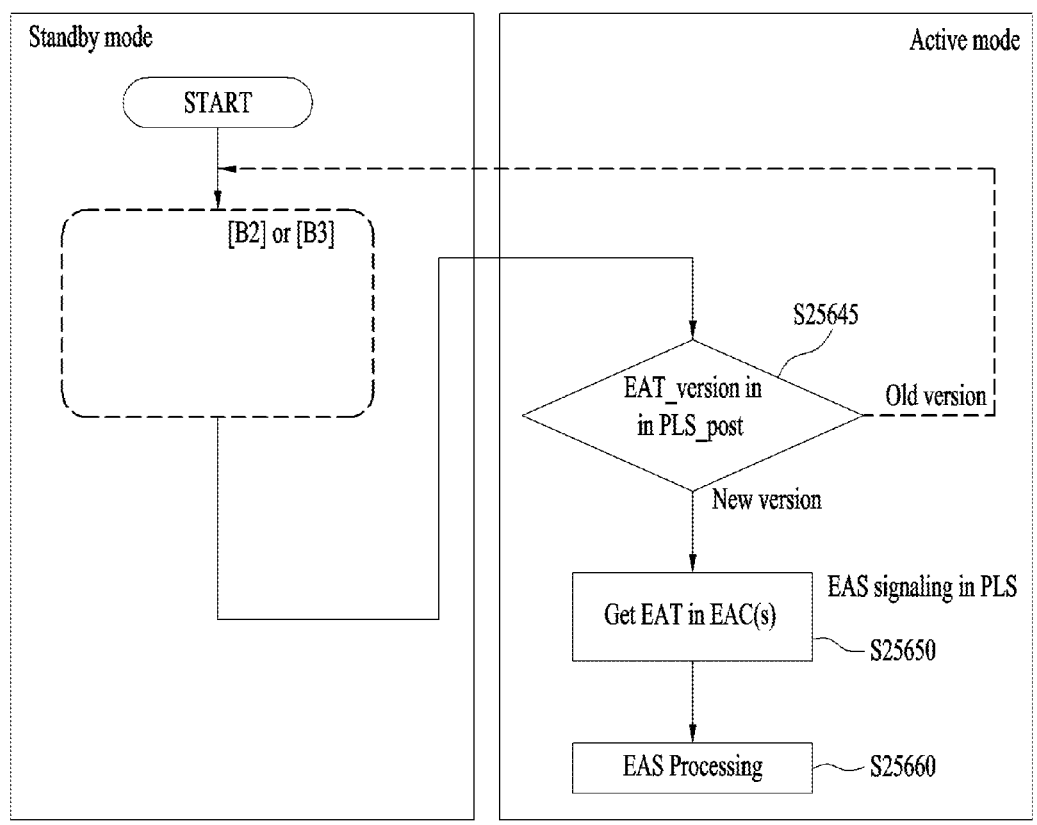
FIG. 37 is a versioning procedure of an EAS according to the fourth embodiment of the present invention.

FIG. 37 is a versioning procedure of an EAS according to the fourth embodiment of the present invention.

FIG. 37 illustrates a method for acquiring an EAS message of a new version using version information by a broadcast signal receiving apparatus, according to an embodiment of the present invention.

The same configurations as those of FIG. 26, 35, or 36 among configuration of FIG. 37 have the same description as in the above description of FIG. 26, 35, or 36 and thus a detailed description thereof will be omitted here.

A configuration of [B2] or [B3] indicated by a dotted line in FIG. 37 is the same as that of [B2] indicated by a dotted line of FIG. 35 or that of [B3] indicated by a dotted line of FIG. 36, and thus the configurations will be omitted in FIG. 37. The same configurations as those of [B2] or [B3] described with reference to FIG. 35 or 36 among the configurations of [B2] or [B3] of FIG. 37 have the same description as in the above description of FIG. 35 or 36 and thus a detailed description thereof will be omitted here.

After the procedure of [B2] or [B3], when the EAC is present in the corresponding signal frame or super frame, the broadcast signal receiving apparatus may check the version information (EAT_version) of the EAT (S25645). Version information may be present in the PLS-post and may be one of dynamic PLS signaling data of the PLS-post. In some embodiments, the version information may be present in the preamble or the PLS-pre.

The broadcast signal receiving apparatus may check whether a version of the current EAT or wake up indicator is the same as a version of a previously dismissed EAT or wake up indicator through version information. When the version of the EAT or wake up indicator is an old version, the broadcast signal receiving apparatus may return to an initial process and may be standby and may not decode the EAC. When the version of the EAT or wake up indicator is a new version, the broadcast signal receiving apparatus may decode the EAC. A subsequent procedure may be performed in the same way as in the description of FIG. 26.

In FIG. 37, the broadcast signal receiving apparatus may detect and decode the EAC flag included in the PLS-post in an active mode.

Accordingly, the broadcast signal receiving apparatus may detect the EAC flag a total of two times by detecting the EAC flag included in the preamble ($P_{wakeup}$) or the PLS-pre and then detecting the EAC flag included in the PLS-post. In addition, when the EAC flag indicates that the EAC is present in the current signal frame or super frame in both two cases, the broadcast signal receiving apparatus may perform operation S25645, and when the EAC flag indicates that the EAC is not present in the current signal frame or super frame in at least one case, the broadcast signal receiving apparatus may return to an initial operation and standby and may not decode the EAC.

Figure 38:
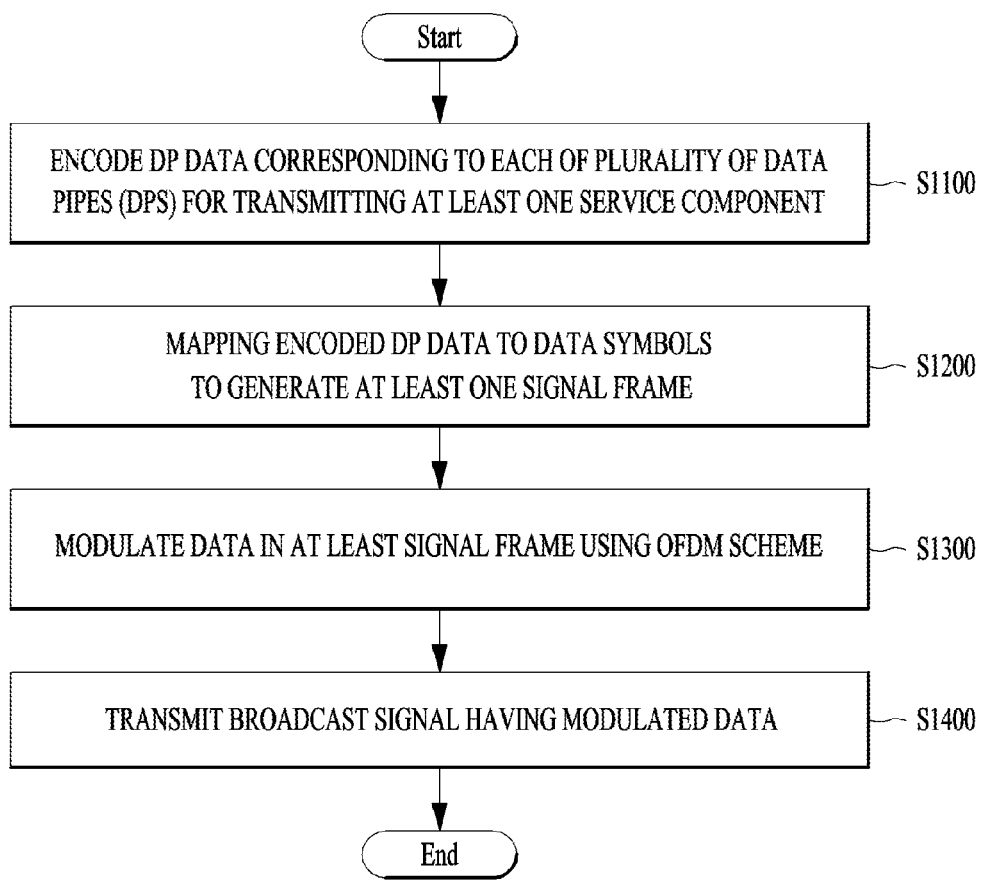
FIG. 38 is a diagram illustrating a method for transmitting a broadcast signal by a broadcast signal transmitting apparatus according to an embodiment of the present invention.

In addition, the broadcast signal receiving apparatus may perform operation S25640 of FIG. 37 or operation S25740 of FIG. 38 as well as return to an initial procedure when the EAC flag indicates that the EAC is not present in the current signal frame or super frame or when version information indicates an old version.

FIG. 38 is a diagram illustrating a method for transmitting a broadcast signal by a broadcast signal transmitting apparatus according to an embodiment of the present invention.

Referring to FIG. 38, the method for transmitting a broadcast signal may include encoding DP data corresponding to each of a plurality of data pipes (DPs) for transmitting at least one service component, mapping the encoded DP data to data symbols to generate at least one signal frame, modulating data in at least one signal frame using an OFDM scheme, and transmitting a broadcast signal having the modulated data.

The broadcast signal transmitting apparatus may encode DP data corresponding to each of a plurality of data pipes (DPs) for transmitting at least one service component (S1100). The coding & modulation module 1100 or an encoder may encode the DP data. The DP data may be performed for each DP corresponding to data as described above. The DP data may be data for any one of EAC, FIC-DP, Section-DP, Normal-DP, EAS-DP, and NRT-DP.

The broadcast signal transmitting apparatus may encode signaling data (or physical signaling data). The signaling generation module 1400 may encode the signaling data. The signaling data may be data for PLS-pre and PLS-post. The PLS-pre and the PLS-post may include information associated with transmission of a signal frame or a super frame and control information associated with the EAS. The PLS-pre may include information for receiving and decoding the PLS-post and the PLS-post may include information for decoding the EAC and each DP. However, the present invention is not limited thereto, and the PLS-pre may include information for decoding the EAC and each DP. The PLS-post may include the EAC flag indicating whether the EAC is present in the signal frame or the super frame.

Then, the broadcast signal transmitting apparatus may map the encoded DP data to data symbols to generate at least one signal frame (S1200). The frame structure module 1200 or a mapper may map DP data to data symbols.

The signal frame may include the signaling information region (PLSC) having signaling information for access to each DP and a preamble generated as an emergency alert system (EAS) sequence for providing signaling for an emergency state.

The broadcast signal transmitting apparatus may set a wake up indicator (wake_up_indicator) for waking up the broadcast signal receiving apparatus using a preamble. A first method is setting a scramble sequence of a preamble to a wake up indicator (wake_up_indicator). A second method is setting the wake_up_flag as preamble data to a wake up indicator (wake_up_indicator).

The preamble may include the EAC flag and the wake_up_flag. The EAC flag may indicate whether the EAC is present in the signal frame or the super frame. The wake_up_flag may be used to determine whether the broadcast signal receiving apparatus is converted to an active mode from a power-off mode or a standby mode. When the EAC flag indicates that the EAC is present in the signal frame, the EAC including an emergency alert message may be positioned behind the signaling information region (PLSC).

In addition, the signal frame may further include an EAC.

The EAC may be a channel for transmitting an emergency alert message such as a common alerting protocol (CAP) in a physical layer in order to robustly receive a broadcast signal by all broadcast receiving apparatus irrespective of a fixed broadcast signal receiving apparatus or a mobile broadcast signal receiving apparatus. In addition, the EAC may include information about at least one DP for transmitting additional information associated with the emergency alert message.

The broadcast signal transmitting apparatus may repeat or split, arrange, and transmit the EAC in order to more robustly transmit the EAS message.

In addition, at least one DP of the signal frame may include EAS-DP and NRT-DP which have additional information associated with an emergency alert message.

In addition, the signal frame may further include a header edge pilot, a data symbol, a tail edge pilot, FIC-DP, and Section-DP, which has been described in detail and thus a description thereof will be omitted here.

Then, the broadcast signal transmitting apparatus may modulate data in at least one signal frame using an OFDM scheme (S1300). The waveform generation module 1300 or a modulator may module data in a signal frame using an OFDM scheme.

Then, the broadcast signal transmitting apparatus may transmit a broadcast signal having the modulated data using a transmitter (S1400).

Figure 39:
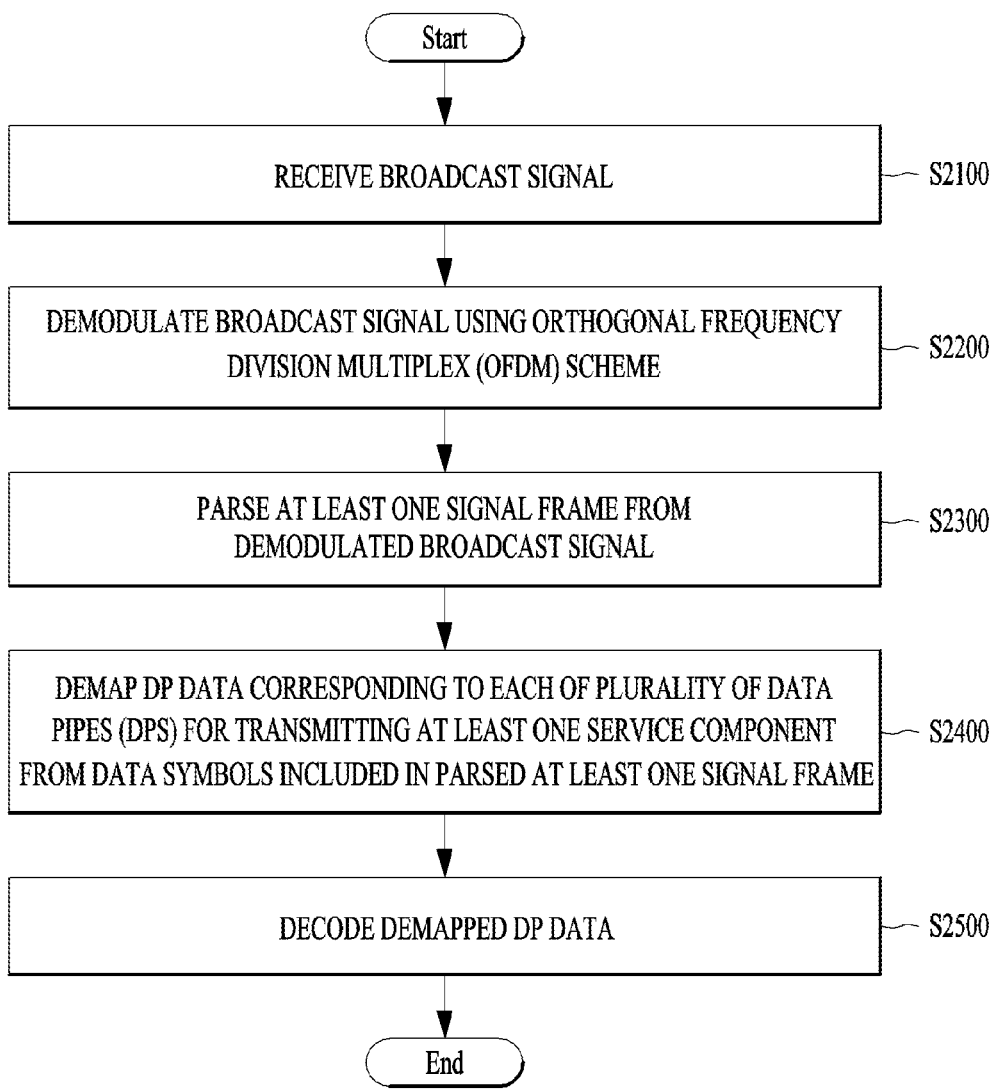
FIG. 39 is a diagram illustrating a method for receiving a broadcast signal by a broadcast signal receiving apparatus according to an embodiment of the present invention.

FIG. 39 is a diagram illustrating a method for receiving a broadcast signal by a broadcast signal receiving apparatus according to an embodiment of the present invention.

FIG. 39 may correspond to a reverse procedure of the method for transmitting a broadcast signal described with reference to FIG. 38 and the description of FIG. 38 may be applied to FIG. 39 in the same way.

Referring to FIG. 39, the broadcast signal receiving method may include receiving a broadcast signal, demodulating the broadcast signal using an orthogonal frequency division multiplex (OFDM) scheme, parsing at least one signal frame from the demodulated broadcast signal, demapping DP data corresponding to each of a plurality of data pipes (DPs) for transmitting at least one service component from data symbols included in the parsed at least one signal frame, and decoding the demapped DP data.

The broadcast signal receiving apparatus may receive at least one broadcast signal using a receiver (S2100). The broadcast signal may include an EAC.

Then, the broadcast signal receiving apparatus may demodulate the received at least one broadcast signal using an OFDM scheme (S2200). The synchronization & demodulation module 8000 and a demodulator may demodulate a broadcast signal.

As described above, a broadcast signal receiving apparatus that receives a plurality of broadcast signals including the EAC may first detect a preamble, may rapidly scan a plurality of channels, and may acquire service information included in each channel.

For example, the broadcast signal receiving apparatus may check whether a scramble sequence of a preamble is an EAS sequence for providing signaling for an emergency state through a correlator. In addition, the broadcast signal receiving apparatus may activate a preamble check block every period for testing a preamble and check the preamble. The preamble check block may be the preamble detector 9300 for searching for a preamble generated as an emergency alert system (EAS) sequence.

The preamble may be generated as an emergency alert system (EAS) sequence. In addition, the preamble may include the wake_up_flag. In addition, the preamble may include preamble data for providing control information for decoding the PLS-pre or the PLS-post.

Then, the broadcast signal receiving apparatus may parse at least one signal frame from the modulated broadcast signal (S2300). The frame parsing module 8100 or a parser may parse at least one signal frame.

The signal frame may include at least one DP, etc. having additional information associated with the aforementioned preamble, signaling information region (PLSC), EAC, and emergency alert message.

Then, the broadcast signal receiving apparatus may decode the signaling data (or physical signaling data) included in at least one signal frame. The signaling decoding module 8400 may decode the signaling data. The signaling data may be data for the PLS-pre and the PLS-post. In addition, the signaling data may be data associated with the EAC.

Then, the broadcast signal receiving apparatus may demap DP data corresponding to each of a plurality of data pipes (DPs) for transmitting at least one service component from data symbols included in the parsed at least one signal frame (S2400). The demapping & decoding module 8200 or a demapper may demap DP data.

Then, the broadcast signal receiving apparatus may decode the demapped DP data (S2500). The demapping & decoding module 8200 or a decoder may decode the DP data.

The broadcast signal receiving apparatus may detect the EAC flag included in the preamble and the PLS-post. The preamble detector 9300 may search for a preamble generated as an emergency alert system (EAS) sequence and detect the EAC flag included in the preamble. In some embodiments, the demapping & decoding module 8200 or a decoder may detect the EAC flag included in the preamble. The demapping & decoding module 8200 or a decoder may decode the PLS-post and detect the EAC flag.

When the detected EAC flag indicates that the EAC is present in a signal frame or a super frame, the broadcast signal receiving apparatus may decode the EAC positioned behind the signaling information region (PLSC). The demapping & decoding module 8200 or a decoder may decode the EAC.

For example, the demapping & decoding module 8200 or a decoder may decode the PLS-pre, decode the PLS-post based on information obtained by decoding the PLS-pre, and detect and decode the EAC based on information obtained by decoding the PLS-post. In some embodiments, the demapping & decoding module 8200 or a decoder may omit a procedure for decoding the PLS-pre or the PLS-post and may detect and decode the EAC.

In addition, the broadcast signal receiving apparatus may acquire additional information associated with the emergency alert message using the decoded EAC. The demapping & decoding module 8200 or a decoder may acquire additional information. In this case, the EAC may include information about at least one DP having additional information associated with the emergency alert message.

In addition, the broadcast signal receiving apparatus may acquire a new version of an EAS message using version information.

Thus far, the description has been given in terms of the first to fourth embodiments of the present, but according to an embodiment of the present invention, the present invention may be embodied via a combination of the first and fourth embodiments of the present invention. In addition, the description of components of the broadcast signal transmitting apparatus and components of the broadcast signal receiving apparatus may be applied to each other in the same way. In addition, the description of the broadcast signal transmitting method and the broadcast signal receiving method may be applied to each other in the same way.

Various embodiments have been described in the best mode for carrying out the invention.

The present invention is industrially applicable to a type of industrial field associated with a broadcast signal transmitting method, a broadcast signal receiving apparatus, a broadcast signal transmitting apparatus, and a broadcast signal receiving apparatus.

What is claimed is:

1. A method for transmitting a broadcast signal, the method comprising:
   encoding data pipe (DP) data corresponding to each of a plurality of DPs;
   mapping the encoded DP data to data symbols to generate at least one signal frame;
   modulating data in the at least one signal frame using an orthogonal frequency division multiplex (OFDM) scheme;
   inserting a preamble at a beginning of each of the at least one signal frame in a time domain; and
   transmitting a broadcast signal having the preamble and the modulated data of the at least one signal frame,
   wherein the preamble includes a wake-up indicator which wakes up a receiver to decode a DP for an emergency alert table (EAT) and acquire the EAT.

2. The method of claim 1,
   wherein the receiver in a first state is converted to a second state to process the emergency alert table.

3. The method of claim 2,
   wherein the preamble is generated from a combination of sequences.

4. The method of claim 2,
   wherein the broadcast signal further includes signaling information indicating whether the signal frame includes the EAT.

5. A method for receiving a broadcast signal, the method comprising:
   receiving a broadcast signal including at least one signal frame;
   detecting a preamble at a beginning of each of the at least one signal frame in a time domain, wherein the preamble includes a wake-up indicator which wakes up a receiver to decode a data pipe for an emergency alert table (EAT) and acquire the EAT;
   demodulating the broadcast signal using an orthogonal frequency division multiplex (OFDM) scheme;
   parsing at least one signal frame from the demodulated broadcast signal;
   demapping DP data corresponding to each of a plurality of data pipes (DPs) included in the parsed at least one signal frame; and
   decoding the demapped DP data.

6. The method of claim 5,
   wherein the receiver in a first state is converted to a second state to process the emergency alert table.

7. The method of claim 6,
   wherein the preamble is generated from a combination of sequences.

8. The method of claim 6,
   wherein the broadcast signal further includes signaling information indicating whether the signal frame includes the EAT.

9. A broadcast signal transmitting apparatus comprising:
   an encoder to encode data pipe (DP) data corresponding to each of a plurality of DPs;
   a mapper to map the encoded DP data to data symbols to generate at least one signal frame;
   a modulator to modulate data in the at least one signal frame using an orthogonal frequency division multiplex (OFDM) scheme;
   a preamble inserter to insert a preamble at a beginning of each of the at least one signal frame in a time domain; and
   a transmitter to transmit a broadcast signal having the modulated data of the at least one signal frame,
   wherein the preamble includes a wake-up indicator which wakes up a receiver to decode a DP for an emergency alert table (EAT) and acquire the EAT.

10. The apparatus of claim 9,
    wherein the receiver in a first state is converted to a second state to process the emergency alert table.

11. The apparatus of claim 10,
    wherein the preamble is generated from a combination of sequences.

12. The apparatus of claim 10,
    wherein the broadcast signal further includes signaling information indicating whether the signal frame includes the EAT.

13. A broadcast signal receiving apparatus comprising:
    a receiver to receive a broadcast signal including at least one signal frame;
    a preamble detector to detect a preamble at a beginning of each of the at least one signal frame in a time domain, wherein the preamble includes a wake-up indicator which wakes up the broadcast signal receiving apparatus to decode a data pipe for an emergency alert table (EAT) and acquire the EAT;
    a demodulator to demodulate the broadcast signal using an orthogonal frequency division multiplex (OFDM) scheme;
    a parser to parse at least one signal frame from the demodulated broadcast signal;
    a demapper to demap DP data corresponding to each of a plurality of data pipes (DPs) included in the parsed at least one signal frame; and
    a decoder to decode the demapped DP data.

14. The apparatus of claim 13,
    wherein the apparatus in a first state is converted to a second state to process the emergency alert table.

15. The apparatus of claim 14,
    wherein the preamble is generated from a combination of sequences.

16. The apparatus of claim 14,
    wherein the broadcast signal further includes signaling information indicating whether the signal frame includes the EAT.

* * * * *